United States Patent [19]

Frank et al.

[11] Patent Number: 5,335,325

[45] Date of Patent: Aug. 2, 1994

[54] HIGH-SPEED PACKET SWITCHING APPARATUS AND METHOD

[75] Inventors: Steven J. Frank, Hopkinton; Henry Burkhardt, III, Manchester; James B. Rothnie, Brookline; William F. Mann, Sudbury, all of Mass.

[73] Assignee: Kendall Square Research Corporation, Waltham, Mass.

[21] Appl. No.: 499,182

[22] Filed: Mar. 26, 1990

Related U.S. Application Data

[63] Continuation-in-part of Ser. No. 370,325, Jun. 22, 1989, and a continuation-in-part of Ser. No. 136,930, Dec. 22, 1987, Pat. No. 5,055,999.

[51] Int. Cl.⁵ .............................................. G06F 13/14
[52] U.S. Cl. .......................... 395/200; 364/DIG. 1; 364/228.7; 364/229; 364/230; 364/243; 364/243.1; 364/245.5; 364/245.9; 364/246; 364/246.3; 364/246.6; 395/425
[58] Field of Search ............... 395/200, 400, 800, 425; 370/94.1

[56] References Cited

U.S. PATENT DOCUMENTS

| | | | |
|---|---|---|---|
| 3,748,647 | 7/1973 | Ashany et al. | 340/172.5 |
| 4,011,545 | 3/1977 | Nadir | 340/172.5 |
| 4,031,512 | 6/1977 | Faber | 340/147 R |
| 4,077,059 | 2/1978 | Cordi et al. | 364/200 |
| 4,141,067 | 2/1979 | McLagan | 364/200 |
| 4,245,306 | 1/1981 | Besemer et al. | 364/200 |
| 4,293,910 | 10/1981 | Flusche et al. | 364/200 |
| 4,334,305 | 6/1982 | Girardi | 370/86 |
| 4,358,823 | 11/1982 | McDonald | 364/200 |
| 4,394,731 | 7/1983 | Flusche et al. | 364/200 |
| 4,410,946 | 10/1983 | Spencer | 364/200 |
| 4,432,057 | 2/1984 | Daniell et al. | 364/300 |
| 4,497,023 | 1/1985 | Moorer | 395/775 |
| 4,503,497 | 3/1985 | Krygowski et al. | 364/200 |
| 4,622,631 | 11/1986 | Frank et al. | 364/200 |
| 4,700,347 | 10/1987 | Rettberg et al. | 371/1 |
| 4,758,946 | 7/1988 | Shar et al. | 364/200 |
| 4,792,895 | 12/1988 | Tallman | 364/200 |
| 4,864,495 | 9/1989 | Inaba | 395/250 |
| 4,888,726 | 12/1989 | Struger et al. | 395/200 |
| 4,972,338 | 12/1990 | Crawford | 364/200 |
| 4,980,816 | 12/1990 | Fukuzawa et al. | 364/200 |
| 5,006,978 | 4/1991 | Neches | 364/200 |
| 5,055,999 | 10/1991 | Frank et al. | 395/200 |
| 5,060,186 | 10/1991 | Barbagelato et al. | 395/200 |
| 5,101,402 | 3/1992 | Chiu et al. | 395/200 |
| 5,119,481 | 6/1992 | Frank et al. | 395/800 |

FOREIGN PATENT DOCUMENTS

| | | | |
|---|---|---|---|
| 0229932 | 7/1987 | European Pat. Off. | G06F 12/00 |
| 0273612 | 7/1987 | European Pat. Off. | G06F 9/00 |
| 214718 | 3/1987 | European Pat. Off. | |
| 0312194 | 4/1989 | European Pat. Off. | G06F 9/00 |
| 2178205A | 2/1987 | United Kingdom | |

OTHER PUBLICATIONS

Wilson, Sr. Editor, "Increased CPU Speed Drives Changes in Multiprocessor Cache and Bus Designs", Computer Design, (Jun. 1987) p. 20.

Ali et al., "Global Garbage Collection for Distributed . . .", Int'l Jo. of Parallel Programming, vol. 15, No. 5 (1986) pp. 339–387.

Mizrahi et al., "Introducing Memory into the Switch . . .", Proc. of the 16th Annual Int'l Symposium on Computer Archit. (1989) pp. 158–166.

(List continued on next page.)

Primary Examiner—Rebecca L. Rudolph
Attorney, Agent, or Firm—Lahive & Cockfield

[57] ABSTRACT

An improved digital packet switching apparatus enabling enhanced packet transmission and high bandwidth packet transfer. The digital packet switching methods and apparatus permit selectively switching digital signal packet between a set of nodes. The invention includes multiple processing cells, each having a processor coupled to an associated content-addressable memory element. Packet processors, electrically coupled to the memory elements, selectively receive packets from the nodes and transmit the packets into at least one of the plural memory elements; or receive packets from the memory elements and transmit the packets to at least one of the nodes.

19 Claims, 79 Drawing Sheets

OTHER PUBLICATIONS

Pfister et al., "The IBM Research Parallel Processor . . . ", IEEE Proc. of the 1985 Int'l Conf. on Parallel Proc. (1985) pp. 764–771.

Tabak, "Chapter 8 Bus-Oriented Systems", Multiprocessors, Prentice Hall (1990) pp. 92–102.

Gehringer et al., "The Cm* Hardware Architecture", Parallel Proc. the Cm* Experience, Digital Press, pp. 11–28, 432, 438.

Goodman et al., "The Wisconsin Multicube: A New . . . ", Proc. of the 15th Annual Int'l Symposium on Computer Archit. (1988) pp. 422–431.

Hagersten et al., "The Cache Coherence Protocol of the . . . ", Cache & Interconnect Archit. in Multiproc., Klewer Acad. Pub. (1990) pp. 165–188.

Ciepielewsik et al., "A Formal Model for Or-Parallel . . . ", Proc. of the IFIP 9th World Computer Congress (1983) pp. 299–305.

Censier et al., "A New Solution to Coherence . . . ", IEEE Transaction on Computers, vol. c-27, No. 12 (Dec. 1978) pp. 1112–1118.

Eggers et al., "Evaluating the Performance of Four . . . ", Proc. of the 16th Annual Int'l Symposium on Computer Archit. (1989) pp. 2–15.

Papamarcos et al., 1984, "A Low-Overhead Coherence Solution For Multi-Processors With Private Cache Memories", IEEE, pp. 348–354.

Schwartz, *Telecommunication Networks-Protocols Modeling and Analysis,* Introduction and Overview, pp. 1–20, and Layered Architectures in Data Networks, pp. 71–117, Adison-Wesley, 1987.

"Multi-Microprocessors: and Overview . . . " IEEE vol. 26 #2, pp. 216–228.

"Cm*-A Modular Multi-Microprocessor," Nat'l Comp Confr '77, 637–644.

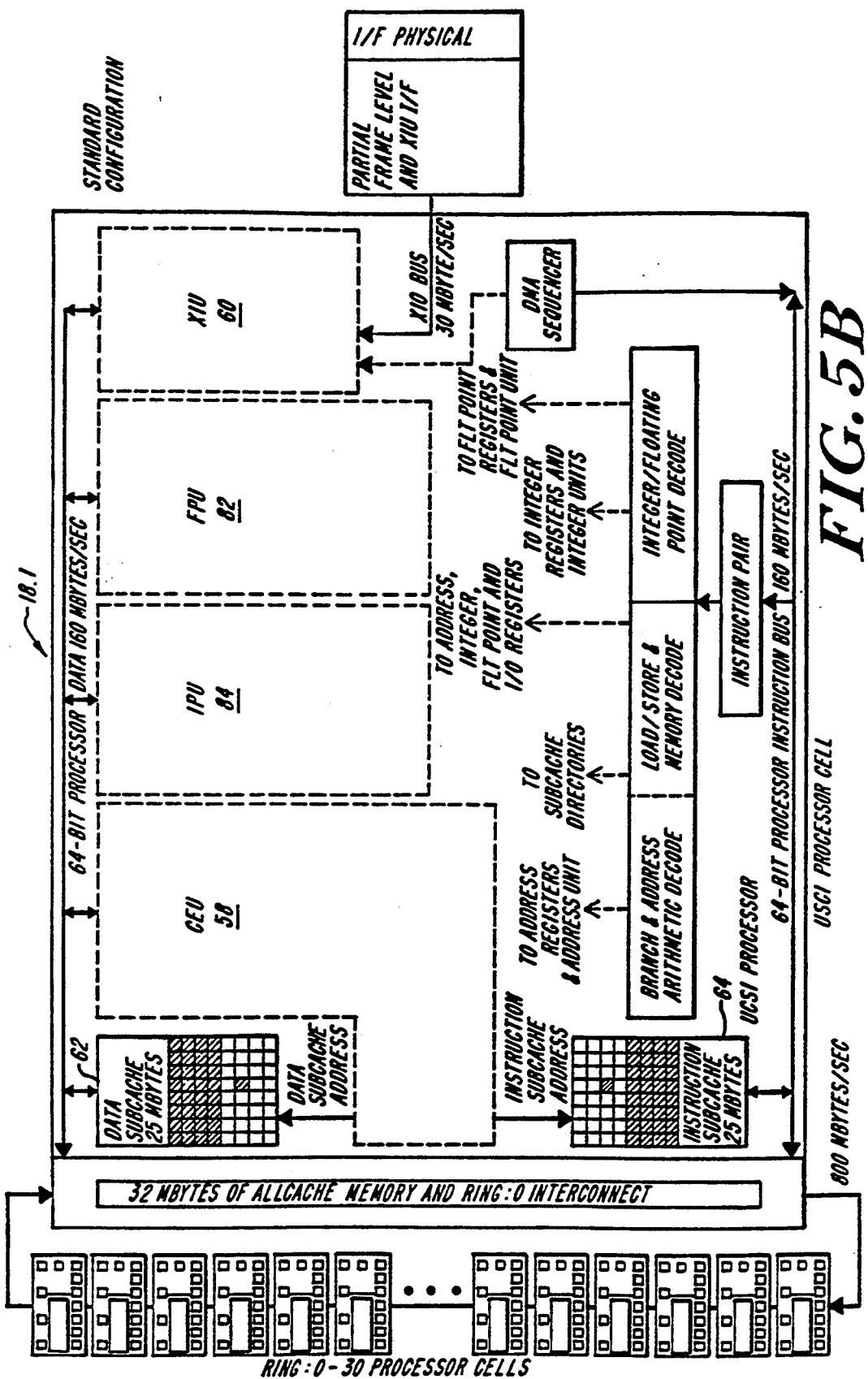

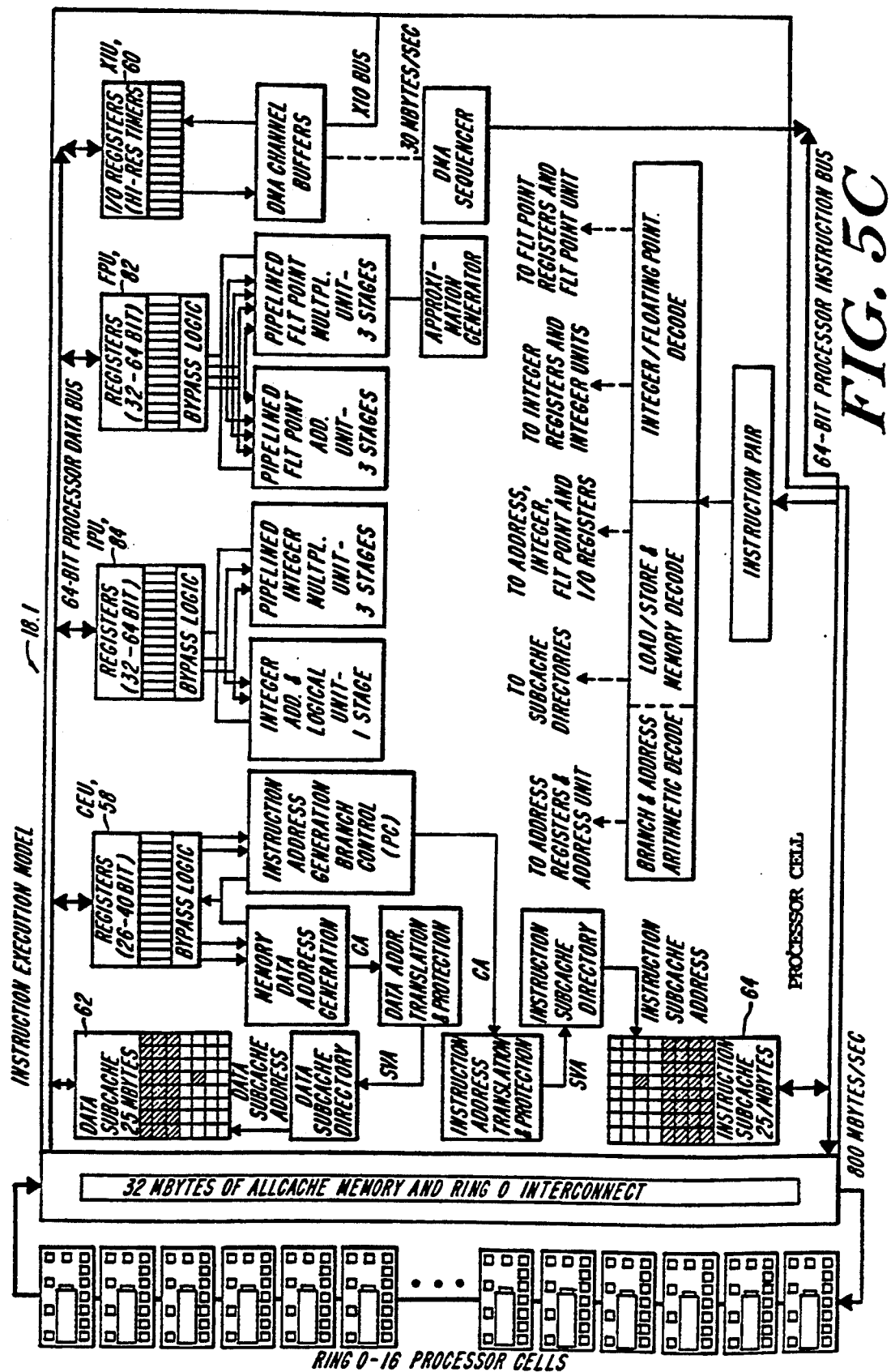

| BUS FIELD / TIME | T12 | T13 | T14 | T15 | T16 | T17 | T18 | T19 | T20 | T21 | T22 | T23 |
|---|---|---|---|---|---|---|---|---|---|---|---|---|
| proc_data_cmd(5:0) | Data Action | Data Action | Data Action | Data Action | Idle | Idle | Idle | Data Response | Data Response | Data Response | Data Response | Data Response |
| proc_data(63:0) | Writeback Word 4 | Writeback Word 5 | Writeback Word 6 | Writeback Word 7 | | | | Inst Spage Word 0 | Inst Spage Word 1 | Inst Spage Word 2 | Inst Spage Word 3 | Inst Spage Word 4 |
| proc_data_parity(7:0) | Writeback SE Addr+4 | Writeback SE Addr+5 | Writeback SE Addr+6 | Writeback SE Addr+7 | | | | Inst Spage SE Addr+0 | Inst Spage SE Addr+1 | Inst Spage SE Addr+2 | Inst Spage SE Addr+3 | Inst Spage SE Addr+4 |
| proc_dcache_addr(15:0) | 7:0 | 7:0 | 7:0 | 7:0 | | | | 7:0 | 7:0 | 7:0 | 7:0 | 7:0 |
| proc_dcache_byte_sel(7:0) | | | | | | | | | | | | |
| proc_dcache_write | Idle | Idle | Idle | Idle | Idle | Idle | Idle | Idle | Idle | Idle | Idle | Idle |
| proc_instr_cmd(1:0) | | | | | | | | | | | | |
| proc_instr(31:0) | | | | | | | | | | | | |
| proc_instr_parity(3:0) | | | | | | | | | | | | |
| proc_icache_addr(15:0) | | | | | | | | | | | | |
| proc_icache_sel | | | | | | | | | | | | |
| proc_icache_write | | | | | | | | | | | | |
| proc_rom_sel | | | | | | | | | | | | |
| proc_cache_response_req | | | | | | | | | | | | |
| proc_cache_insert_req | | | | | | | | | | | | |
| proc_cache_grant | | | | | | | | | | | | |
| proc_cop_response_req | | | | | | | | | | | | |
| proc_cop_insert_req | | | | | | | | | | | | |
| proc_cop_grant | | | | | | | | | | | | |
| proc_cop_align(2:0) | | | | | | | | | | | | |
| proc_cop_busy | | | | | | | | | | | | |
| proc_cop_test | | X | X | X | X | X | X | X | X | X | X | X |
| proc_cop_trap | | | | | | | | | | | | |
| proc_quash | | | | | | | | | | | | |
| proc_long_stall | | | | | | | | | | | | |
| proc_data_stall | | | | | | | | | | | | |
| proc_instr_stall | | | | | | | | | | | | |

HIGH-SPEED PACKET SWITCHING APPARATUS AND METHOD

This application is also a continuation-in-part of U.S. patent application Ser. No. 370,325, filed 22 Jun. 1989, for "Multiprocessor System With Multiple Instruction Sources", assigned to the assignee hereof. and is a continuation-in-part of copending application Ser. No. 136,930 filed on 22 Dec. 1987 now U.S. Pat. No. 5,055,999.

REFERENCE TO RELATED APPLICATIONS

This application is a continuation-in-part of copending U.S. patent application Ser No. 07/136,930 filed 22 Dec. 1987, for "Multiprocessor Digital Data Processing System", now U.S. Pat. No. 5,055,999, issued Oct. 8, 1991 assigned to the assignee hereof.

This application is related to U.S. patent application Ser. No. 136,701 filed 22 Dec. 1989, for "Interconnection System for Multiprocessor Structure", abandoned in favor of U.S. Ser. No. 509,480 filed Apr. 13, 1990, abandoned in favor of U.S. Ser. No. 696,291, filed Apr. 26, 1991, now U.S. Pat. No. 5,119,481, issued Jun. 2, 1992 assigned to the assignee hereof.

This application is also related to U.S. patent application Ser. No. 370,341 for "Multiprocessor Digital Data Processing System"; and U.S. patent application Ser. No. 370,287 for "Improved Multiprocessor System"; both applications which are assigned to the assignee hereof and filed 22 Jun. 1989.

The teachings of the above-cited parent and related applications are incorporated herein by reference. Additionally, a copy of U.S. Ser. No. 136,930 is provided in Appendix A filed herewith; a copy of U.S. Ser. No. 370,325 is provided in Appendix B filed herewith; and a copy of U.S. Ser. No. 370,287 is provided in Appendix C filed herewith. Appendices A, B and C are available in the patented file.

BACKGROUND OF THE INVENTION

This invention relates generally to systems for packet switched communications networks, and, more particularly, relates to apparatus and methods utilizing a high-speed, multiprocessor packet switching configuration.

A wide range of telecommunications network configurations have been proposed or implemented in recent years for providing communication between data handling or data communications devices. In particular, packet switching systems were developed to fulfill a demand for low cost data communications in networks that provide access to host computers.

In conventional packet switched systems, digital data cells or packets are transmitted to a selected destination by a terminal, computer, applications program or other data handling device. The destination can be another data handling or data communication apparatus or system. In many packet switched systems, special-purpose computers are employed as packet switching processors—i.e., communication processors adapted to direct packets along the network.

One class of packet switching systems utilizes predetermined paths through the network, in which packets generated by a plurality of users share link and switch facilities as the packets travel over the network. In these systems, the packets must be stored at nodes between transmission links until the packets can be forwarded along the appropriate destination link. This class of data transmission system is referred to as virtual circuit or connection-oriented transmission.

Another class of packet switching systems utilizes connectionless transmission, which requires no initial connection for a data path through the network. In these systems, individual data cells or packets, including a destination address, are routed through the network from source to destination via intermediate nodes.

The virtual circuit system is utilized in a public network established by Telenet Communications Corporation. This system employs a two-level hierarchy to route data packets. One level of the hierarchy is a network having a plurality of hubs and nodes, each of which utilizes a cluster of switches. The second level includes smaller area networks having trunks, access lines and clustered lower level switches connected to each hub. The Telenet system utilizes the X.75 protocol promulgated by the International Telegraph and Telephone Consultative Committee of the International Telecommunications Union (CCITT) as an interface for connecting computers to a packet-switched network. The protocol is structured in a three-layered configuration, and the layers are referred to as the physical level, the frame level, and the packet level. Routing paths in the Telenet system are determined by a packet switching processor, which utilizes routing tables indicating available links from each hub. The conventional packet switching processor used in the Telenet system includes a main memory unit, line processors that control access to user lines, and a central processing unit (CPU) that controls routing at the packet level. The CPU employs a table of trunk-to-trunk active virtual circuits to identify appropriate hubs and virtual circuits for connecting access-requesting users. In the Telenet system, each user transmitting data across the network must first write its data packets into main memory, via a bus. The line processors associated with each user compete for access to the bus, in accordance with a conventional token-passing configuration under the control of an arbitration unit.

Another form of conventional virtual circuit packet switching system utilizes multiple bus request chains having different predetermined priorities. Each chain in the system employs an arbitration scheme similar to that described above.

In yet another example of a conventional packet switching network, a user seeking access to the bus must first transmit a selected signal pattern onto the arbitration bus. Several line units can drive the bus simultaneously in this configuration. The driving line units periodically read these signal patterns and, based on the priorities of other requesters, determine whether to maintain or abandon their respective requests. This process continues unit an arbitration unit declares a winner.

Conventional packet switching systems, however, suffer significant limitations in communications bandwidth and speed, resulting from their bus arbitration schemes and the requirement of writing packets into main memory across a bandwidth-limited bus.

For example, in systems utilizing token-passing arbitration, a requesting unit must maintain its request and remain idle until the token is passed along the chain to that unit, even if that unit is the only processor requesting access to the bus. Time and communications channel capacity are squandered while the token is passed from user to user. As a result, certain conventional systems of this type are limited to a data transmission rate no greater than approximately 164 megabits/second.

One object of the invention, therefore, is to provide improved packet switching methods and apparatus enabling enhanced packet transmission rates.

Another object of the invention is to provide packet switching methods and apparatus that afford high bandwidth packet transfer.

A further object of the invention is to provide packet switching methods and apparatus enabling multiple requesting processors to receive substantially instantaneous access to the packet switched network.

Another object of the invention is to provide such methods and apparatus capable of handling a wide range of existing and proposed packet protocols.

Still another object of the invention is to provide packet switching methods and apparatus that enable substantially simultaneous handling of packet switching operations and applications program processes.

Other general and specific objects of the invention will in part be obvious and will in part appear hereinafter.

SUMMARY OF THE INVENTION

The foregoing objects are attained by the invention, which provides digital packet switching methods and apparatus for selectively switching digital signal packets between a set of nodes. The invention includes multiple processing cells, each having a processor coupled to an associated content-addressable memory element. Packet processors, electrically coupled to the memory elements, selectively receive packets from the nodes and transmit the packets into at least one of the plural memory elements; or receive packets from the memory elements and transmit the packets to at least one of the nodes.

One aspect of the invention includes memory management elements, coupled to the memory elements, for accessing one or more of the information-representative signals stored in the plural memory elements. The in-cell processors can include access request elements for requesting access to an information-representative signal. The access request elements can also generate an ownership-request signal to request priority access to an information-representative signal.

In another aspect of the invention, the memory element associated with the requesting processor includes control elements for selectively transmitting the access-request signal to the memory management element. The memory management elements can also include memory coherence elements. These coherence elements respond to certain ownership-request signals by exclusively allocating physical storage space in the memory element associated with the requesting processor and storing the requested information-representative signal therein.

A further aspect of the invention includes a plurality of information transfer domains, including a first domain having a plurality of domain(0) segments. Each domain(0) segment includes an associated bus element and a first plurality of processing cells connected to the bus element for transferring information-representative signals. Each cell has a central processor and an associated content-addressable memory element for storing information-representative signals. The memory elements, in turn, include interface elements connected with the associated central processor and with the bus element for transferring information-representative signals. The cells are arranged so that the transfer of information-representative signals between the associated central processors takes place only through the respective memory element.

This aspect of the invention further includes a domain(1) segment having an associated bus element and a plurality of routing elements. Each routing element is connected to the bus element associated with the domain(1) segment and to the bus element associated with one of the domain(0) segments, for transferring information-representative signals between the domain(1) segment and the associated domain(0) segment. The processing cells associated with each of the domain(0) segments can transfer signals with the processing cells associated with the remainder of the domain(0) segments only through the domain(1) segment.

In a further aspect of the invention, the interconnected processors described above include a first processor, coupled to at least one content-addressable memory element, for normally processing an instruction stream including instructions from a first instruction source; and at least one of the other processors includes a packet processor for bidirectional packet transfer between the nodes and the memory elements. The packet processors include insert elements for inserting one or more inserted-instructions to be processed by the first processor in the same manner as, and without affecting processing sequence of, the instructions from the first instruction source.

In another aspect of the invention, at least one of the memory elements includes a data subpage containing one or more information-representative signals and forming at least part of a data page. At least one of the central processors includes access request elements for generating an access-request signal to request access to a data subpage stored in the memory elements. In accord with this aspect of the invention, the memory management element responds to certain access-request signals by allocating, within the memory element associated with the requesting central processor, physical storage space for the data page associated with the requested data subpage, and storing the requested data subpage therein. The memory management elements further include de-allocation elements for de-allocating physical storage space allocated to a selected data page in the memory elements. This de-allocation is effected prior to, or substantially concurrent with, the allocation of the physical storage space for the data page associated with the requested data subpage.

A further aspect of the invention includes the multiple domain configuration described above, as well as a selected first processor for normally processing an instruction stream containing instructions from a first instruction source. In accord with this aspect of the invention, at least one of the other interconnected processors includes a packet processor for bidirectional packet transfer between the nodes and the memory elements. This packet processor includes insert elements for inserting one or more inserted-instructions to be processed by the first processor in the same manner as, and without affecting processing sequence of, the instructions from the first instruction source.

Yet another aspect of the invention includes at least one remote processing cell, each remote processing cell including a central processor coupled for information transfer with an associated memory element. A remote interface module coupled to the remote cell transfers information-representative signals between the memory element associated with the remote processing cell and the memory elements associated with other processing cells. The remote cell can reside at a point physically remote from other cells, and the interface module can include elements for transmitting the information-representative signal between the physically remote point and other cells. More particularly, the remote interface module can include fiber optic transmission media for carrying information-representative signals between the remote cell and the other cells.

In accord with one aspect of the invention, the packet processors include packet receive elements, in electrical communication with at least one of the nodes, for receiving the digital signal packets from the nodes; and packet splitter elements, in electrical communication with the receive elements, for splitting each digital signal packet received from the nodes into a header portion and a data portion.

The packet processors also include packet receive buffer elements, containing a buffer element in electrical communication with the packet splitter elements, for storing the digital signal packets split by the packet splitter elements. The packet processors further include frame processing elements, in electrical communication with the packet receive buffer elements and the memory elements. These frame processors retrieve the digital signal packets from the packet receive buffer elements, execute selected processing on the digital signal packets, and transmit the digital signal packets to the plurality of memory elements. The packet processors further include error checking elements for checking the received digital signal packets for errors, and for storing the results of the checking operation with the header portions of the received digital signal packets.

In another aspect of the invention, the cells include receive queue elements for storing in the memory elements at least one receive queue. The receive queue includes a data structure containing digital signal packets received from the packet processors. Any of the processing cells can retrieve selected packets from the receive queue for processing. The cells also have transmit queue elements for storing at least one transmit queue in the memory elements. The transmit queue, which corresponds to at least one of the nodes, comprises a data structure containing digital signal packets to be transmitted to at least a selected one of the nodes.

The cells also comprise receive queue packet transfer elements, in communication with the receive queue elements and the transmit queue elements, for selectively transferring selected digital signal packets from the receive queues to at least a selected transmit queue, responsive to control signals generated by the plurality of processors.

Further in accord with this aspect of the invention, the frame processors contain elements for loading selected ones of the digital signal packets into the receive queues. The frame processors can also contain direct packet transfer elements, in electrical communication with the packet receive buffer elements, and responsive to the header portion of the digital signal packets, for transferring selected digital signal packets from the packet receive buffer elements to the transmit queue. The frame processors also include units coupled to the transmit queue elements for retrieving packets from the transmit queue, responsive to the header portion of the digital signal packets. These packets are stored in packet transmit buffer elements, and subsequently transmitted to selected nodes by packet transmit elements.

A further aspect of the invention provides application service queue elements in at least one processing cell, for storing an application service queue. This queue includes a data structure containing packets to be serviced by the processing cells in accordance with at least one application program. Packets can be loaded from the receive queues into the application service queue, in response to control signals generated by the processors in accordance with the application programs.

Application completion queue elements are provided for storing an application completion queue. This queue includes a data structure containing packets generated by the processing cells in accordance with the application program. Transfer elements are provided for loading selected packets from the application completion queue into the transmit queue.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIGS. 5A–5C depict further embodiments of a processing cell constructed in accordance with the invention;

Figure 11A:
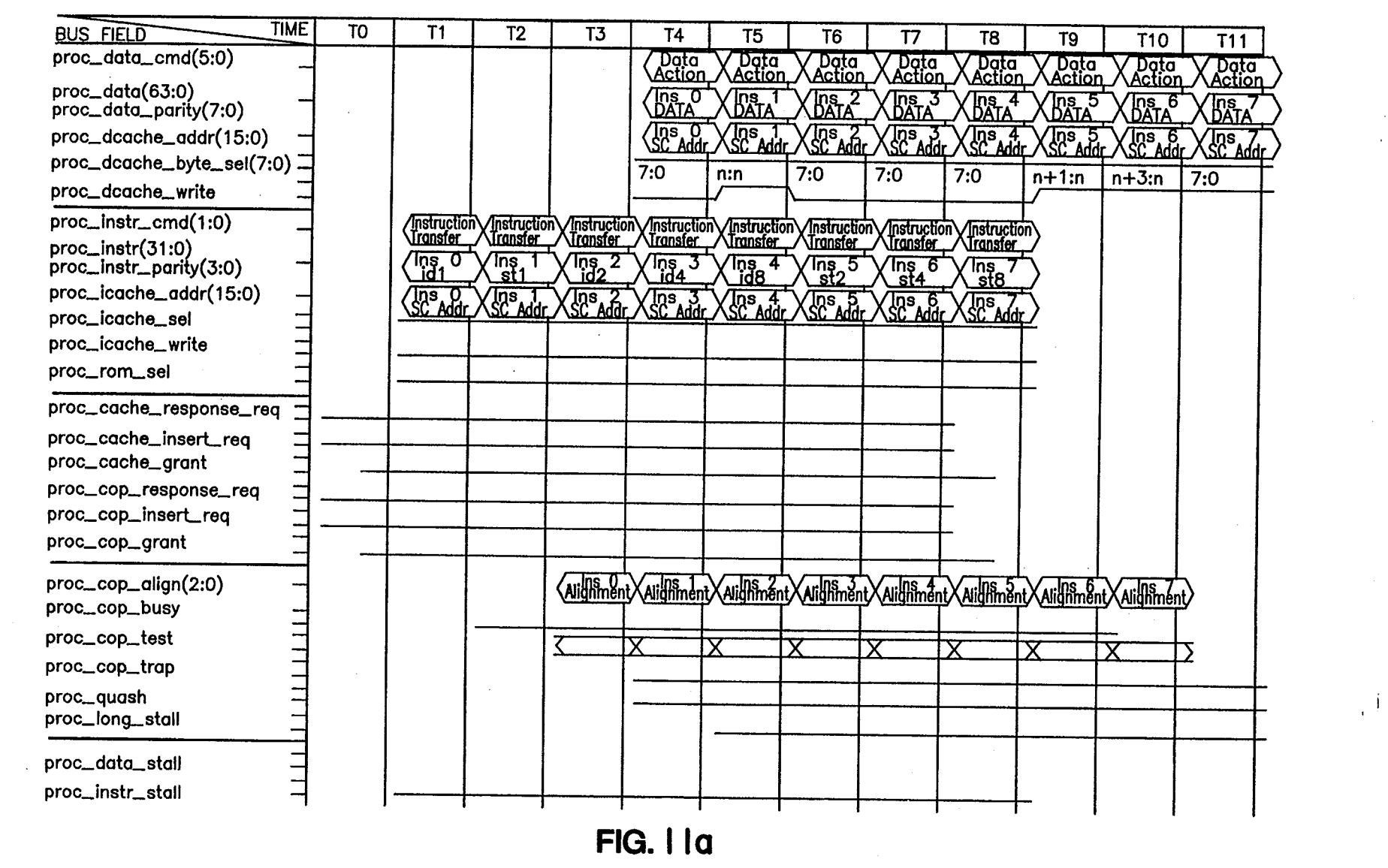
Figure 11B:
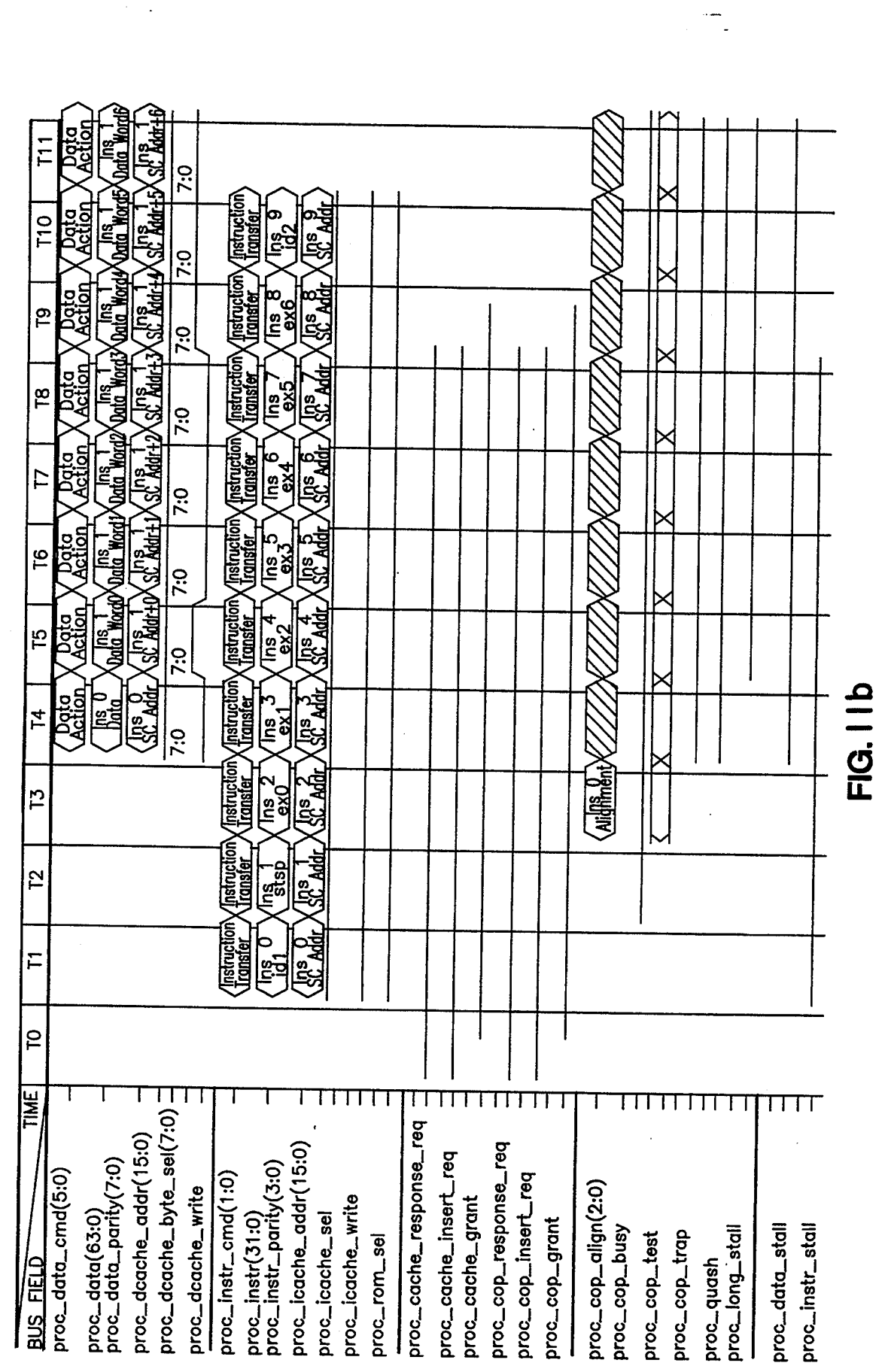
Figure 11B-1:
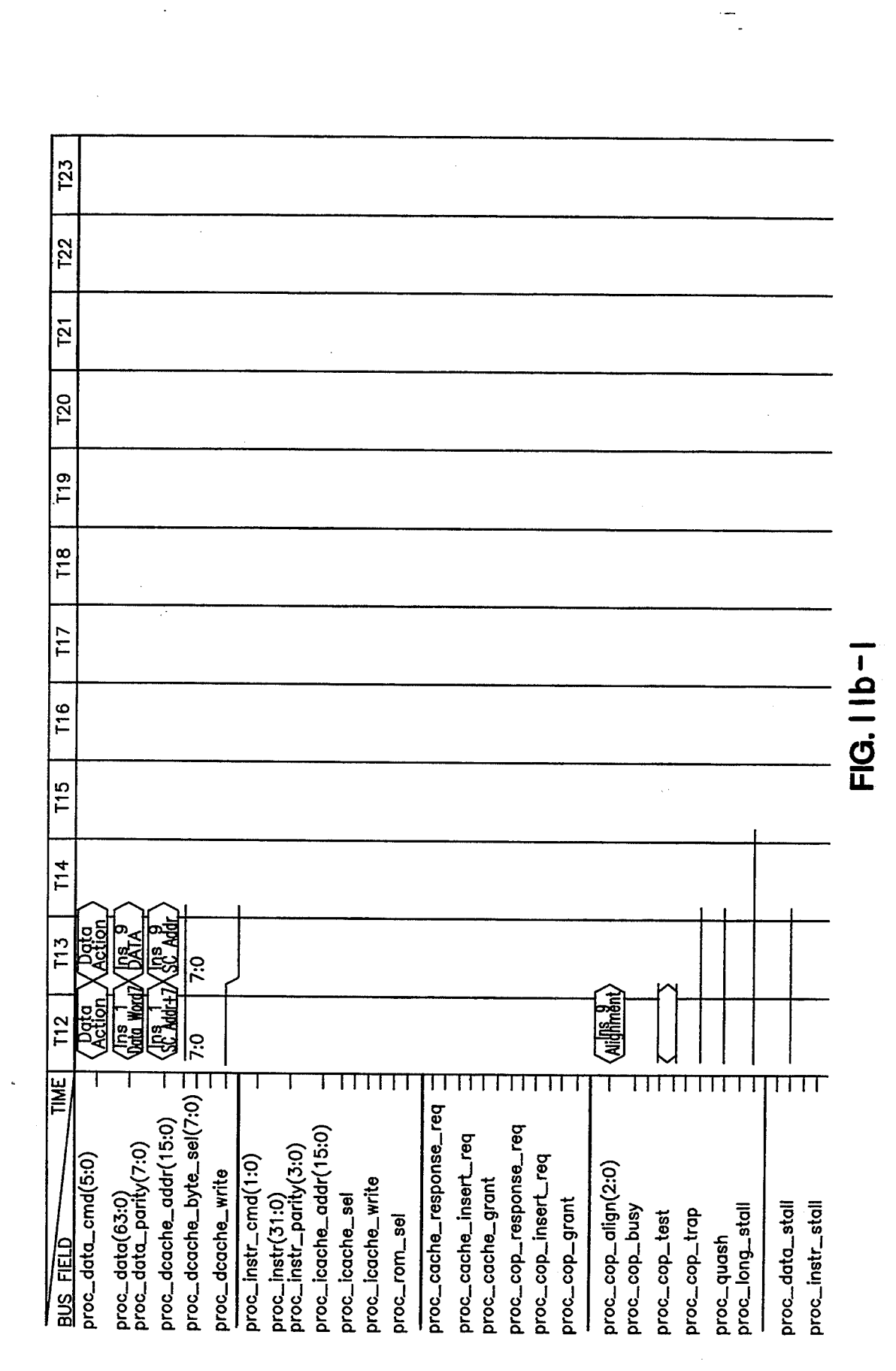

FIGS. 11a, 11b, 11b-1 through 11k-1 depict the timing of subcache hit and miss operations.

FIGS. 12a through 12b-2 depict the timing of trap operations.

FIGS. 13a through 13i-2 depict the timing of load and interrupt operations.

FIGS. 14a through 14b-1 depict the timing of space load and store operations.

FIGS. 15a through 15d-2 depict the timing of exception processing operations.

DESCRIPTION OF ILLUSTRATED EMBODIMENTS

Figure 1:
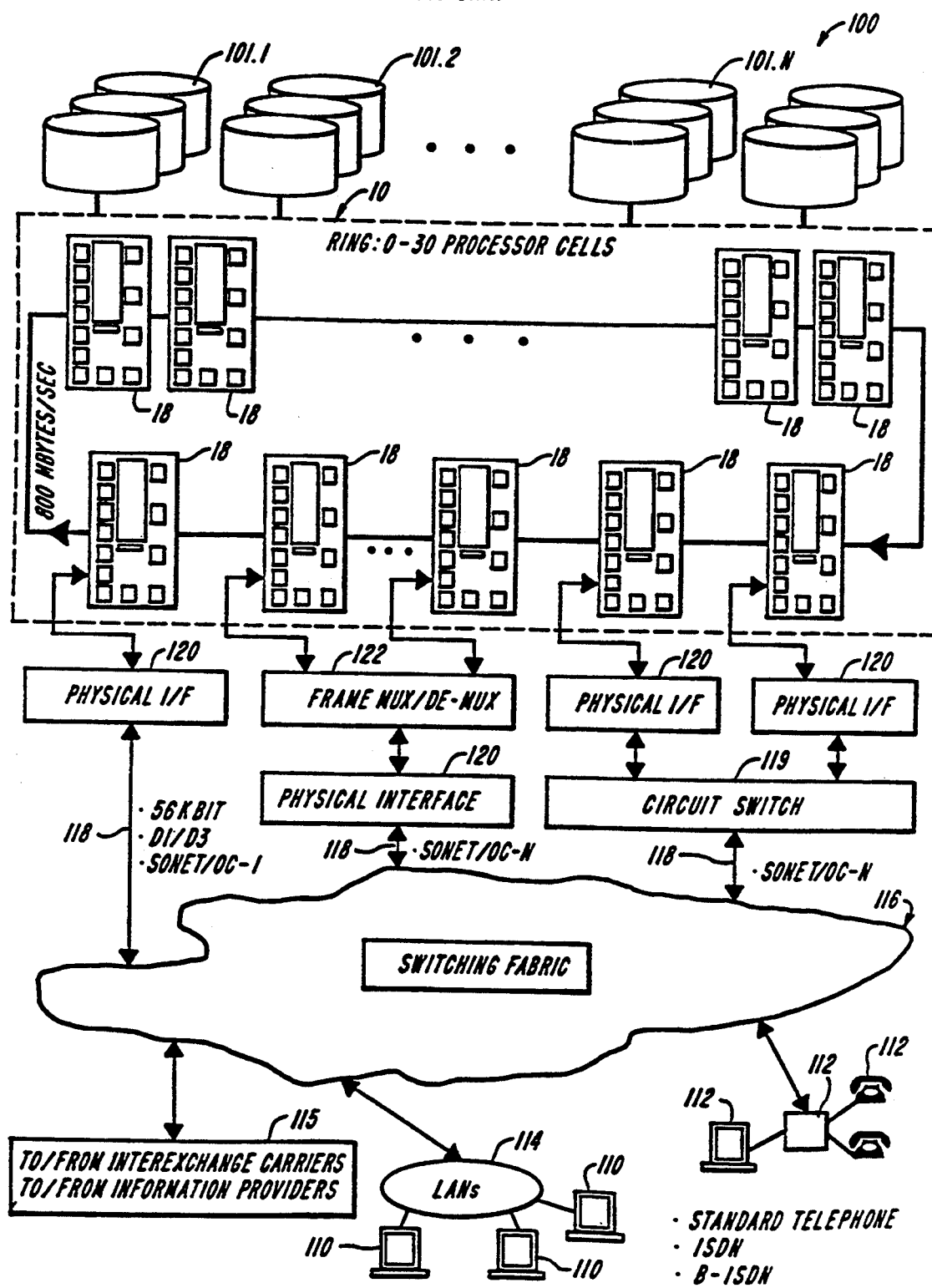
FIG. 1 is a schematic diagram depicting a packet switching network configuration constructed in accord with the invention.

FIG. 1 depicts a packet switching system 100 in accordance with the invention. The system 100 selectively interconnects a plurality of users, including data handling devices 110 linked by a local area network (LAN), telecommunications devices 112, and applications programs operating on 101.1, 101.2, . . . , 101.N. System users can also include other information providers and inter-exchange carriers 115. The system includes a multiprocessor packet switching apparatus 10 having a plurality of processing cells 18, for controlling the operation of the packet switching system 100 in a manner described below.

The users shown in FIG. 1 communicate with the multiprocessor packet switching apparatus 10 via a switching fabric or network 116. This switching fabric can be conventional in design, and can include, for example, the hubs and links of a conventional Telenet switching network. When a user transmits data, switching fabric 116 processes the data in a known manner to generate digital signal packets configured in accordance with conventional protocols. The packets can be routed along lines 118 to physical interface modules 120. Alternatively, packets can be routed to a circuit switch 119 prior to reception by a physical interface module 120. The physical interface modules 120 processes the received packets, as discussed below in connection with FIG. 6, and transmits the packets to the processing cells 18 of the packet switching apparatus 10. The illustrated embodiment includes a frame multiplexor/demultiplexor 122 interposed between a physical interface module 120 and a processing cell 18, for executing further processing of signal packets, in a manner discussed below.

Packet switching apparatus 10 receives signal packets generated by the users—including applications programs 101—and transmits each packet to selected end-users as described hereinafter in connection with FIGS. Transmission of packets from the packet switching apparatus 10 to the users is accomplished in a manner analogous to that of packet reception.

A significant feature of the invention is that the packet switching apparatus 10 depicted in FIG. 1 can operate in conjunction with the existing ISO Reference Model for Open Systems Interconnection (OSI). The ISO Reference Model, shown in FIG. 2, has become a standard for layered communication architectures.

A detailed description of the ISO Reference Model and underlying protocols can be found in Schwartz, *Telecommunication Networks: Protocols, Modeling and Analysis*, Addison-Wesley, 1987, incorporated herein by reference.

Another significant feature of the invention is the ability of the packet switching apparatus to operate in conjunction with the proposed Broadband Integrated Digital Network (B-ISDN) and Synchronous Optical Network (SONET) standards. B-ISDN is an emerging standard for high speed digital communications.

Two principal approaches promulgated for multiplexing and switching for B-ISDN are Synchronous Transfer Mode (STM) and Asynchronous Transfer Mode (ATM). Synchronous time division multiplexing and circuit switching technologies are based on STM principles. Asynchronous time division multiplexing and high-speed packet switching are based on ATM principles.

Despite recent advances, circuit switching technology cannot efficiently carry bursty traffic. Switching fabric resources are wasted when there is no information to transfer. High speed packet switching or AM technique eliminate these limitations, since bandwidth is dynamically allocated based on multiple user demand. Another significant feature of the invention, therefore, is the ability to support high speed ATM techniques.

Implicit in the ISO Model and similar architectures is the recognition that the network communications problem can be divided into two components. The first involves the communications network itself. Data delivered by an end user to a network must arrive at the destination correctly and in a timely fashion. The second component of the communications problem is the necessity of ensuring that the data ultimately delivered to the end user at the destination is recognizable and in the proper form for its correct use.

Figure 2:
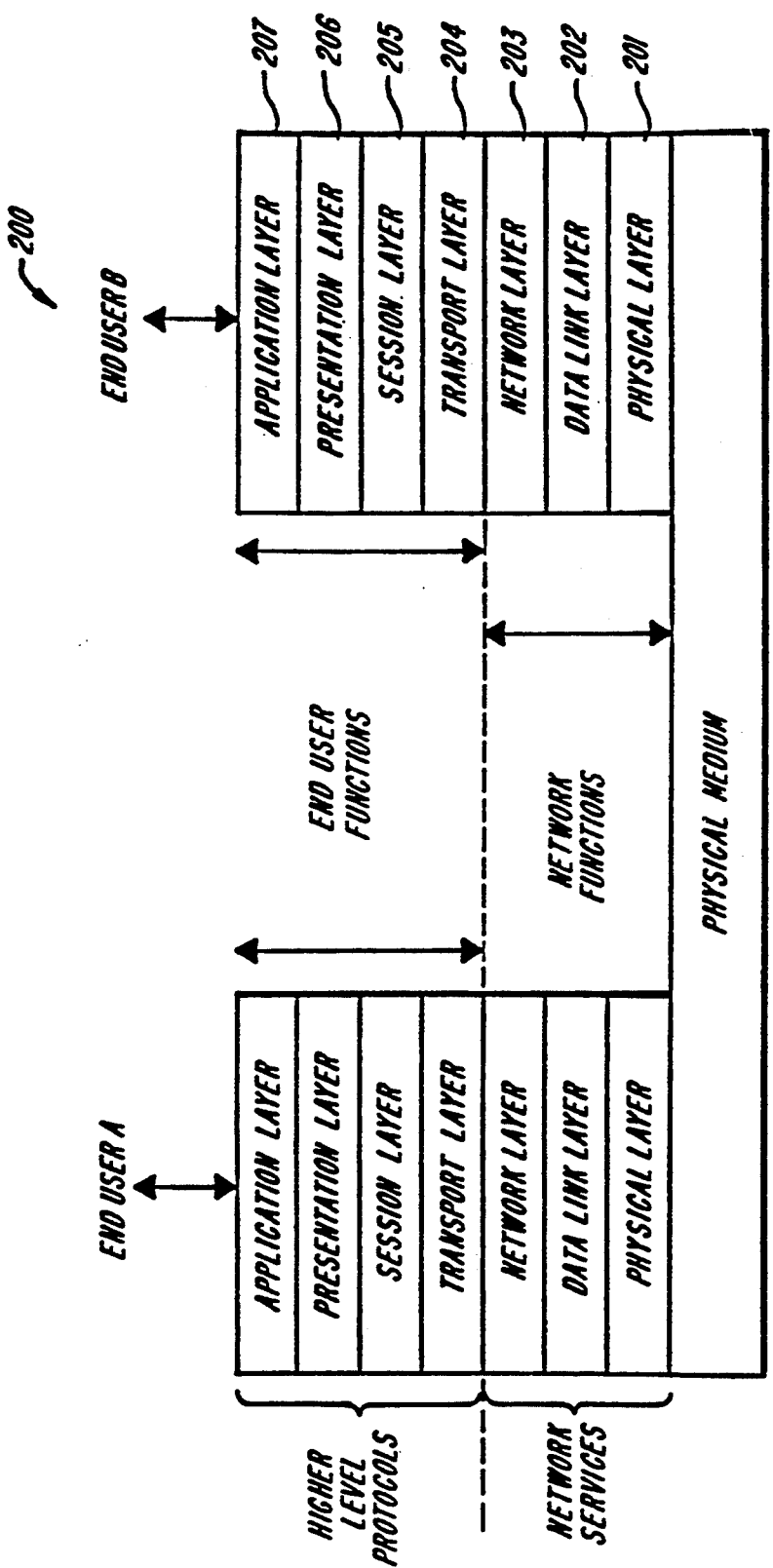
FIG. 2 is a schematic diagram depicting conventional OSI layered communications architecture.

The OSI Reference Model comprises the seven layers shown in FIG. 2. The lowermost three layers, 201–203, comprise the network structures and services that address the first part of the communications problem. The upper four layers, 204–207, comprise the components and operations that provide services to the end users. These layers are thus associated with the end users, rather than with the networks.

The data link layer 202 and the physical layer 201 ideally provide an error-free communication link between two nodes in a network. The function of the physical layer 201 is to ensure that a bit entering the physical medium at one end of a link arrives at the destination end. Using this underlying bit transport service, the purpose of the data link protocol—also referred to as frame level protocol—is to ensure that blocks of data are transferred without errors across a link. These data blocks are also referred to as frames.

The objective of the network layer 203, also known as the packet level, is to route the data through the network, or through multiple networks if necessary, from source to destination nodes. This layer also provides for flow or congestion control, to prevent network resources such as nodal buffers and transmission links from filling up, possibly leading to a deadlock condition. In executing these functions, the network layer uses the services of the data link layer below to ensure that a block of data—i.e., a packet—transmitted at one end of a link along a route through the network arrives at its destination without error.

These network objectives and packet switching functions are advantageously provided by exploiting the multiple cell configuration of the packet switching apparatus 10 depicted in FIG. 1. In particular, while the multiprocessor structure 10 shown in FIG. 1 includes only one ring, or domain, of processing cells, the structure can be expanded to comprise a plurality of domains, as indicated in FIG. 3.

Figure 3:
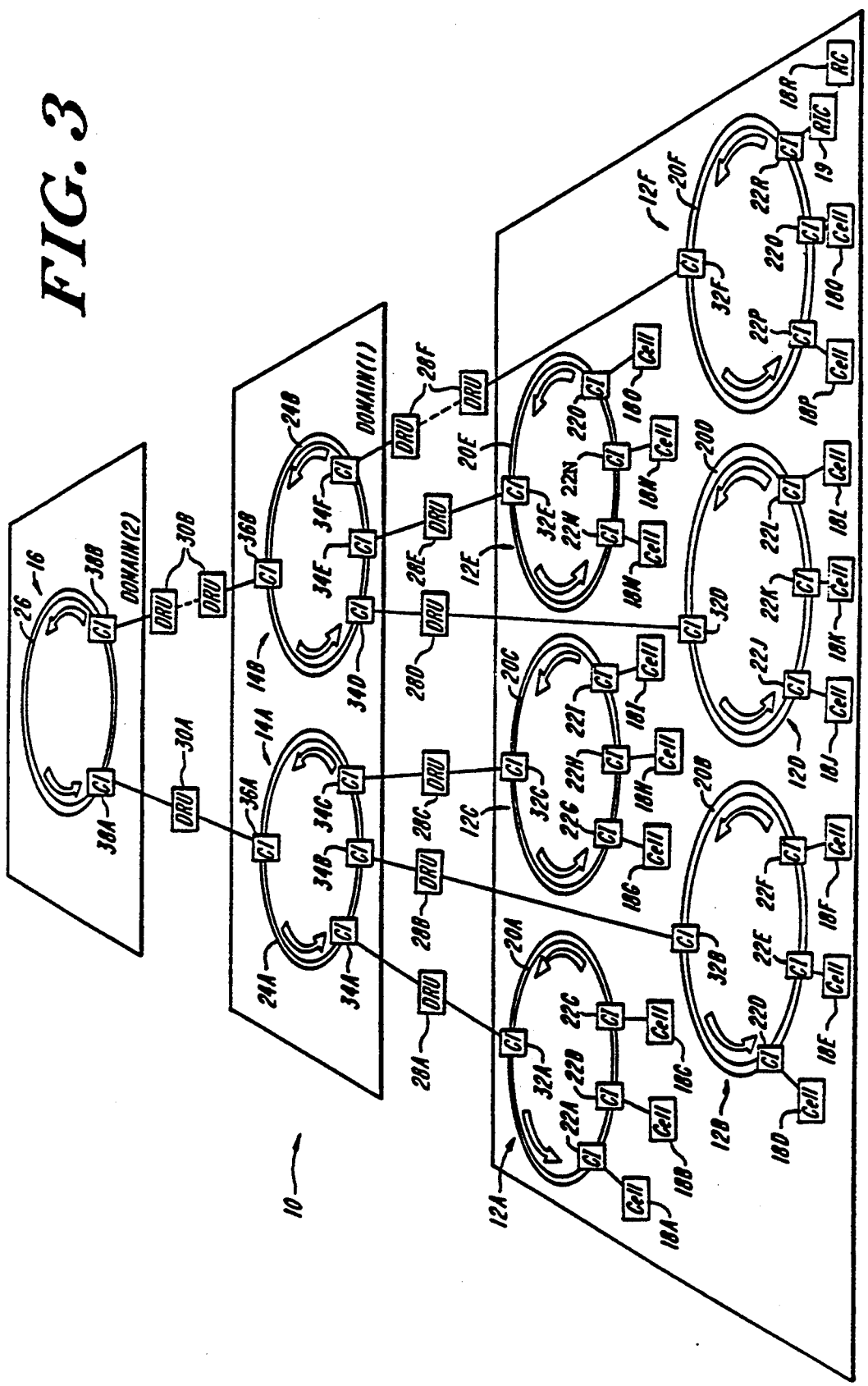
FIG. 3 is a schematic diagram depicting a multiprocessor structure employed in the packet switching system of FIG. 2.

FIG. 3 depicts a multiprocessor structure 10 that can be utilized in connection with a packet switching practice of the invention. A structure of this type is further described in commonly-owned U.S. patent application Ser. No. 136,930 now U.S. Pat. No. 5,055,999, filed 22 Dec. 1987, for Multiprocessor Digital Data Processing System, incorporated herein by reference, available in the patented file as Appendix A.

The illustrated multiprocessor structure 10 includes three information transfer domains: domain(0), domain(1), and domain(2). Each information transfer domain includes one or more domain segments, characterized by a bus element and a plurality of cell interface elements. Particularly, domain(0) of the illustrated system 10 includes six segments, designated 12A, 12B, 12C, 12D, 12E and 12F, respectively. Similarly, domain(1) includes segments 14A and 14B, while domain(2) includes segment 16.

Each segment of domain(0), i.e., segments 12A, 12B, ... 12F, comprises a plurality of processing cells. For example, as shown in the illustration, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

As further illustrated, each domain(0) segment may be characterized as having a bus element providing a communication pathway for transferring information-representative signals between the cells of the segment. Thus, illustrated segment 12A is characterized by bus 20A, segment 12B by 20B, segment 12C by 20C, and so on. As described in greater detail in commonly-owned U.S. patent application Ser. No. 136,930 filed 22 Dec. 1987, incorporated herein by reference, information-representative signals are passed between the cells 18A, 18B and 18C of exemplary segment 12A by way of the memory elements associated with each of those cells. Specific interfaces between those memory elements and the bus 20A are provided by cell interface units 22A, 22B and 22C, as shown. Similar direct communication pathways are established in segments 12B, 12C and 12D between their respective cells 18D, 18E, ... 18R by cell interface units 22D, 22E, ... 22R, as illustrated.

As shown in the illustration and noted above, the remaining information transfer domains, i.e., domain(1) and domain(2), each include one or more corresponding domain segments. The number of segments in each successive segment being less than the number of segments in the prior one. Thus, domain(1)'s two segments 14A and 14B number fewer than domain(0)'s six 12A, 12B ... 12F, while domain(2), having only segment 16, includes the fewest of all. Each of the segments in domain(1) and domain(2), the "higher" domains, include a bus element for transferring information-representative signals within the respective segments. In the illustration, domain(1) segments 14A and 14B include bus elements 24A and 24B, respectively, while domain(2) segment 16 includes bus element 26.

The segment buses serve to transfer information between the components elements of each segment, that is, between the segment's plural domain routing elements. The routing elements themselves provide a mechanism for transferring information between associated segments of successive domains. Routing elements 28A, 28B and 28C, for example, provide a means for transferring information to and from domain(1) segment 14A and each of domain(0) segments 12A, 12B and 12C, respectively. similarly, routing elements 28D, 28E and 28F provide a means for transferring information to and from domain(1) segment 14B and each of domain(0) segments 12D, 12E and 12F, respectively. Further, domain routing elements 30A and 30B provide an information transfer pathway between domain(2) segment 16 and domain(1) segments 14A and 14B, as shown.

The domain routing elements interface their respective segments via interconnections at the bus elements. Thus, domain routing element 28A interfaces bus elements 20A and 24A at cell interface units 32A and 34A, respectively, while element 28B interfaces bus elements 20B and 24B at cell interface units 32B and 34B, respectively, and so forth. Similarly, routing elements 30A and 30B interface their respective buses, i.e., 24A, 24B and 26, at cell interface units 36A, 36B, 38A and 38B, as shown.

FIG. 3 illustrates further a preferred mechanism interconnecting remote domains and cells in a digital data processing system constructed in accord with the invention. Cell 18R, which resides at a point physically remote from bus segment 20F, can be coupled with that bus and its associated cells (18P and 18O) via a fiber optic transmission line, indicated by a dashed line. A remote interface unit 19 provides a physical interface between the cell interface 22R and the remote cell 18R, The remote cell 18R is constructed and operated similarly to the other illustrated cells and includes a remote interface unit for coupling the fiber optic link at its remote end.

In a similar manner, domain segments 12F and 14B can be interconnected via a fiber optic link from their parent segments. As indicated, the respective domain routing units 28F and 30B each comprise two remotely coupled parts. With respect to domain routing unit 28F, for example, a first part is linked directly via a standard bus interconnect with cell interface 34F of segment 14B, while a second part is linked directly with cell interface unit 32F of segment 12F. These two parts, which are identically constructed, are coupled via a fiber optic link, indicated by a dashed line. As above, a physical interface between the domain routing unit parts and the fiber optic media is provided by a remote interface unit (not shown).

Figure 4:
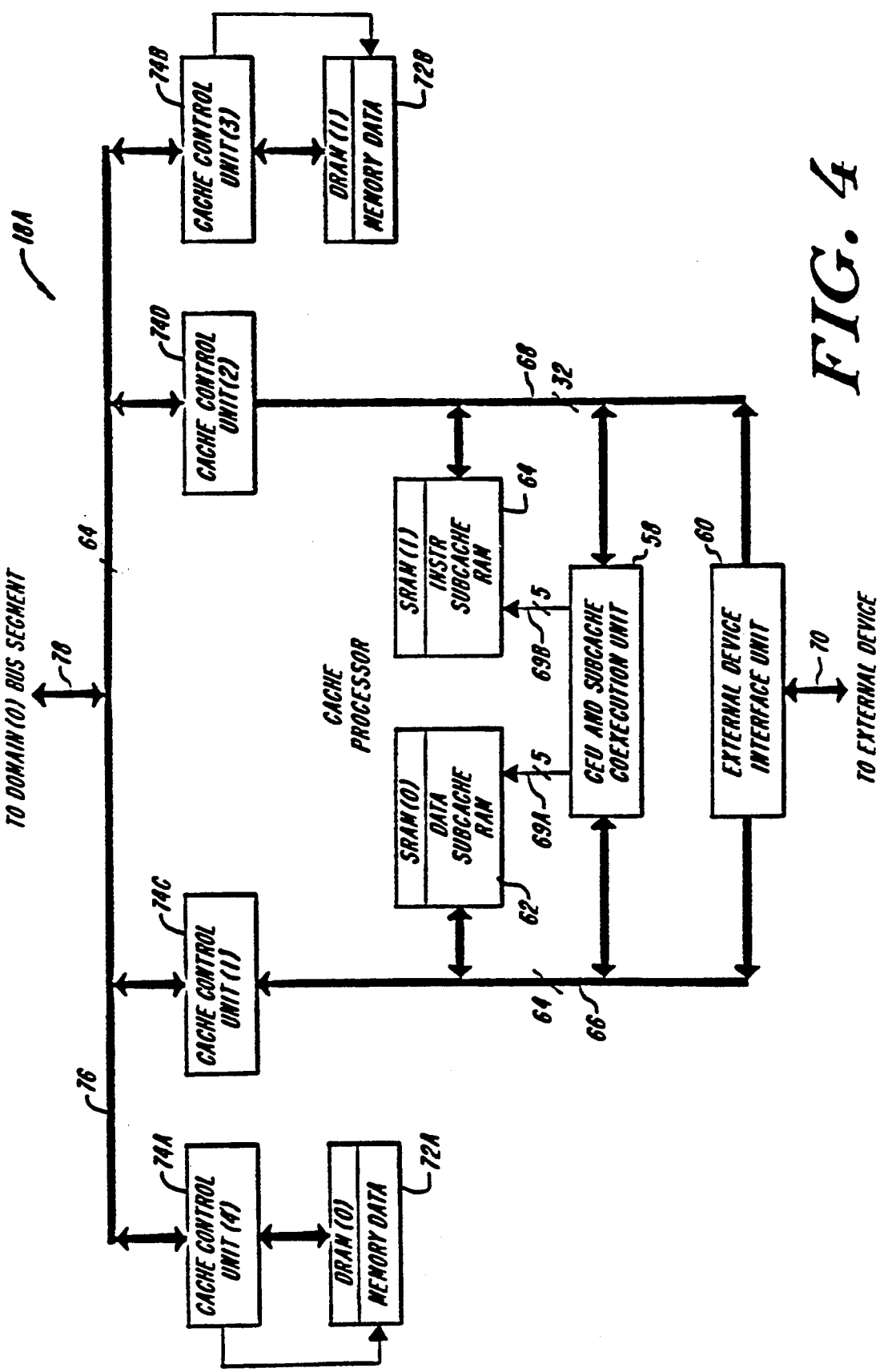
FIG. 4 depicts an exemplary processing cell in the multiprocessor structure of FIG. 3.

FIG. 4 depicts an embodiment of the processing cells 18A, 18B, ..., 18R of FIG. 3. The illustrated processing cell 18A includes a central processing unit 58 coupled with external device interface 60, data subcache 62 and instruction subcache 64 over processor bus 66 and instruction bus 68, respectively. Interface 60, which provides communications with external devices, e.g., disk drives, over external device bus, is constructed in a manner conventional to the art.

Processor 58 can comprise any one of several commercially available processors, for example, the Motorola 68000 CPU, adapted to interface subcaches 62 and 64, under control of a subcache co-execution unit acting through data and address control lines 69A and 69B, in a manner conventional to the art, and further adapted to execute memory instructions as described below. The processing cells are further described in commonly-owned U.S. patent application Ser. No. 136,930, (now U.S. Pat. No. 5,055,999), filed 22 Dec. 1987, for "Multiprocessor Digital Data Processing System," incorporated herein by reference and set forth in Appendix A available in the patented file. Schematics for an embodiment of the processing cells are set forth in Appendix D available in the patented file.

Processing cell 18A further includes data memory units 72A and 72B coupled, via cache control units 74A and 74B, to cache bus 76. Cache control units 74C and 74D, in turn, provide coupling between cache bus 76 and processing and data buses 66 and 68. As indicated in FIG. 4, bus 78 provides an interconnection between cache bus 76 and the domain(0) bus segment 20A associated with the illustrated cell. Preferred designs for cache control units 74A, 74B, 74C and 74D are discussed in U.S. patent application Ser. No. 136,930, (now U.S. Pat. No. 5,055,999), filed 22 Dec. 1987, for "Multiprocessor Digital Data Processing System," and U.S. patent application Ser. No. 370,287, filed 22 Jun. 1989, for "Improved Multiprocessor System." The teachings of both applications are incorporated herein by reference, and both applications are set forth in Appendices A and C, respectively, available in the patented file.

In a preferred embodiment, data caches 72A and 72B include dynamic random access memory (DRAM) devices, each capable of storing up to 16 Mbytes of data. The subcaches 62 and 64 are static random access memory (SRAM) devices, the former capable of storing up to 256 k bytes of data, the latter of up to 256 k bytes of instruction information. As illustrated, cache and processor buses 76 and 64 provide 64-bit transmission pathways, while instruction bus 68 provides a 64-bit transmission pathway. A preferred construction of cache bus 76 is provided in U.S. patent application Ser. No. 136,930, (now U.S. Pat. No. 5,055,999), filed 22 Dec. 1987, for "Multiprocessor Digital Data Processing System," incorporated herein by reference and set forth in Appendix A available in the patented file.

Those skilled in the art will understand that illustrated CPU 58 can represent a conventional central processing unit and, more generally, any device capable of issuing memory requests, e.g., an I/O controller or other special purpose processing element.

The instruction execution of a processing cell herein described differs from conventional digital processing systems in several significant ways. The processing cell—e.g., 18A—has multiple processing cells or functional units—e.g., 58, 60—that can execute instructions in parallel. Additionally, the functional units are "pipelined," to permit multiple instructions to be in progress at the same time by overlapping their execution. This pipelining is further described in U.S. patent application Ser. No. 136,930, (now U.S. Pat. No. 5,055,999), filed 22 Dec. 1987, for "Multiprocessor Digital Data Processing System," incorporated herein by reference, and which is set forth in Appendix A available in the patented file. Further description of the instructions discussed herein—including LOADS, STORES, MOVOUT, MOVB, FDIV and others—can be found in U.S. patent application Ser. No. 370,341 filed 22 Jun. 1989, incorporated herein by reference and set forth in Appendix C available in the patented file.

A processing cell constructed in accordance with the invention executes a sequence of instructions fetched from memory. The context of execution can be partially defined by the architecture, and partially defined by software. The architectural portion of the execution context can consist of a context address space, a privilege level, general registers, and a set of program counters. The context address space and privilege level determine what data in the memory system the instruction stream may reference. General registers, constructed in accordance with known engineering practice, are used for computation. These features are further described in U.S. Ser. No. 136,930, (now U.S. Pat. No. 5,055,999), incorporated herein by reference and set forth in Appendix A available in the patented file. The program counters define what portion of the instruction stream has already executed and what will be executed next, as described in greater detail hereinafter.

Two time units can be employed in specifying the timing of instructions. These units are referred to herein as "clocks" and "cycles," respectively. A clock is a unit of real-time which has duration defined by the system hardware. The processor performs an instruction fetch every cycle. A cycle takes one clock unless a "STALL" occurs, in which case a cycle takes some larger integral number of clocks. The execution of instructions is described in terms of cycles and is data-independent.

Pipeline STALLs can result from subcache and cache management overhead. Most LOAD and STORE operations will complete without a STALL; however, any LOAD, STORE, or memory control instruction may cause a STALL in order to allow the system to retrieve data from the local cache or from a remote cells. These delays are referred to herein as STALLs. During a STALL, the execution of other instructions does not proceed, and no new instructions are fetched. STALLs are not related to the instruction itself, but to the proximity of the related data. STALLs are measured in clocks and each STALL is an integral number of clocks. Even though a CEU might STALL while obtaining data from the local cache, the programming model (expressed in cycles) remains constant.

Figure 5A:
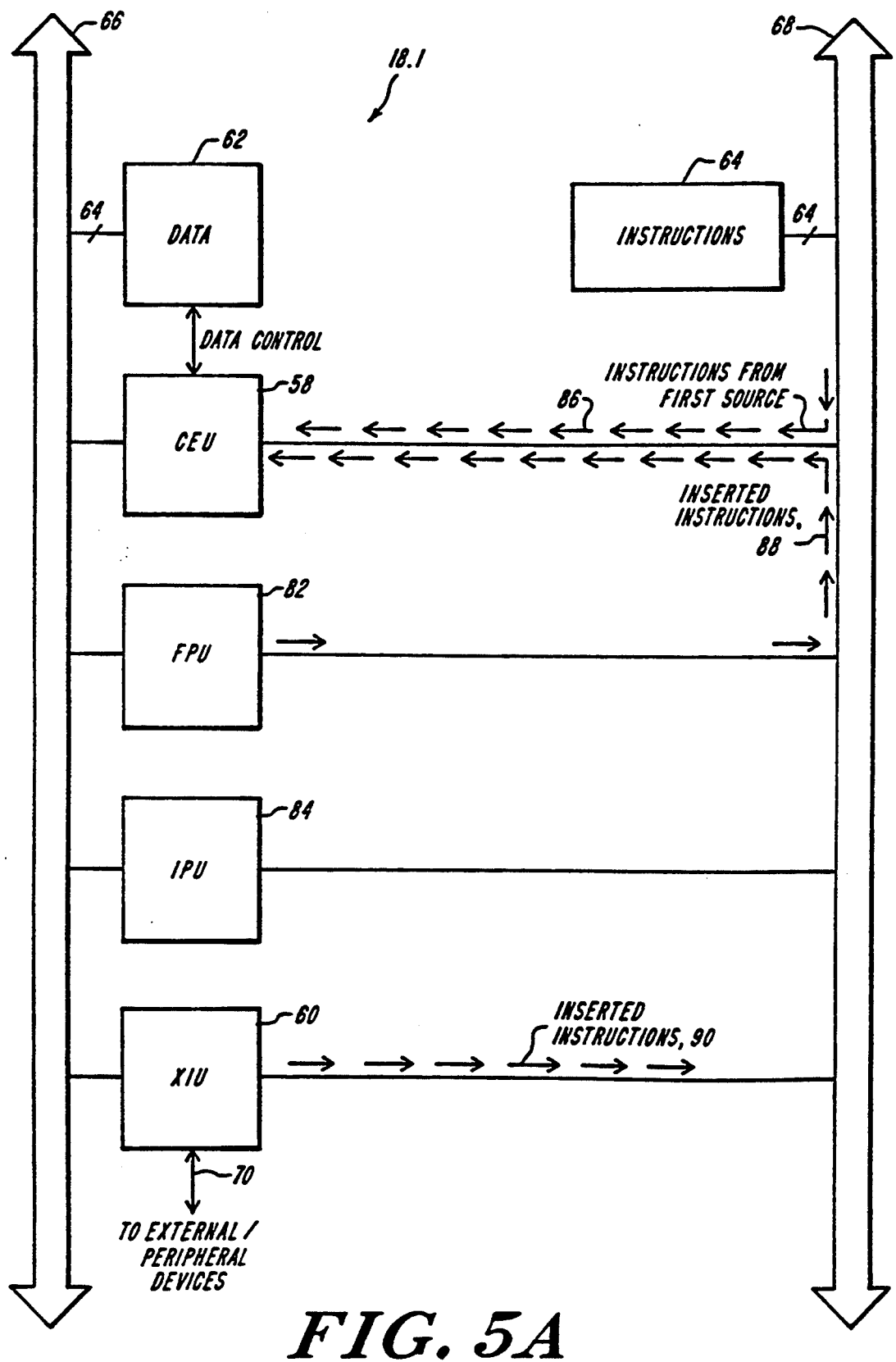

As shown in connection with the embodiments of FIGS. 5A–5C, a processing cell 18.1 in accordance with the invention can include four processing elements, also referred to herein as "functional units": the CEU 58, IPU 84, FPU 82 and XIU 60. While FIGS. 5A–5C illustrate a processing cell 18.1 having four processing elements, those skilled in the art will appreciate that the invention can be practiced in connection with a processing cell having more or fewer processing elements.

In particular, the CEU (Central Execution Unit) fetches all instructions, controls data FETCH and STORE (referred to herein as LOADS and STORES), controls instruction flow (branches), and does arithmetic required for address calculations. The IPU (Integer Processing Unit) executes integer arithmetic and logical instructions. The FPU (Floating point Processing Unit) executes floating point instructions. The XIU (external I/O Unit) is a co-execution unit which provides the interface to external devices. The XIU performs DMA (Direct Memory Access operations) and programmed I/O, and contains timer registers. It executes several instructions to control programmed I/O. The structure and operation of the XIU is further described in the Appendix available in the patented file.

Referring again to FIG. 5A, the processing cell 18.1 thus comprises a set of interconnected processors 58, 60, 82 and 84, including a CEU 58 for normally processing an instruction stream including instructions from the instruction cache 64. The flow of instructions from the instruction cache 64 is indicated in FIG. 5A by dashed lines 86.

As depicted in FIG. 5A, at least one of the processors—in the illustrated example, FPU 82 and XIU 60—can assert instructions, referred to herein as "inserted-instructions", which can be executed by the CEU 58. The flow of inserted-instructions from FPU 82 to CEU 58 is indicated in FIG. 5A by dashed lines 88. Analogously, the movement of inserted-instructions from XIU 60 to CEU 58 is denoted by dashed lines 90.

Moreover, these inserted-instructions can be executed by CEU 58 in the same manner as, and without affecting execution sequence of, the instructions from the instruction cache 64. Moreover, as further explained below, the inserted-instructions can have the same format as the instructions from the first instruction source, including a first set of digital instruction bits for specifying selected address signals, and a second set of digital instruction bits for specifying selected command signals. Inserted-instructions having this format can include cache management instructions inserted by the instruction cache 64 or by the cache control unit 74D depicted in FIG. 4.

While FIG. 5A depicts an instruction cache 64 as the source of instructions, alternatively, the source of instructions can be a processor or execution unit—including, under certain circumstances, the CEU 58—adapted for asserting signals to the instruction cache element to cause instructions to be transmitted from the instruction cache element to the CEU 58.

As discussed above, the processing cell 18.1 can include an instruction pipeline, comprising instruction bus 68, for interconnecting the processors and for carrying the instructions. The processors, in turn, can incorporate hardware and software elements for inserting the inserted-instructions into the instruction pipeline.

The XIU 60 depicted in FIG. 5A can incorporate input/output (I/O) modules for handling signals 70 received from, and transmitted to, peripheral devices, also referred to herein as external devices. These I/O modules can include direct memory access (DMA) elements, which respond to selected signals from a peripheral device, to insert DMA instructions which can be processed by the CEU 58 in the same manner as, and without affecting processing sequence of, the instructions from the first instruction source. These processing sequences are discussed in greater detail hereinafter. The XIU 60 can also include graphics controller circuits, constructed in accordance with known engineering practice, for controlling signals transmitted to a display device; or conventional text search elements for searching data structures representative of text.

Figure 5D:
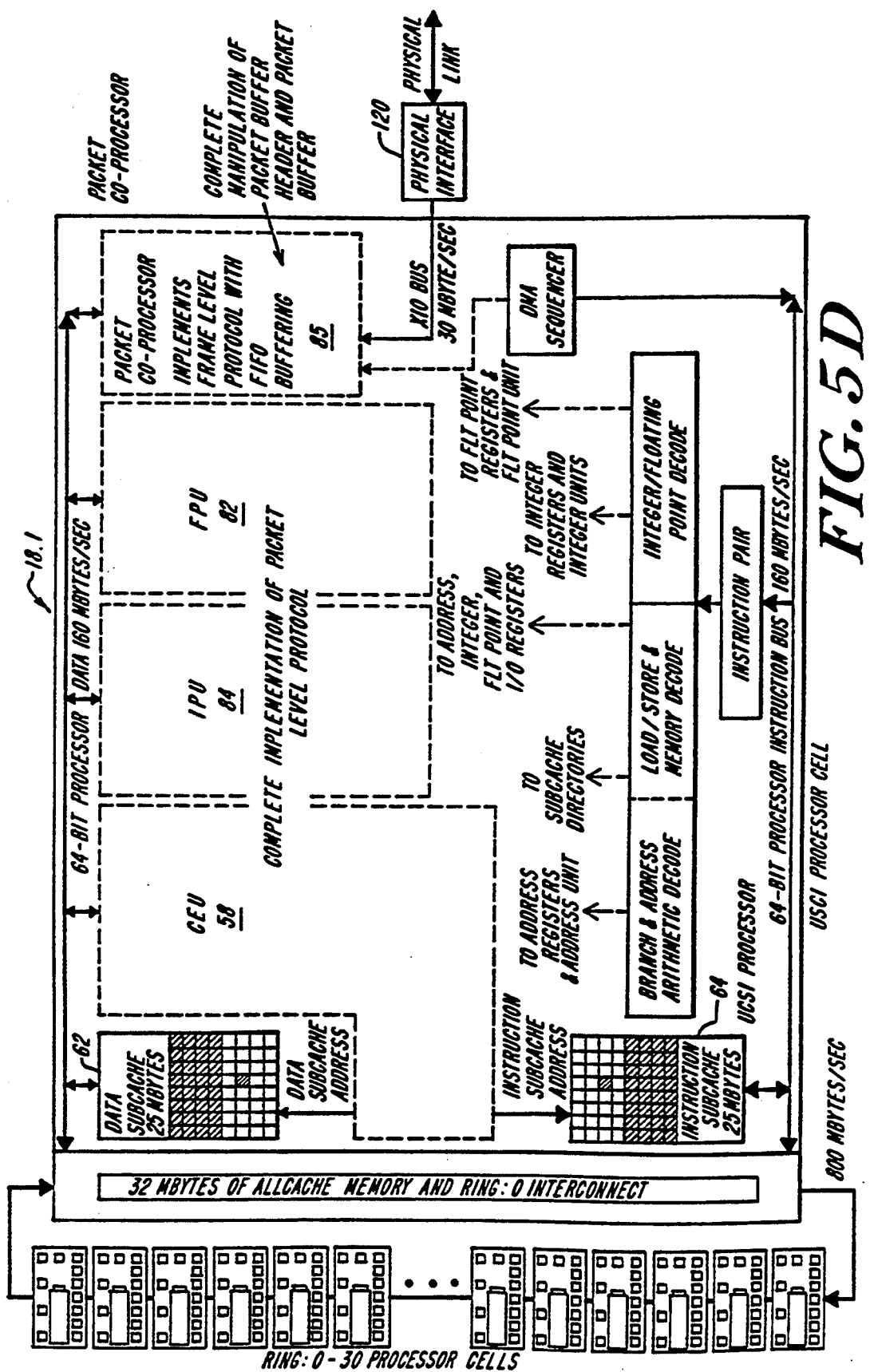
FIGS. 5D and 5E show detail of processing cells containing packet processing units (PSUs) in accord with the invention.
Figure 5E:
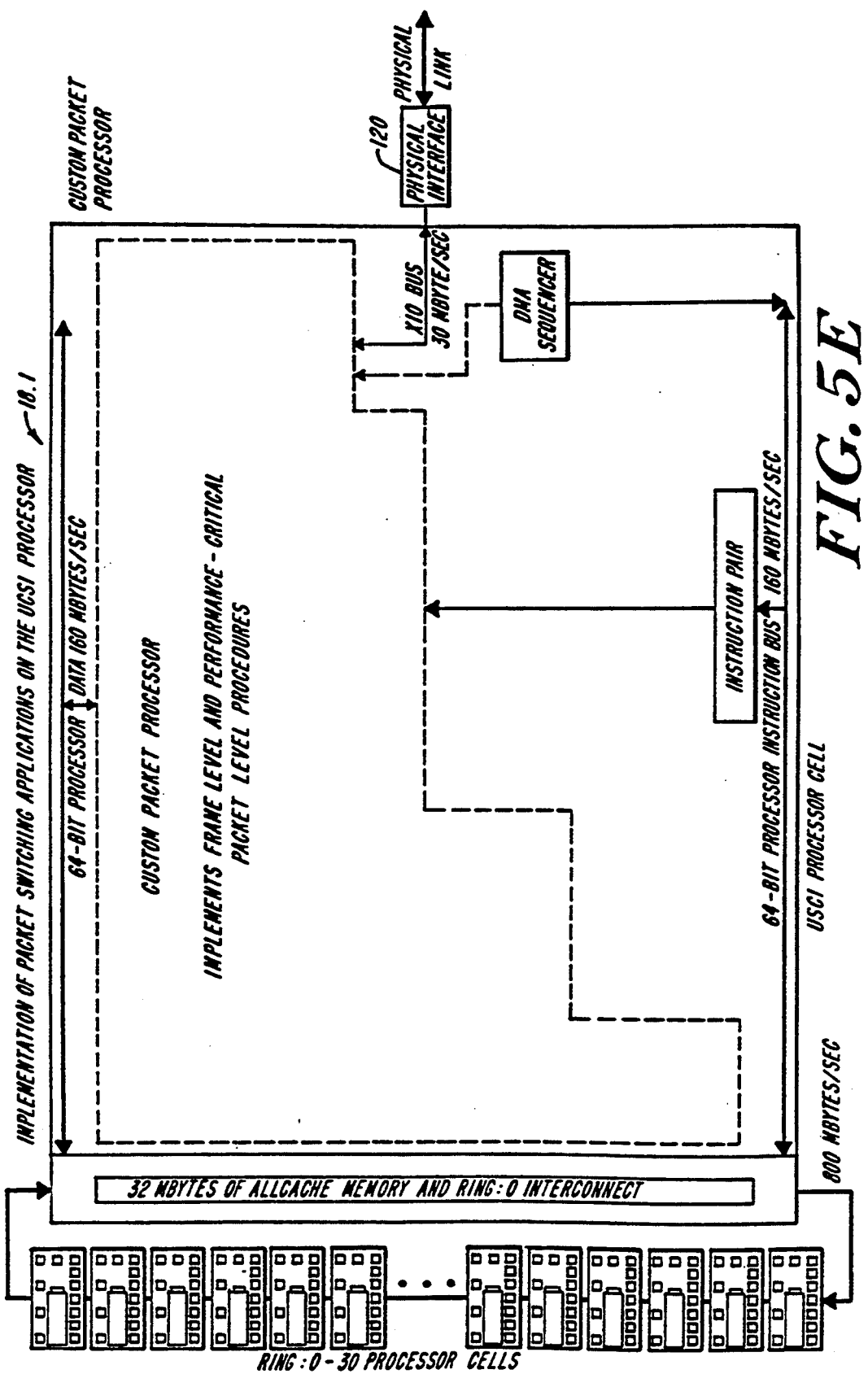

Alternatively, as illustrated in FIG. 5D, the XIU of FIGS. 5A–5C can be replaced by a special-purpose packet co-processor 85, discussed in greater detail hereinafter. Moreover, as FIG. 5E indicates, the four processors of FIGS. 5A–5C can be supplanted by a single packet processor that implements frame level and selected performance-critical packet level procedures.

Each processor 58, 60, 82, 84 depicted in FIGS. 5A and 5B can include registers for storing digital values representative of data and processor states, in a manner discussed in greater detail hereinafter. These registers are shown in FIG. 5C, along with computational units and other logic elements utilized in one practice of the invention. The inserted-instructions discussed above control movement of data into and out of these registers, and cause execution of selected logical operations on values stored in the registers.

Additional description of inserted-instruction processing is provided in U.S. patent application Ser. No. 370,325, filed 22 Jun. 1989, incorporated herein by reference and set forth in Appendix B available in the patented file.

Figure 6:
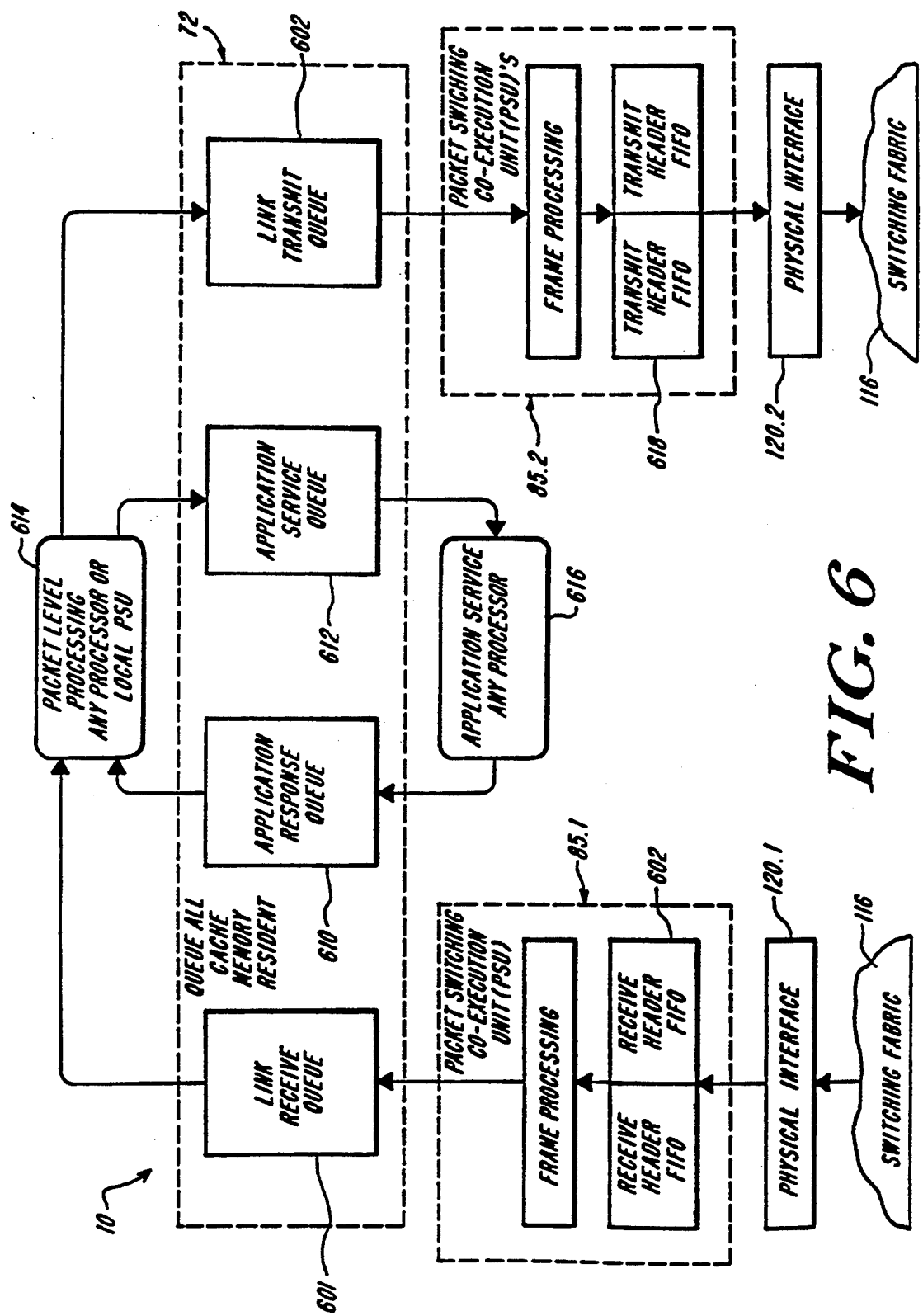
FIG. 6 depicts packet flow in the system of FIG. 2.

The operation of the packet co-processor 85 will next be described in connection with packet flow control, as illustrated in FIG. 6.

Packet Flow

In accord with the invention, all data structures required for packet switching control, including Receive Queues 601, Transmit Queues 602, application response queue 610 and application service queue 612, are resident in the cache memory units 72 associated with the in-cell processing units. This feature is indicated in FIG. 6, which also shows that one or more incoming and outgoing physical links are associated with each Packet Switching Co-Execution Unit (PSU) 85. One or more Receive Queues 601 are associated with each incoming link and one or more Transmit Queues 602 are associated with each outgoing link. Memory addresses are assigned to each queue on a segment basis.

Reception from Physical Interface: The physical receive interface 120.1 associated with the PSU 85.1 executes the conventional operations that constitute the remainder of the physical layer and a portion of the data link or frame layer illustrated in FIG. 2. Each frame or cell is received from physical interface 120.1 and delineated by the PSU 85.1. The packet or cell is then split into header and data portions, and stored in the PSU receive FIFO buffer 602. The received packet or cell is error checked, with the results stored with the header.

Receive Frame Level Processing: Referring again to FIG. 6, the PSU 85.1 associated with the physical link completes frame level processing and stores the received frame or cell into the Receive Queue 601. As indicated above, at least one cache memory-resident Receive Queue corresponds to each physical receive link. The PSU 85.1 utilized inserted-instruction sequences, discussed above in connection with FIG. 5A, to directly manipulate the Receive Queue 601.

Packet Level Processing: Because the Receive Queue 601 and Transmit Queue 602 data structures are completely resident in cache memory 72, any processor within the multiprocessor structure 10 can execute the packet (network) layer protocol. The packet is moved from the Receive Queue 601 to the appropriate Transmit Queue 602 based on memory-resident packet routing and flow control tables. These tables are discussed in copending U.S. patent application Ser. No. 07/136,930, now U.S. Pat. No. 5,055,999 filed 22 Dec. 1987, for "Multiprocessor Digital Data Processing System", incorporated herein by reference and set forth in Appendix A and available in the patented file.

Moreover, because most packets require no computational resources, in the typical case, the PSU associated with the physical receive link can directly execute the packet level protocol, transferring the packet directly from PSU to the appropriate Transmit Queue, and bypassing the Receive Queue. This is indicated at block 614 of FIG. 6. If more complex handling is required, the packet is left in the Receive Queue for packet processing by any processor, as indicated by block 614.

Packets can also be routed from a link Receive Queue 601 to an application service queue 612 for higher level processing. Examples of higher level processing are transactions, database queues, or computation, in accordance with an application program running on the multiprocessor structure 10. Higher level processing employs the same processor pool and cache memory as do packet switching operations. In the illustrated embodiment, packets generated by higher level processing are placed in a application completion queue 612. Packet level processing is performed on application-generated packets in a manner similar to that applied to packets from link Receive Queues.

Transmit Frame Level Processing: The PSU 85.2 associated with a physical transmit link performs frame level processing and moves the frame or cell into a PSU-resident transmit interface, including FIFO buffer 618, for transfer to the physical interface 120.2. One or more cache memory-resident Transmit Queues correspond to each physical transmit link. In a manner similar to that discussed above in connection with received packet processing, the transmitting PSU 85.2 uses inserted instruction sequences to directly manipulate the Transmit Queue.

Transmission to the Physical Interface: The PSU physical transmit interface 120.2 executes the remainder of frame level protocol and a portion of the operations that compose the physical link layer, in accordance with conventional ISO Reference Model practice. Each frame or cell is constructed from the header and data stored in the PSU transmit FIFO buffer 618, and the appropriate error checking code is generated in a known manner.

PSU Structure

Figure 7:
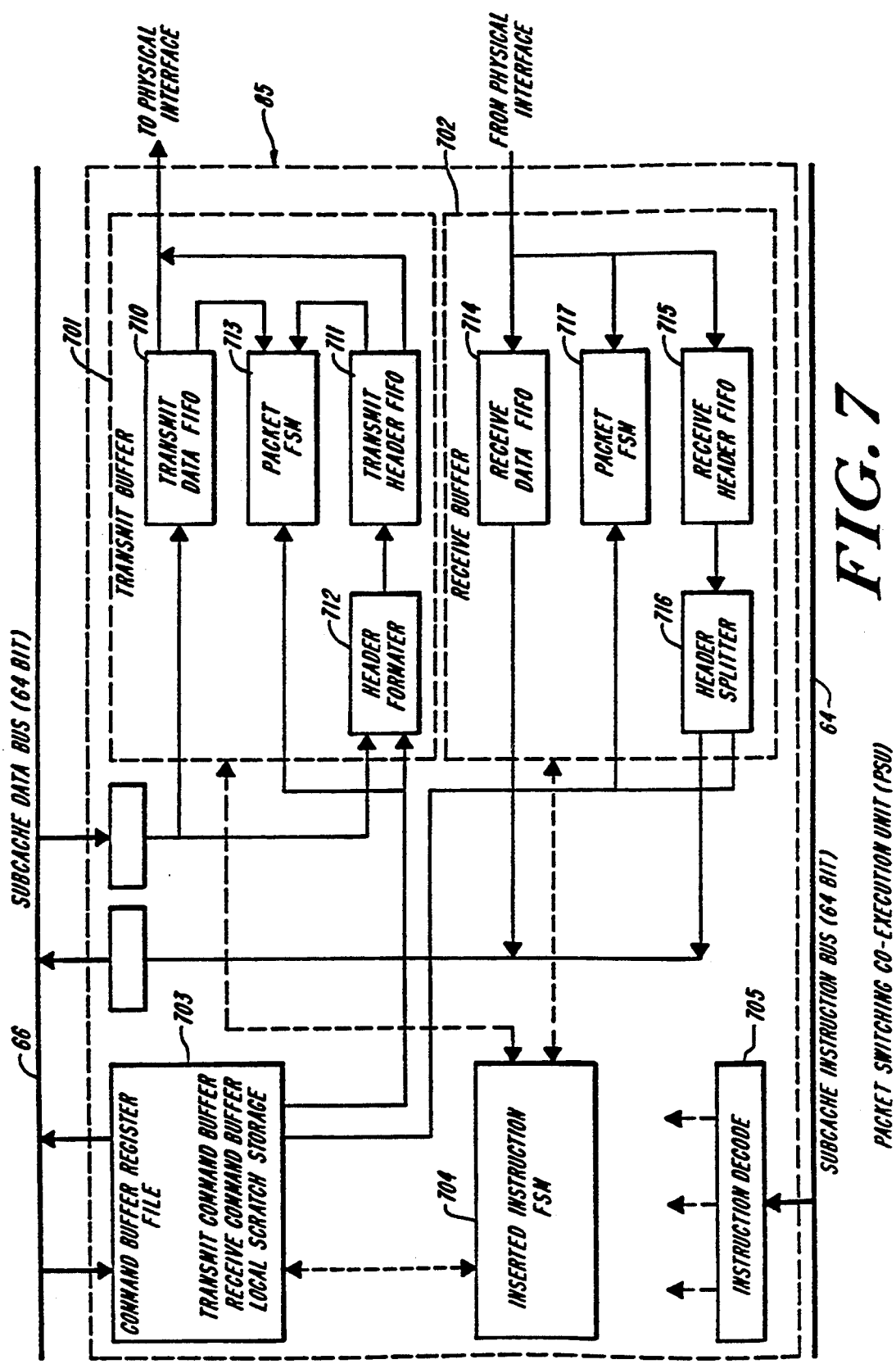
FIG. 7 provides detail of the PSUs of FIGS. 5D and 5E.

Organization: As shown in FIG. 7, the PSU consists of five major blocks: Transmit Buffer 701, Receive Buffer 702, Command Buffer Register File 703, Inserted-Instruction Functional State Machine (FSM) 704, and Instruction Decode Unit 705. This set of units can be divided into two groups: blocks associated with the physical interfaces, and blocks associated with the co-execution unit (CEU) interface or processor bus described above. In particular, the Transmit Buffer 701 and Receive Buffer 702 interconnect with the physical interface, and transfer packets to and from the physical interface. The Command Buffer Register File 703, Inserted Instruction State Machine 704 and the Instruction Decoder 705 are associated with the co-execution unit interface.

Transmit Buffer: The Transmit Buffer includes a Transmit Data FIFO 710, Transmit Head FIFO 711, Header Formatter 712 and Packet Functional State Machine 713. The Packet FSM coordinates the construction of the physical packet frame and cells within a frame from the contents of the Headar FIFO buffer and Data FIFO buffer. The Header and Data FIFO are previously loaded from the SVA cache by the Inserted Instruction State Machine. Further description of these elements is provided in co-pending U.S. patent application Ser. No. 07/136,930, (now U.S. Pat. No. 5,055,999); and Ser. No. 370,325, incorporated herein by reference and set forth in Appendices A and B, respectively, available in the patented file.

The Header Formatter 712 constructs the physical header, using conventional processes, based on the data structure fetched from cache, and responsive to TRANSMIT commands from the command buffer 703. The Packet FSM 713 constructs the outgoing frame or cell, by employing operations known in the digital processing field, based on the header contents and in response to TRANSMIT commands from the command buffer 703. The illustrated embodiment provides enhanced flexibility in the processing of packet formats and frame level protocols, by applying the TRANSMIT command to determine Header Formatter and Packet FSM operations. The Transmit Buffer also provides appropriate serialization and control signals for interfacing to the physical interface, in accordance with known engineering practice.

Receive Buffer: The Receive Buffer 702 comprises a Receive Data FIFO 714, Receive Header FIFO 715, Header Splitter 716 and Packet FSM 717. The Packet FSM 717 operates in accordance with known digital signal processing principles to coordinate the reception and splitting of the packet frame, or signal cell within a frame, into header and data portions, for placement into Header FIFO 715 and Data FIFO 714, respectively. The RECEIVE command from the command buffer 703 is used by the Packet FSM 717 to appropriately split the header and data portions of the frame or cell.

The Header Splitter 716 reformats the header into the data structure to be stored into SVA cache, based on the RECEIVE command from the command buffer. As with the Transmit Buffer, flexibility in the packet format and frame level protocol is achieved by having the Header Splitter and Packet FSM operation controlled by the RECEIVE command. The Receive Buffer 702 also provides the appropriate parallelization of packet and control signals for interfacing to the physical interface.

Command Buffer: The Command Buffer 703 is a multiport PSU—resident memory device that holds RECEIVE and TRANSMIT commands and provides temporary on-chip storage for portions of cache memory-resident data structures. Pointers to active entries of cache memory-resident queues are separately maintained for Receive and Transmit Buffers.

In the illustrated embodiment, the command buffer comprises three READ ports and two WRITE ports. Two READ ports are allocated for the current TRANSMIT command for the Transmit Buffer 701, and for the current RECEIVE command for the Receive Buffer 702. The first WRITE port allows the Transmit Packet FSM 713 or Receive Packet FSM 717 to update Command Buffer status. The third READ port is coupled to the data bus for storing command Buffer contents directly into cache memory. The second WRITE port interfaces to the data bus for receiving accessed contents of cache memory and storing data into Command Buffer.

IISM: The Inserted Instruction State Machine (IISM) 704 generates the instructions required to store frames or cells from the Receive Buffer 702 into cache memory-based queues. The IISM 704 also generates the instructions required to load frames or cells from cache memory-based queues into the Transmit Buffer.

Additionally, the IISM 704 generates the instructions required to manipulate the cache memory-based queue structures. These operations include updating pointers within queue entries, generating instructions for atomic update of queue data structures—including GET, GETW and RELEASE commands, generating instructions to PREFETCH queue entries which will be required in the near future, and POSTSTORING queue entries for which copies will be required by other cells in the near future. The PREFETCH instructions, as well as certain LOAD and STORE instructions, permit programs to request that their local cache acquired read-only, non-exclusive, or exclusive state. The PREFETCH SUBPAGE command, for example, requests that a copy of a subpage be acquired on the local cache in a specified state. PREFETCH SUBPAGE specifies whether or not the subpage should be prefetched into the processor's instruction or data subcache. A subsequent load for the subpage blocks until the PREFETCH SUBPAGE has completed.

The POST STORE SUBPAGE or PSTSP instruction causes the local cache to broadcast a read-only copy of a subpage through the ring if the subpage state is Exclusive. Each cell whose cache contains a descriptor for the page containing the subpage acquires a read-only copy of the subpage. PSTSP operates in accordance with the following steps:

1. The processor passes the subpage address and PSTSP request to the local cache.

2. The local cache issues an OK response to the processor, and processor execution proceeds.

3. If the subpage state is exclusive and if the subpage address specified by PSTSP does not match a pending ring request, then a. The local cache issues an XCACHE.RO subcache invalidation request to the processor if the subpage is subcached. The processor responds to the invalidation request by passing data to the local cache if the subblocks are modified; and b. The local cache broadcasts a read-only copy of the subpage on the ring.

4. Otherwise, the PSTSP is not executed.

The PSTSP instruction initiates a duplicate packet process. Duplicate data packets are forwarded from the originating RING:0 based on DUPLIMIT. If DUP:-CONDFORWARD applies, duplicate packets are conditionally forwarded by RRC:0 to Ring:1, if the page is not exclusively owned by the local Ring:0. If DUP:-ALLFORWARD applies, duplicate packets are always forwarded by RRC:0 to Ring:1. Ring:1 duplicate data packets are copied by a remote RRC:1 when it has a descriptor allocated for the corresponding page within its local Ring:0 and the Extract Buffer is in the EXTBUF:ALL region.

These commands, including PREFETCH and POSTSTORE, are described in greater detail in Ser. No. 07/136,930 (now U.S. Pat. No. 5,055,999), and Ser. No. 370,287, incorporated herein by reference and set forth in Appendices A and C, respectively, available in the patented file.

Instruction Decode: The Instruction Decode block 705 decodes instructions to be executed by the PSU, and enables the PSU 85 to track the instruction pipeline. Instructions to be executed by the PSU can be instructions fetched from the instruction subcache (FIG. 5A) or inserted-instructions inserted by the PSU or other co-execution units.

PSU Operations

The PSU performs three basic cache memory queue manipulations. The examples shown in FIGS. 8, 9, and 10 employ a basic single link list queue structure, but those skilled in the art will appreciate that various arbitrary queue structures can be implemented, and are within the scope of the invention. Queue entries that are shared and modified by the sequence are LOCKED and UNLOCKED during directly by the PSU through inserted GET, GETW and RELEASE instructions that are executed by the local cache. Queue entries are LOCKED using GET or GETW to set atomic state at the start of the sequence. Queue entries are UNLOCKED at the end of the sequence by the RELEASE instruction. These instructions are described in greater detail in Ser. No. 07/136,930 (now U.S. Pat. No. 5,055,999), and Ser. No. 370,287, incorporated herein by reference and set forth in Appendices A and C, respectively, available in the patented file.

Figure 8:
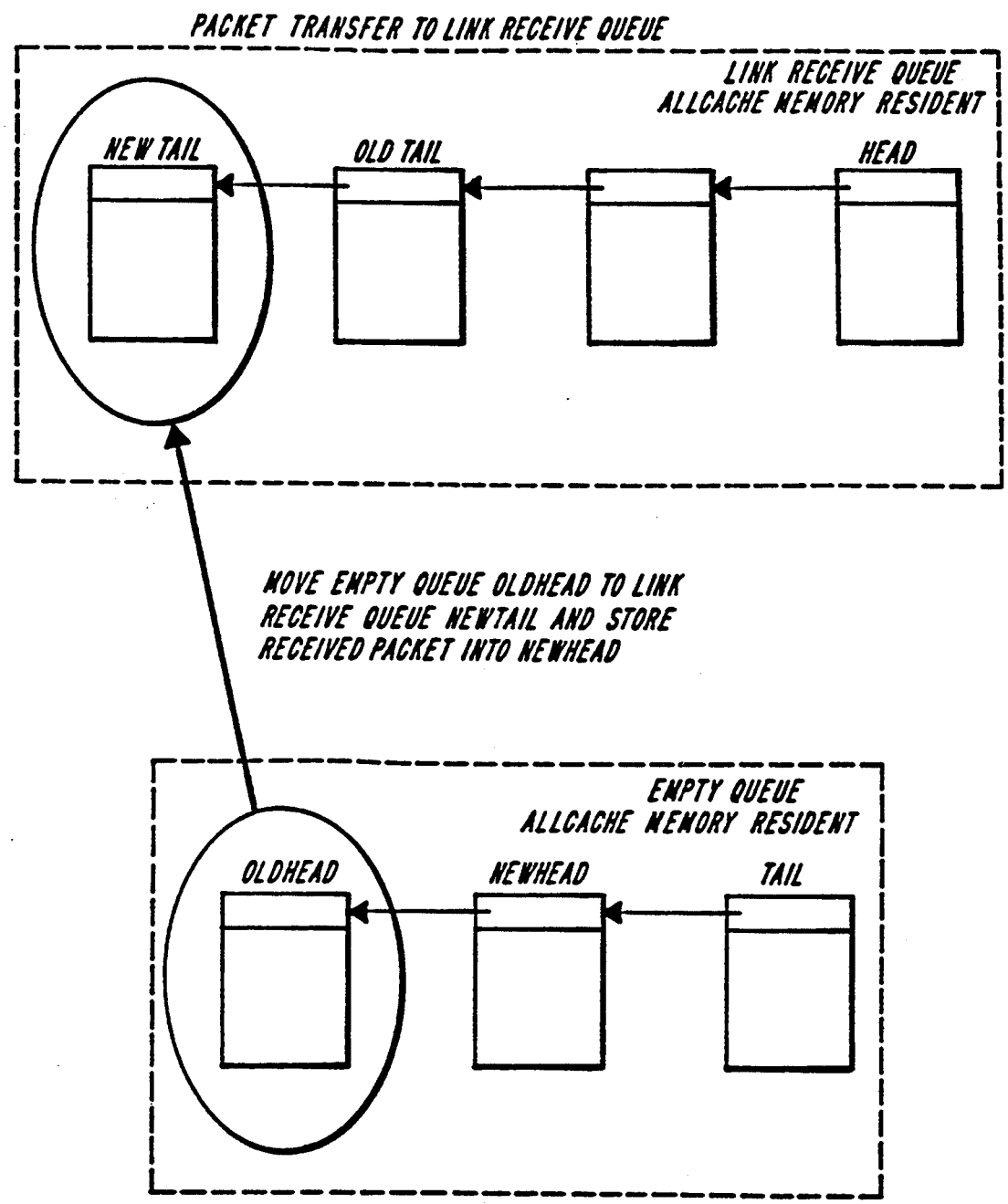
FIG. 8 depicts packet transfer to the receive queue in the PSU of FIG. 7.

Packet Transfer to the Receive Queue: FIG. 8 depicts the sequence executed by the PSU 85 to transfer a received packet from PSU internal receive FIFO into a cache memory-based Receive Queue. The old header (OLDHEAD) from the empty queue is moved to become the new tail (NEWTAIL) entry of the link Receive Queue; and the received frame or cell is stored into the entry. The sequence involves the following four steps:

1. The PSU updates the empty queue head pointer from the address of OLDHEAD to address of NEWHEAD.

2. The PSU updates—using STORE INSERTED-INSTRUCTION—the link receive-queue OLDTAIL entry forward-pointer to the address of the entry just removed from the empty entry queue. This now becomes the NEWTAIL entry.

3. The PSU prefetches—using PREFETCH INSERTED-INSTRUCTION—the empty entry queue NEWHEAD entry.

4. The PSU stores—STORE INSERTED-INSTRUCTION frame or cell data and header into the link Receive Queue NEWTAIL entry.

Figure 9:
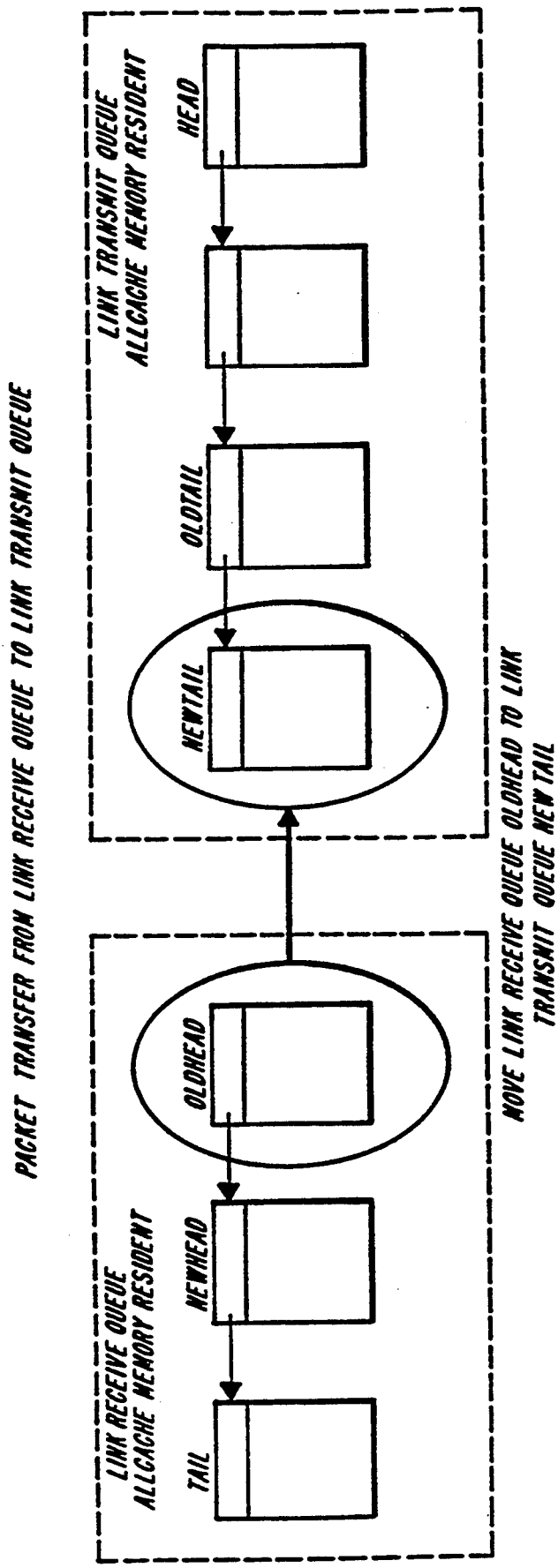
FIG. 9 shows packet transfer to the transmit queue.
Figure 10:
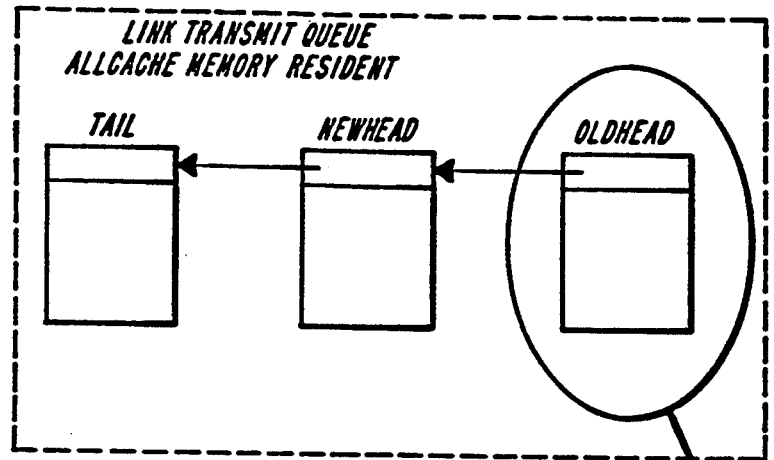
FIG. 10 depicts transfer of packets from the transmit queue to the transmit FIFO buffer.
Figure 10:
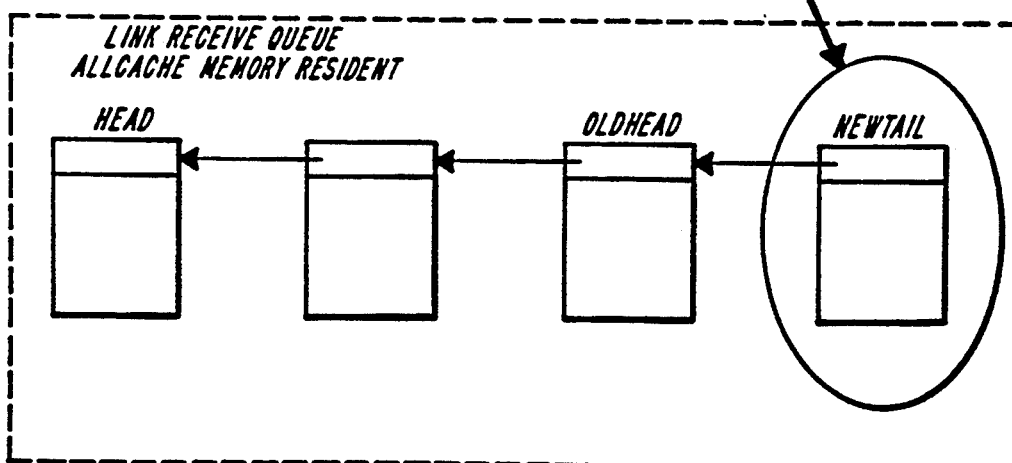
Figure 11C:
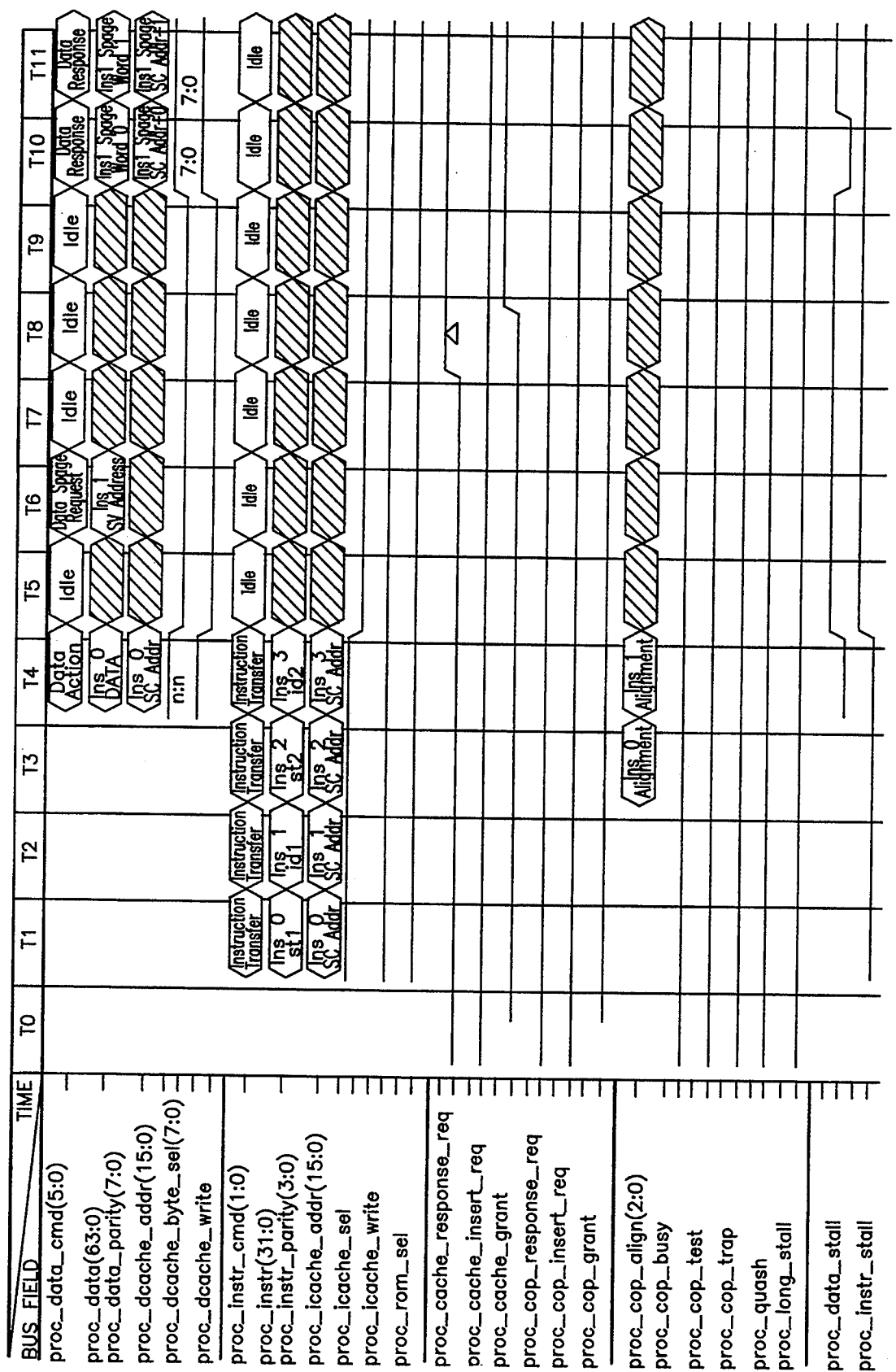
Figures 1, 11C:
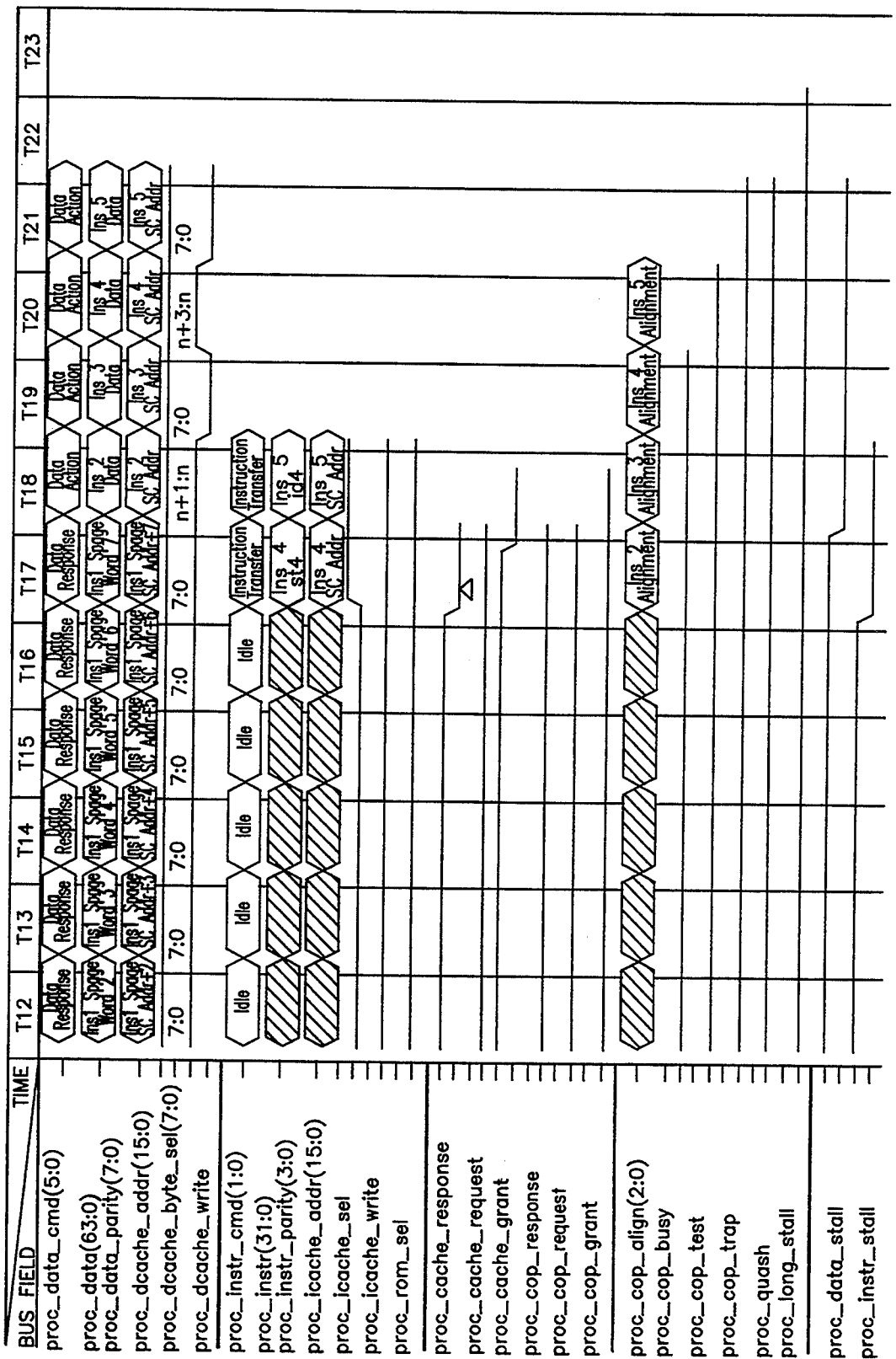
Figure 11D:
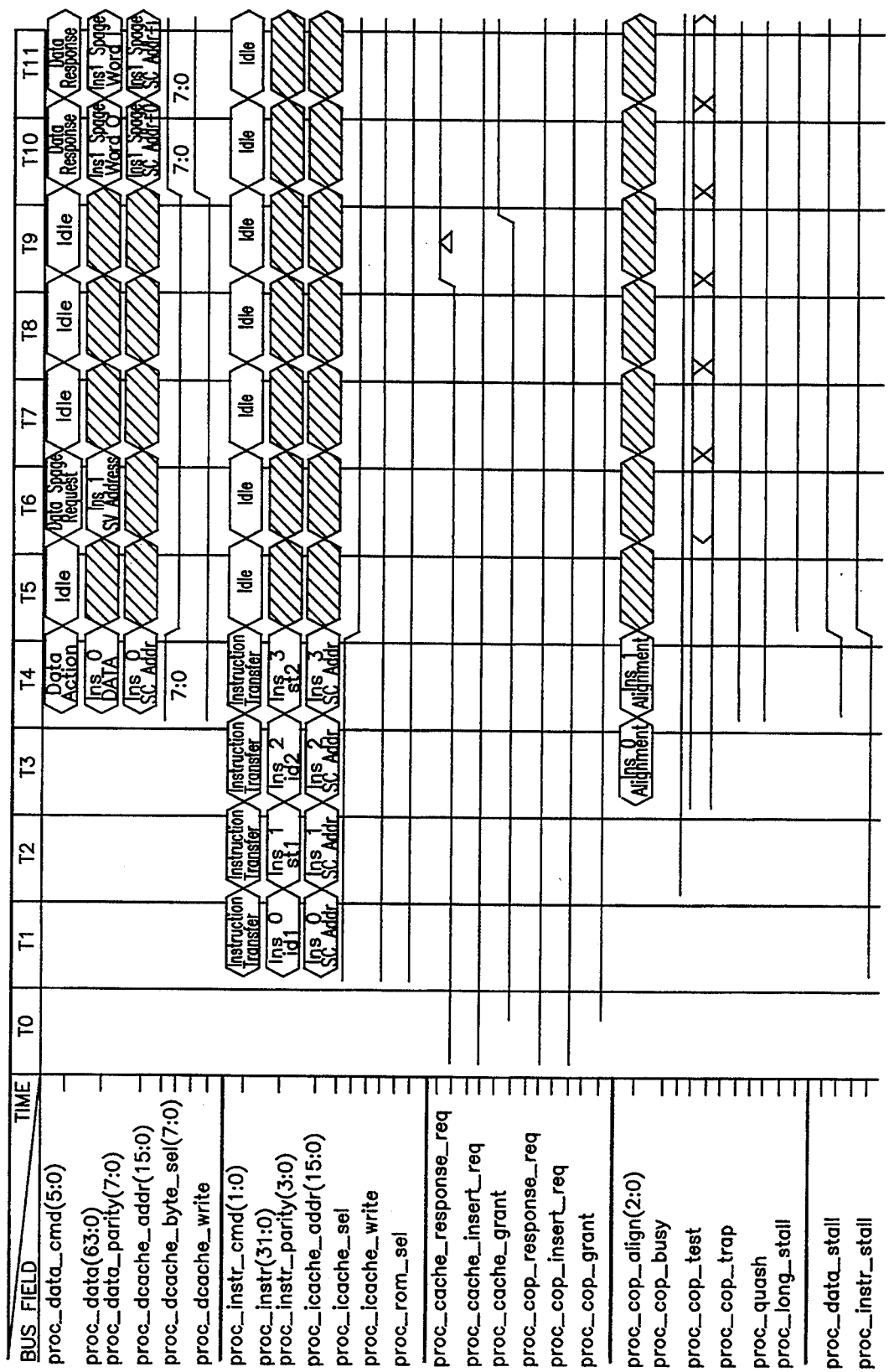
Figures 1, 11D:
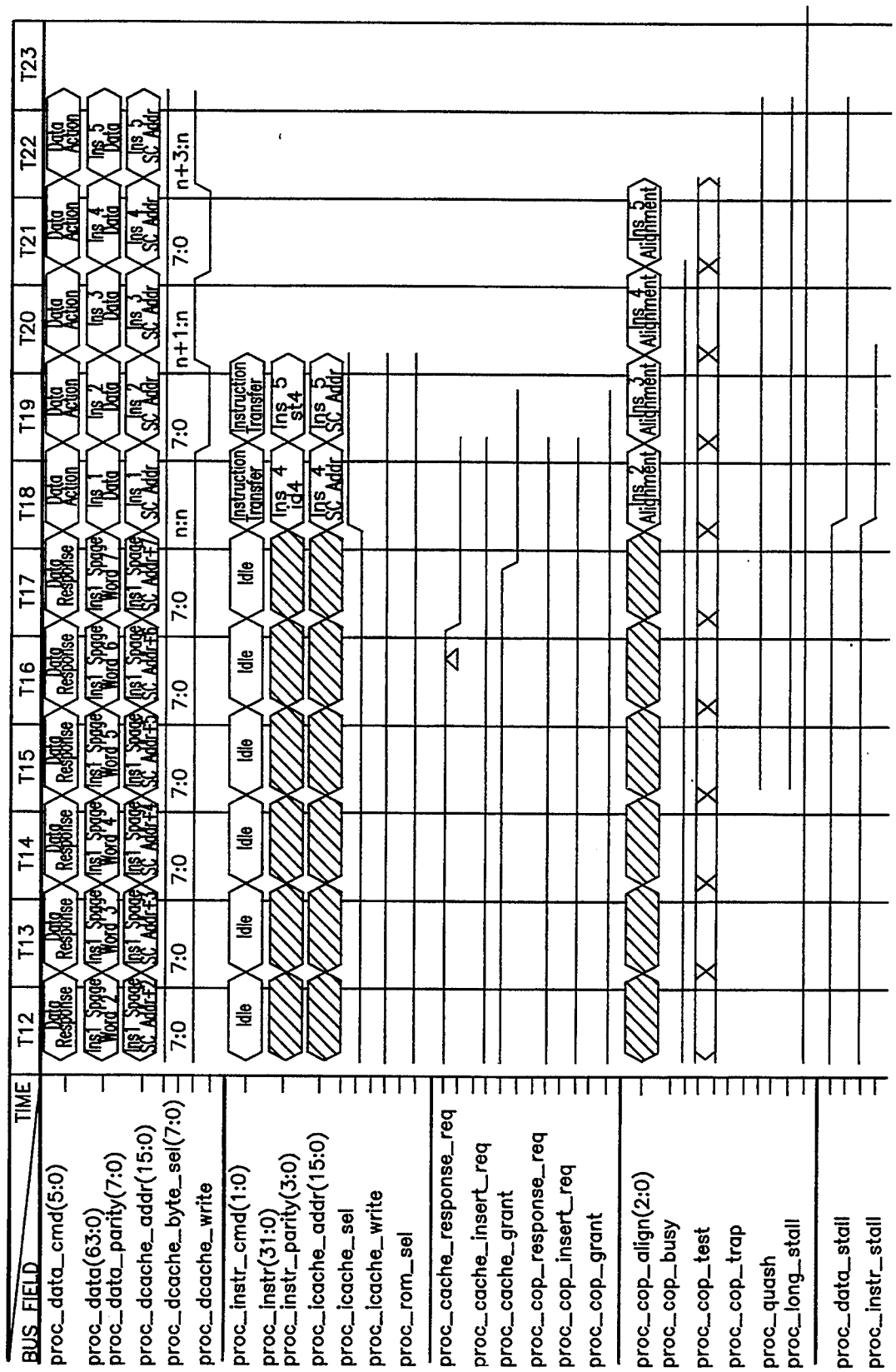
Figure 11E:
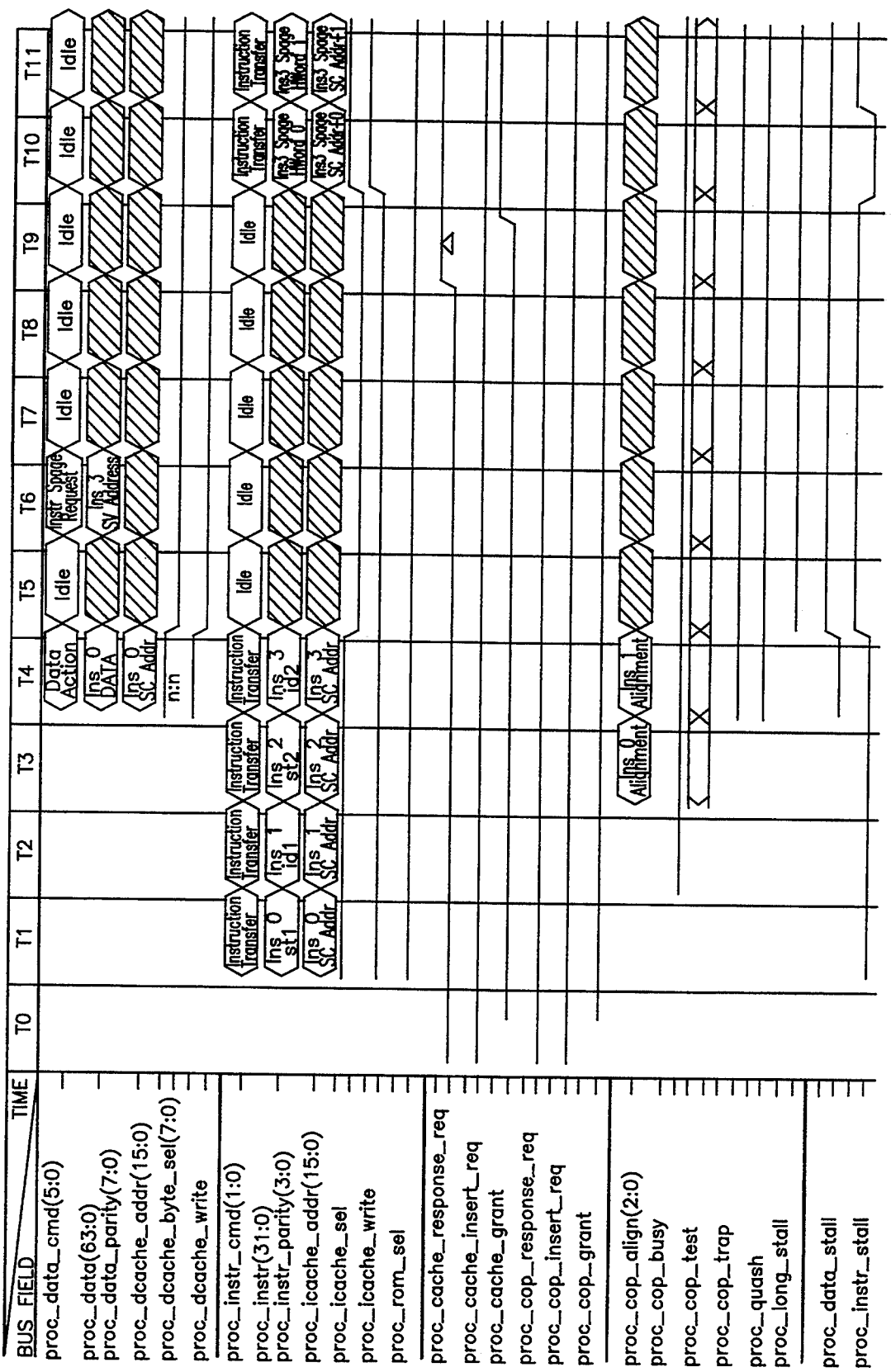
Figures 1, 11E:
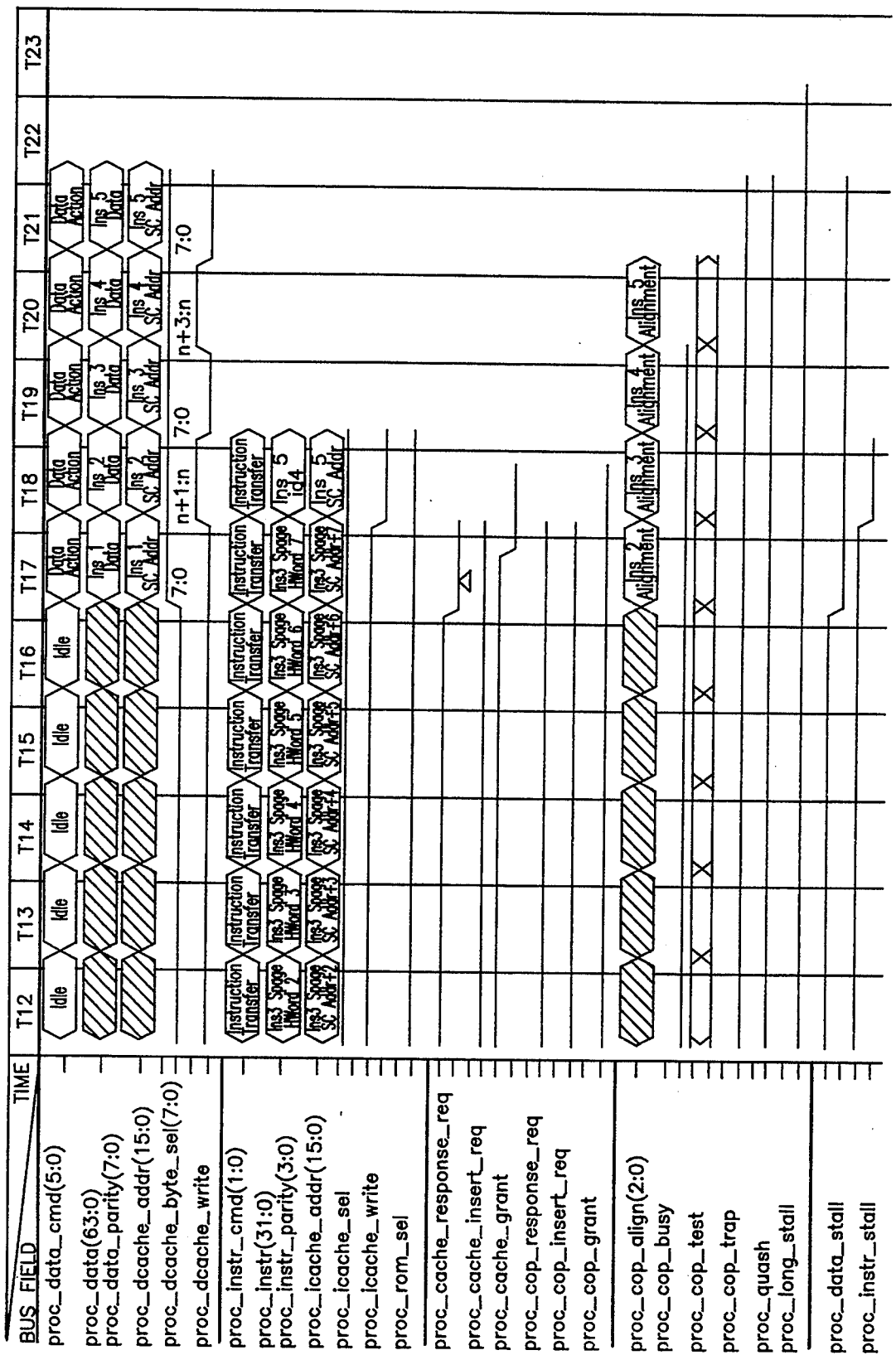
Figure 11F:
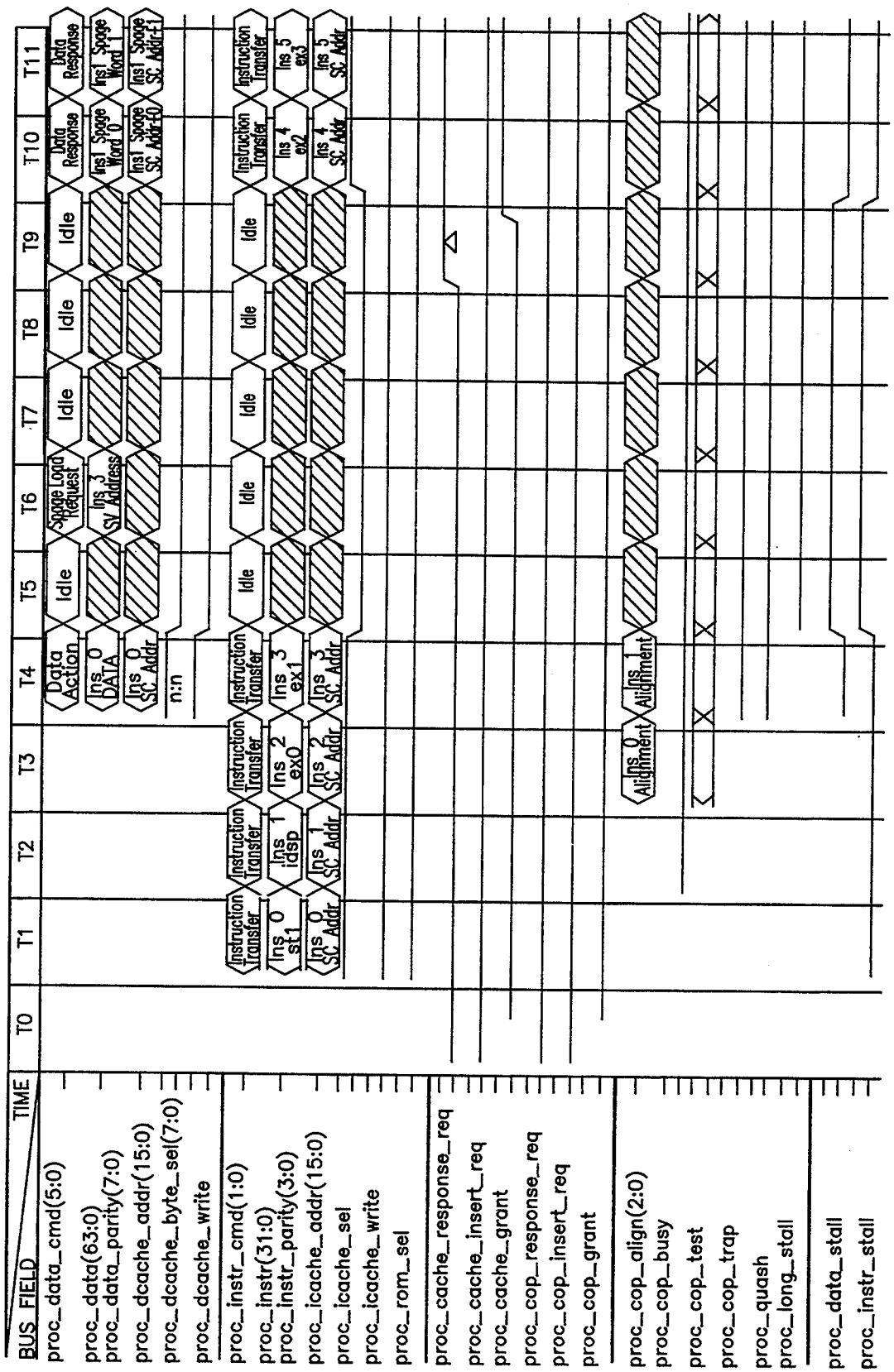
Figures 1, 11F:
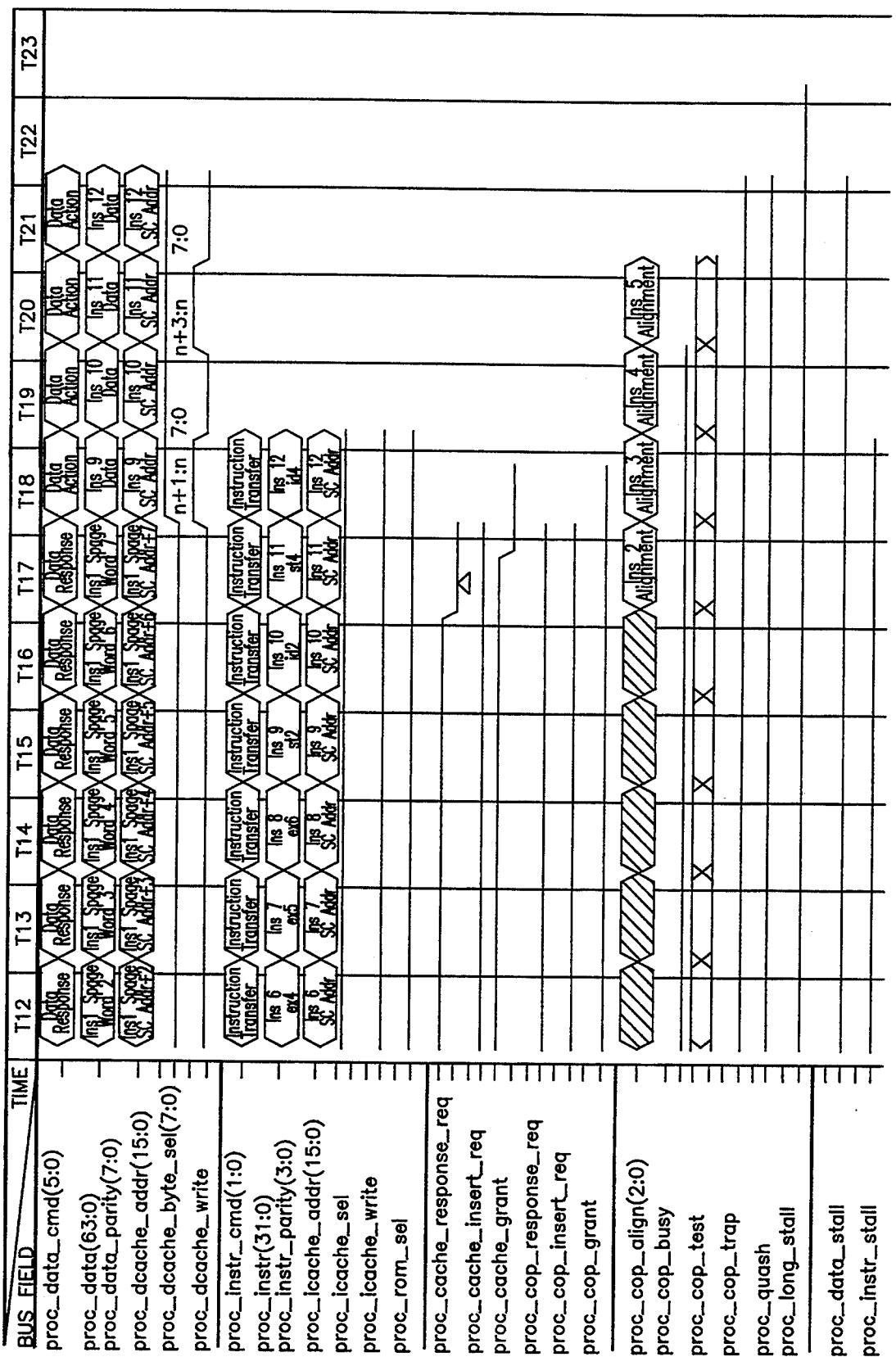
Figure 11G:
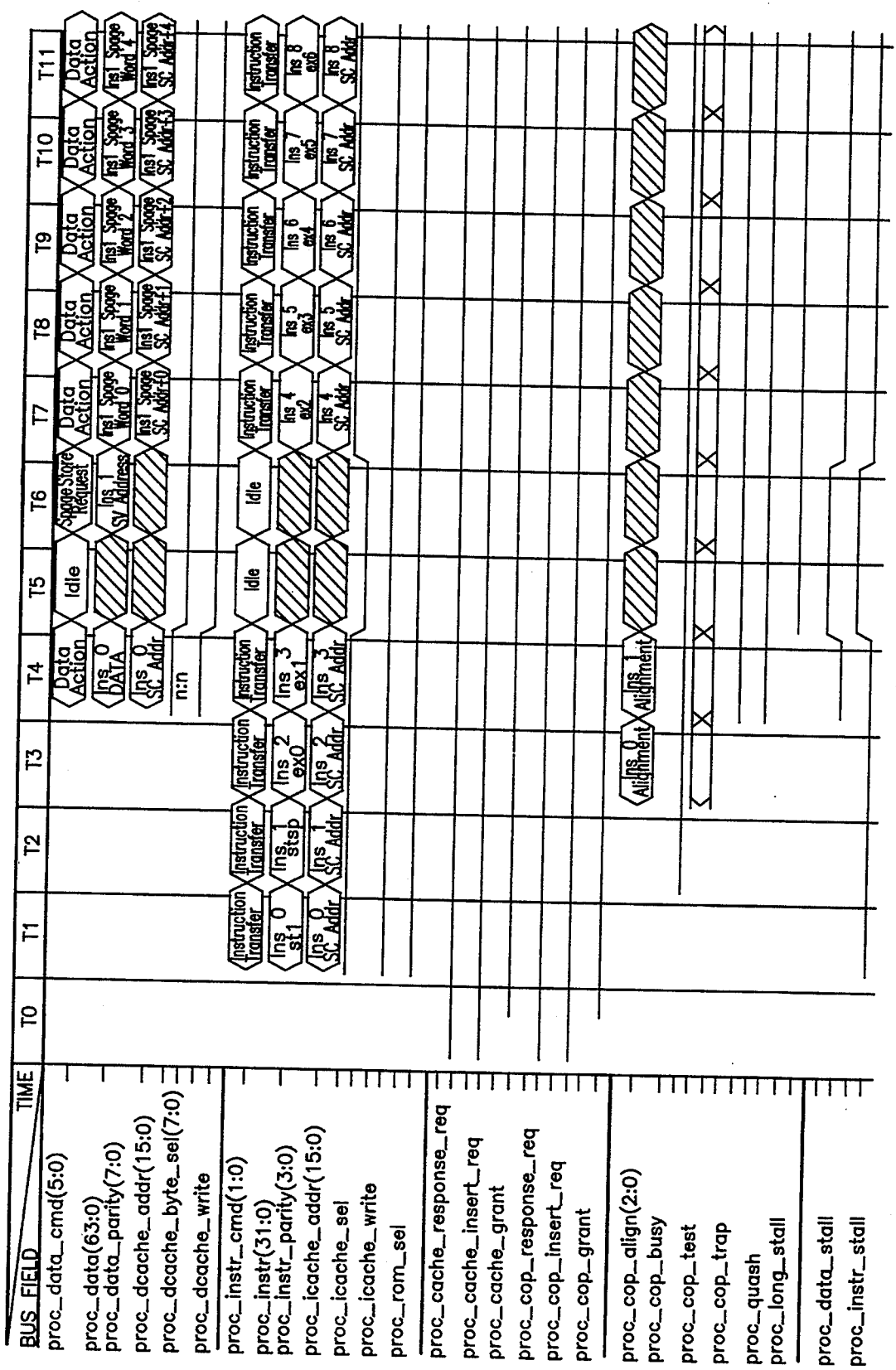
Figures 1, 11G:
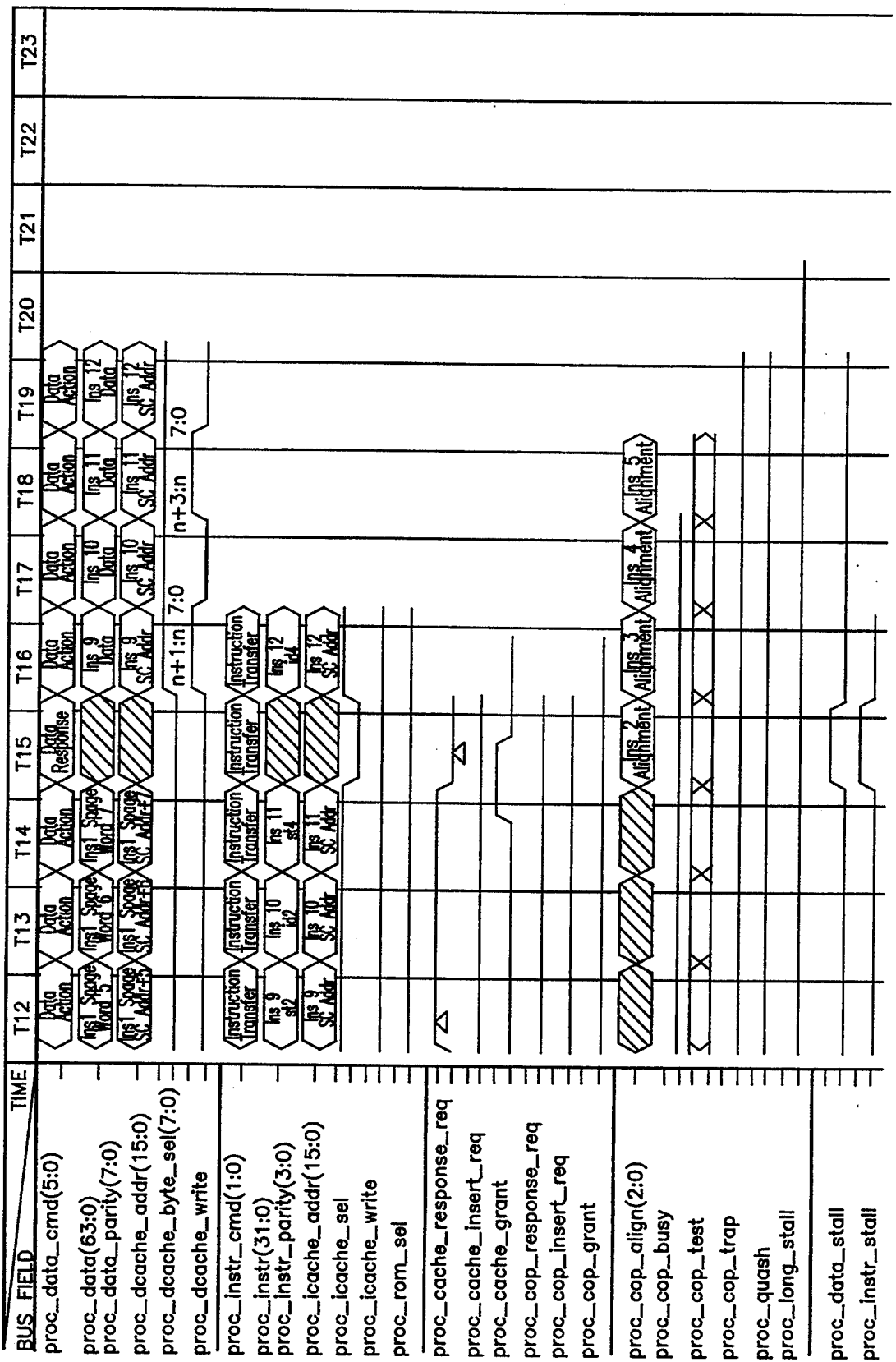
Figure 11H:
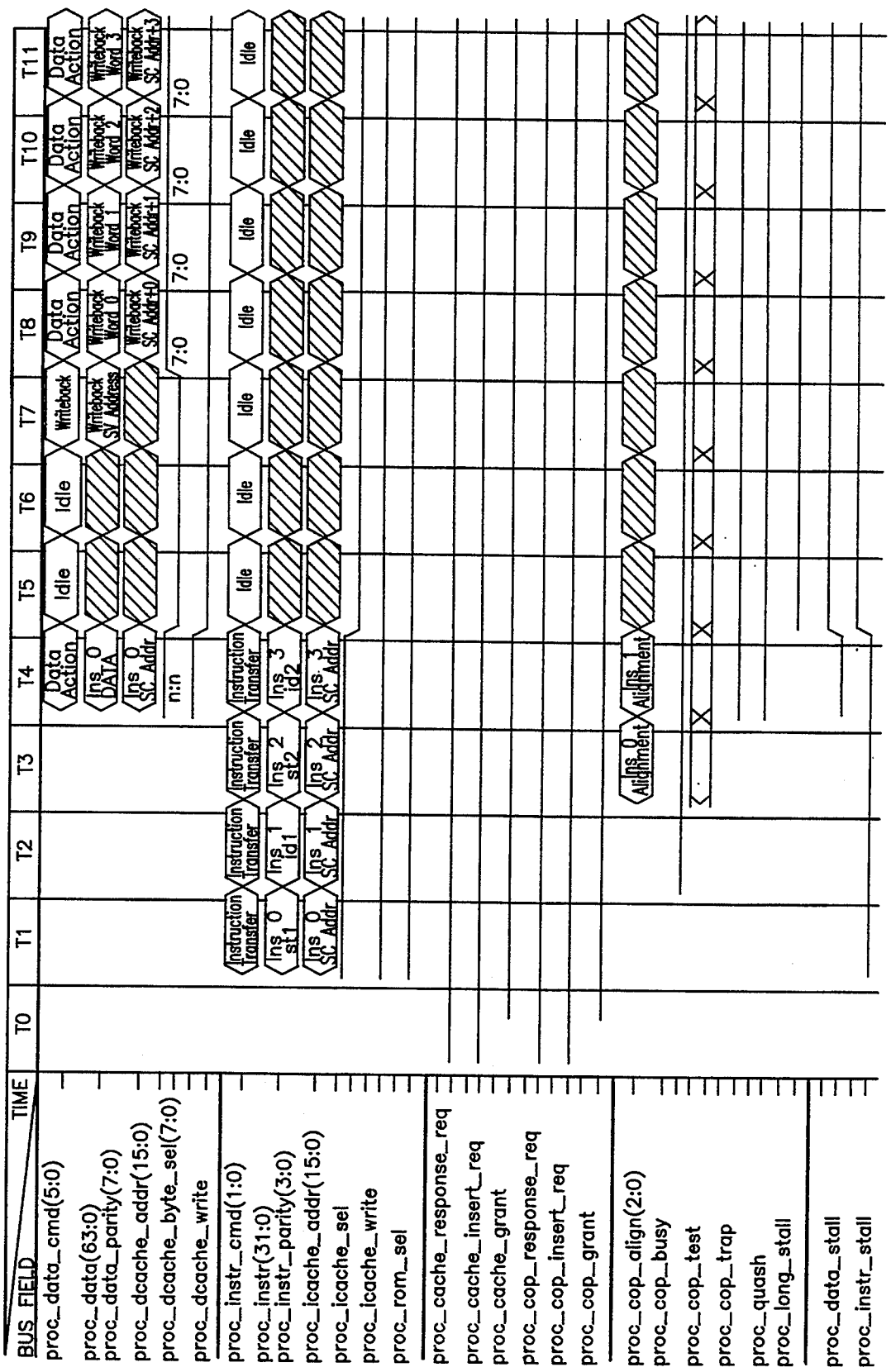
Figures 1, 11H:
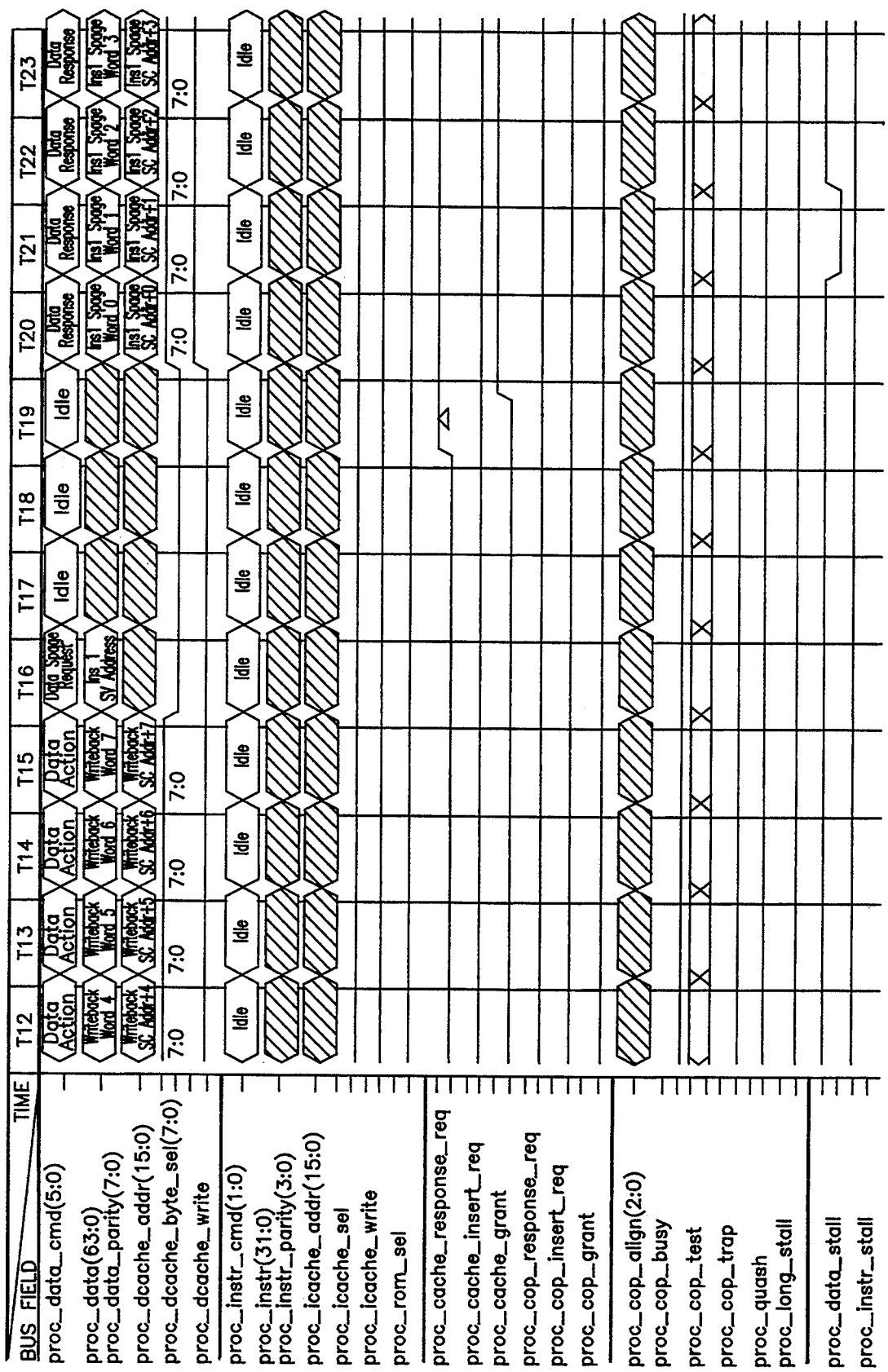
Figures 2, 11H:
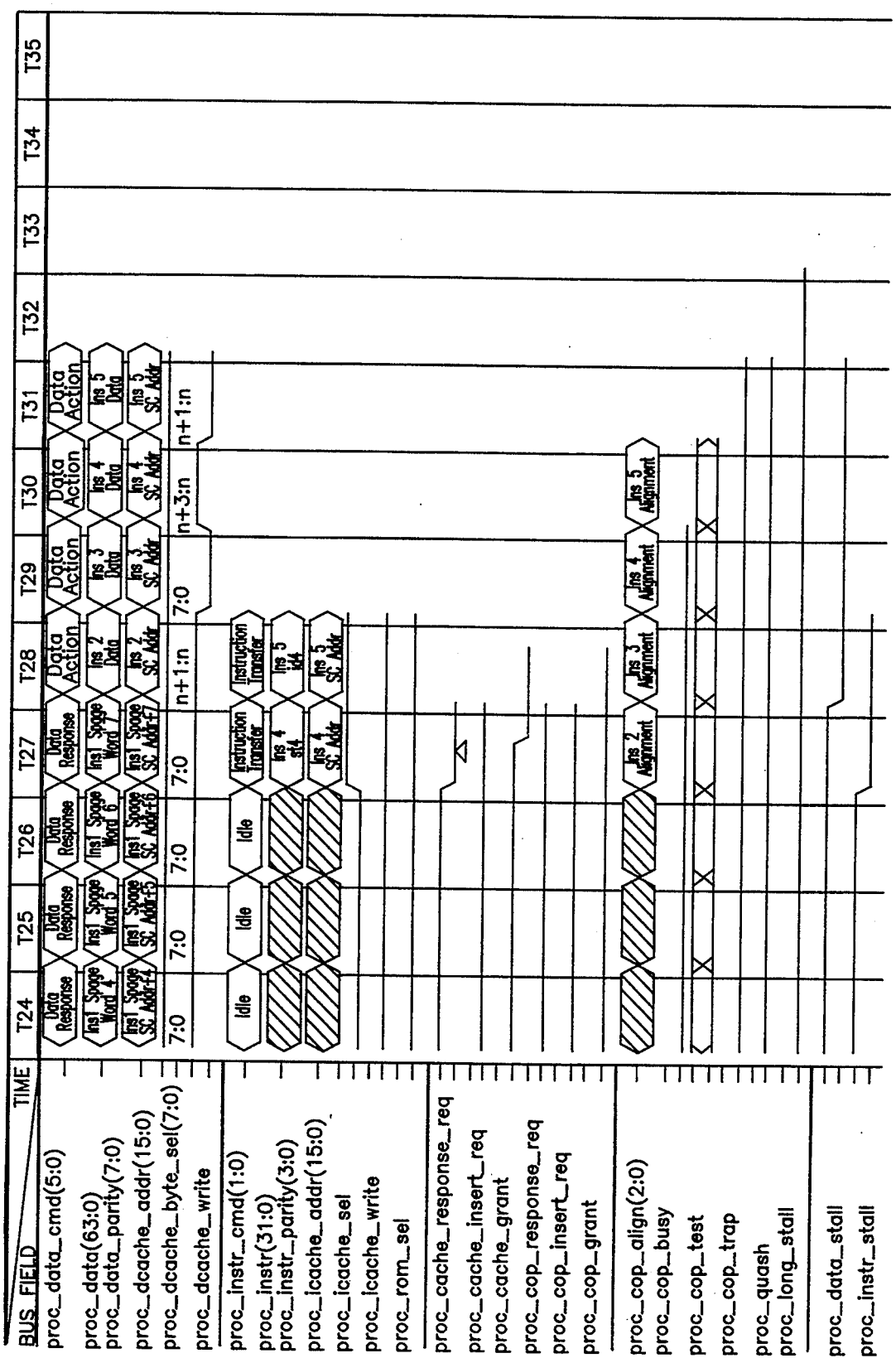
Figure 11I:
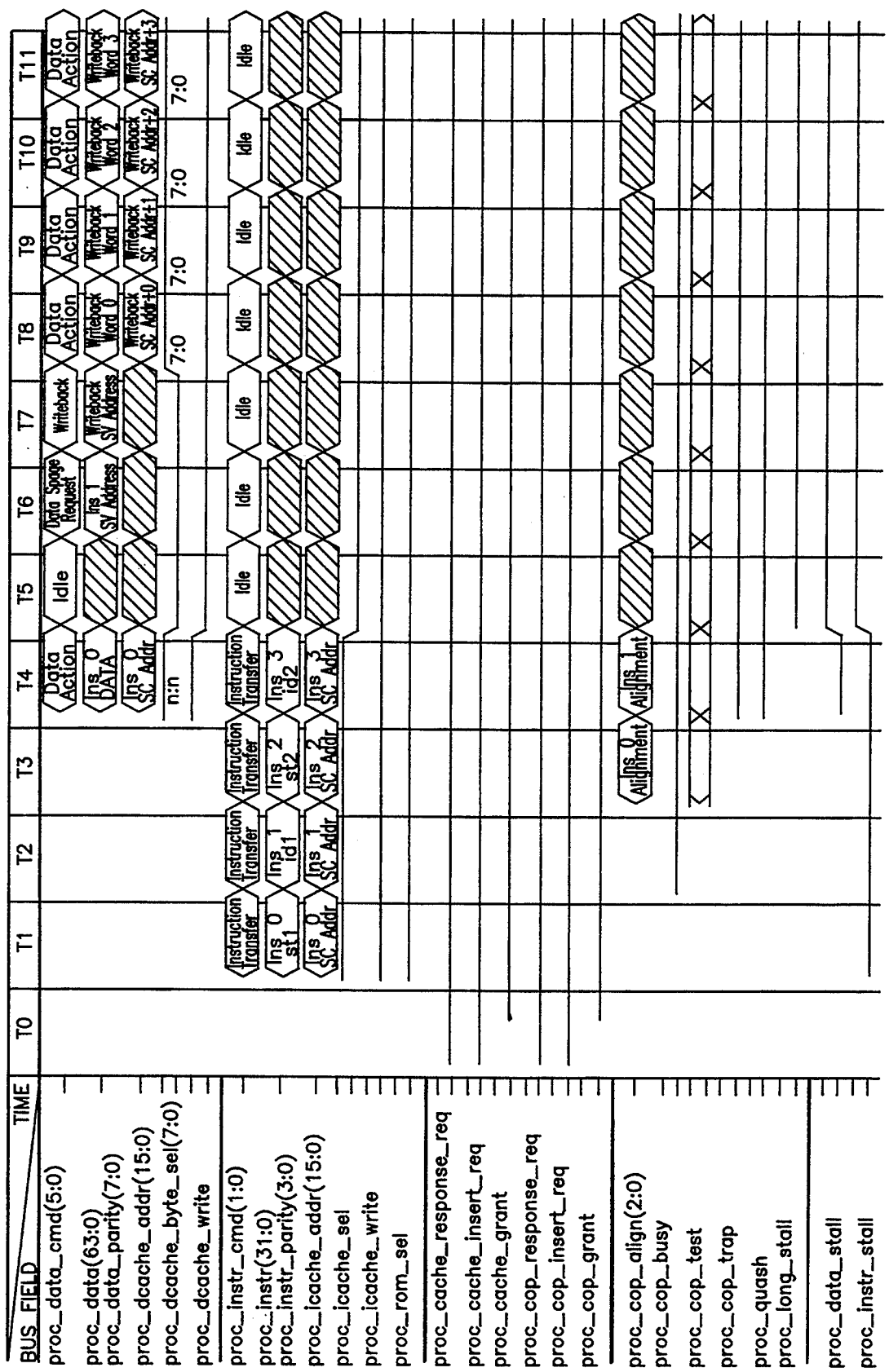
Figures 2, 11I:
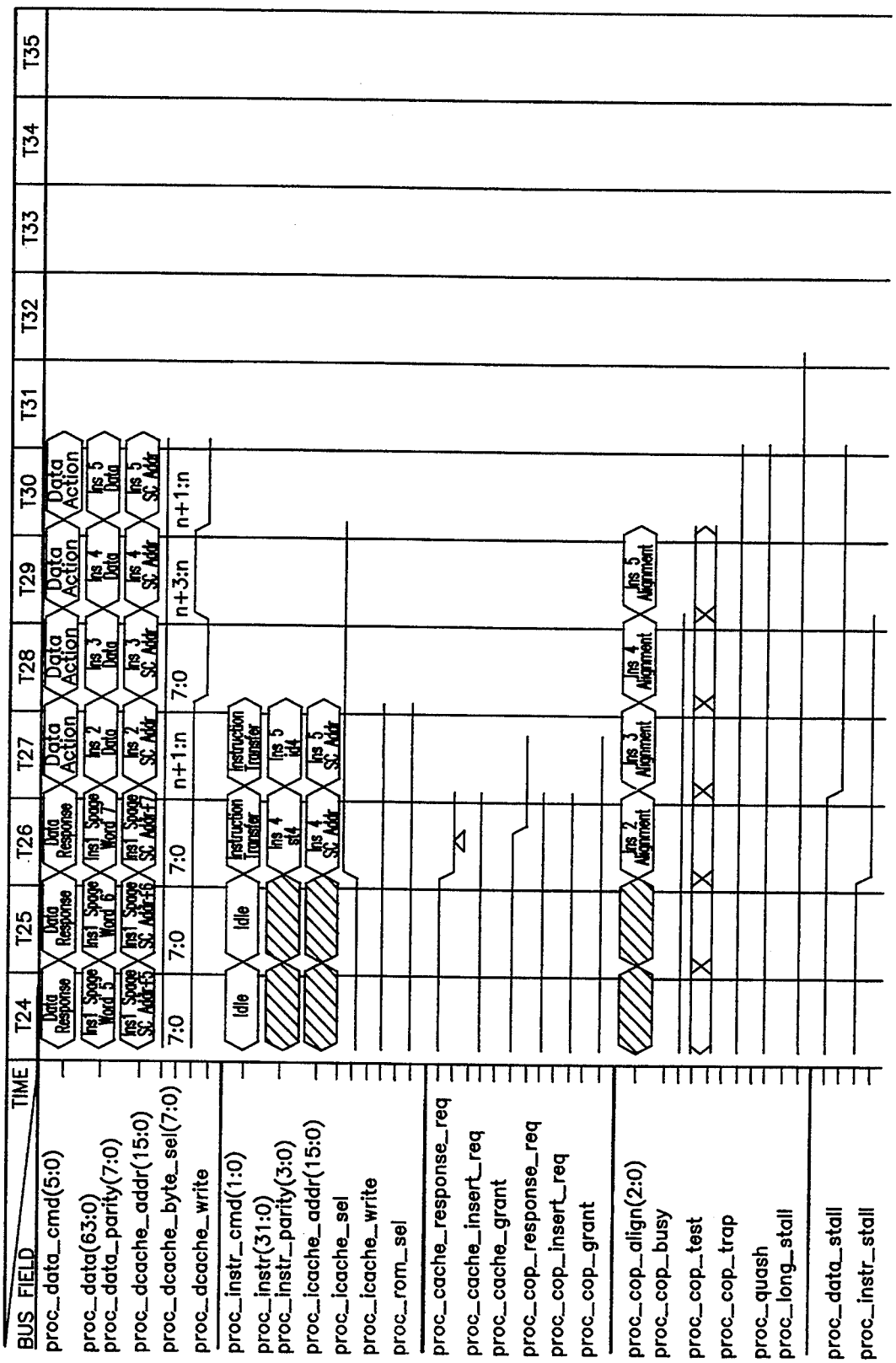
Figure 11J:
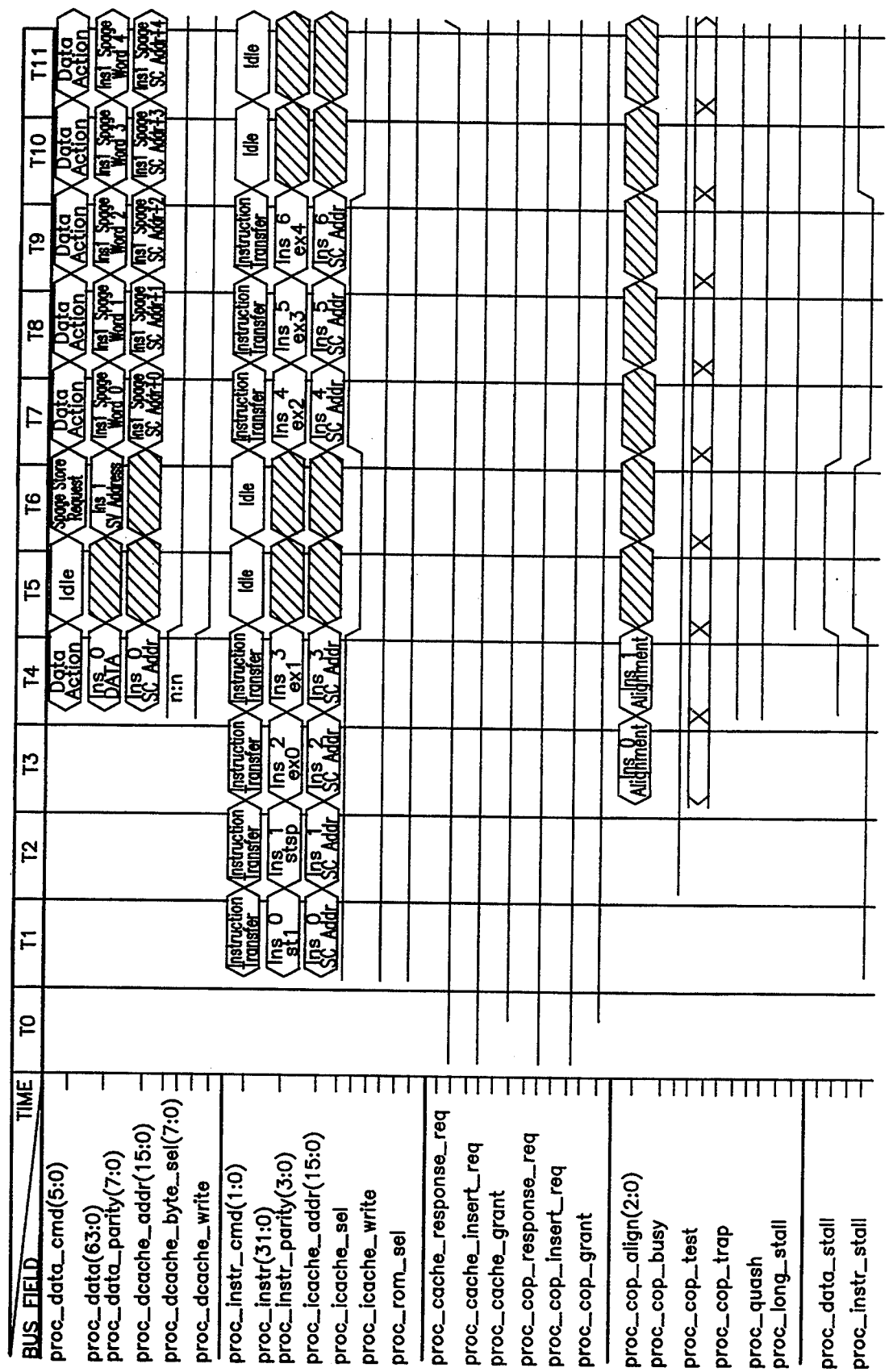
Figures 1, 11J:
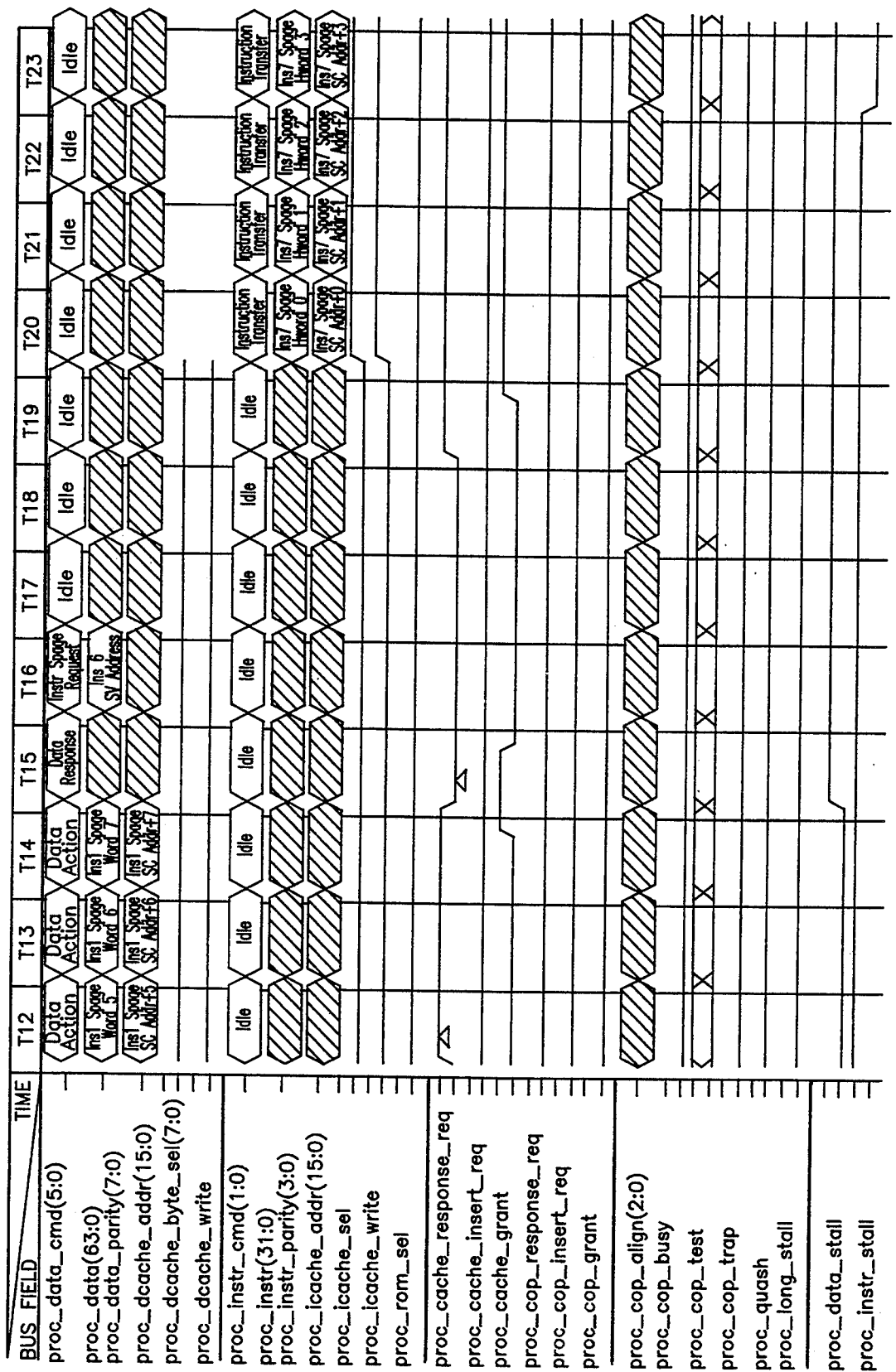
Figures 2, 11J:
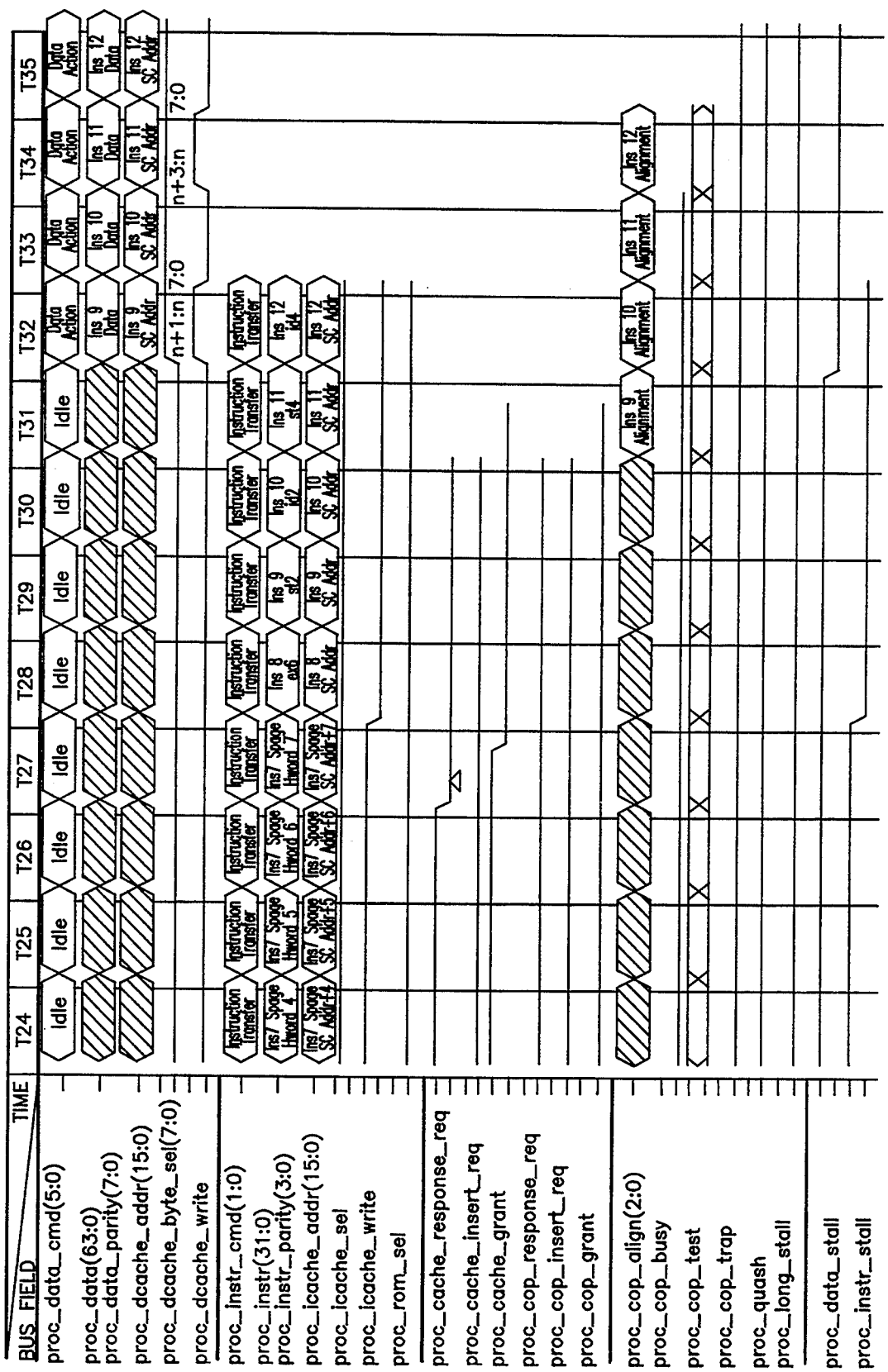
Figure 11K:
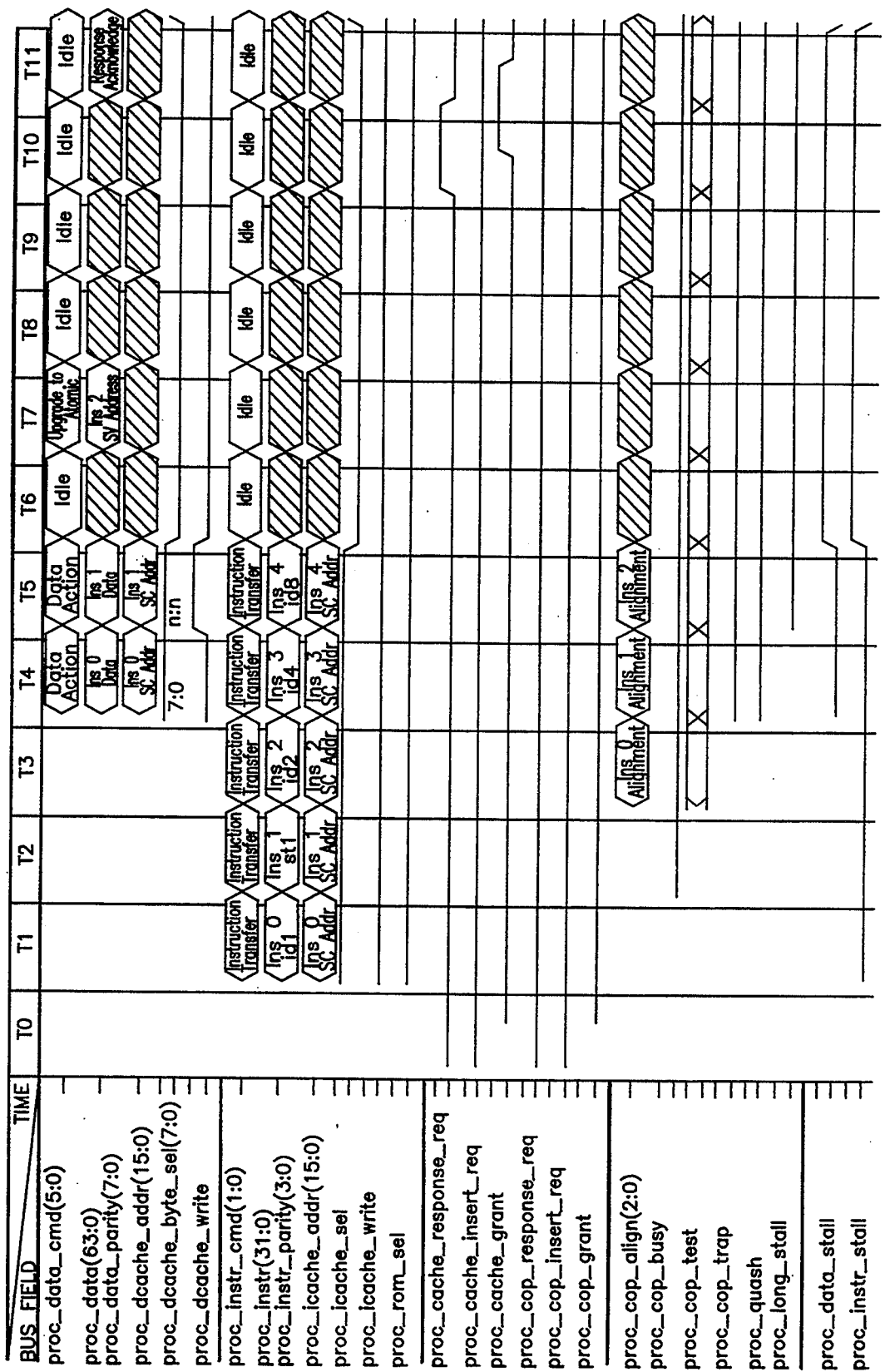
Figures 1, 11K:
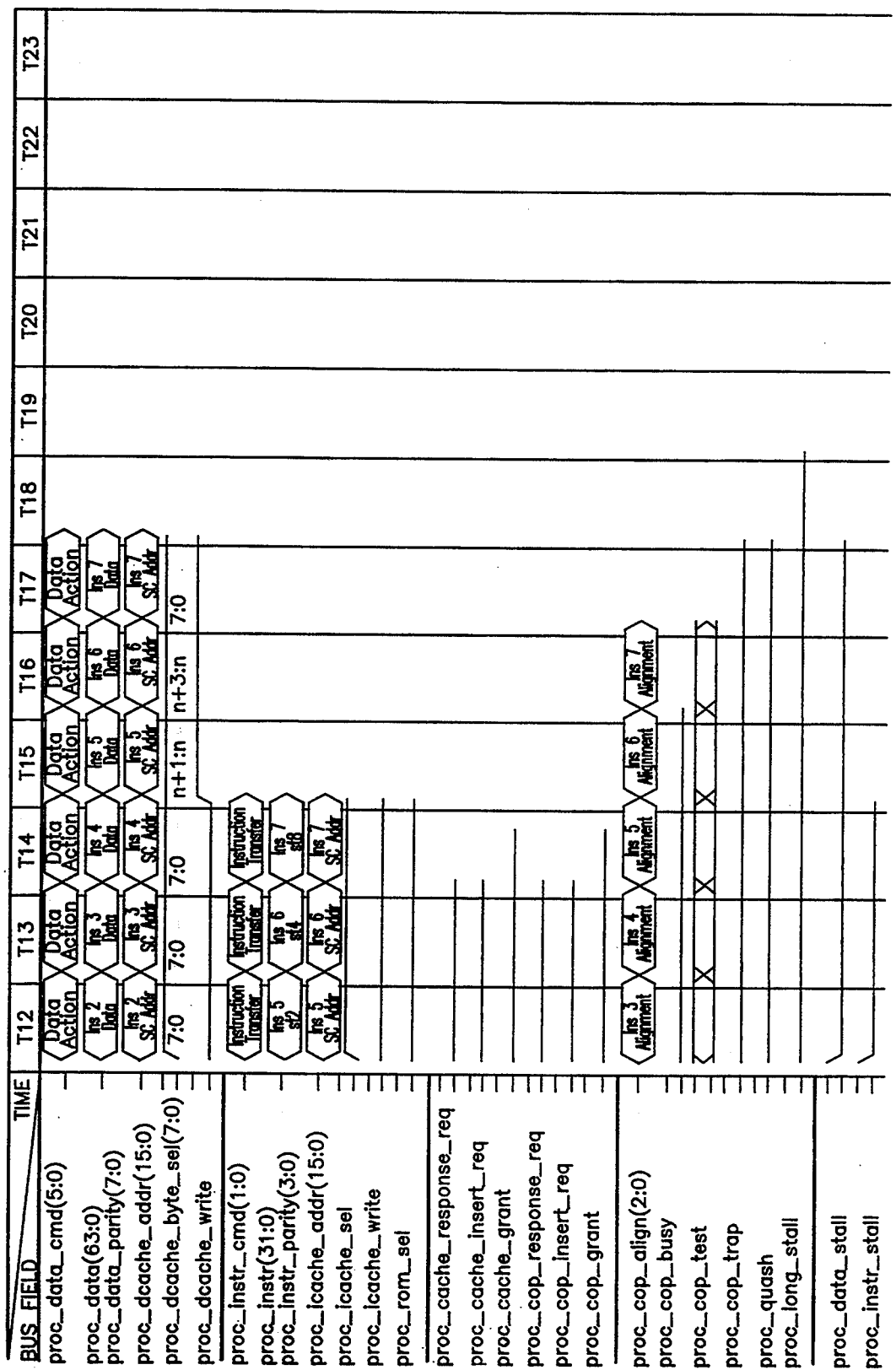
Figure 12A:
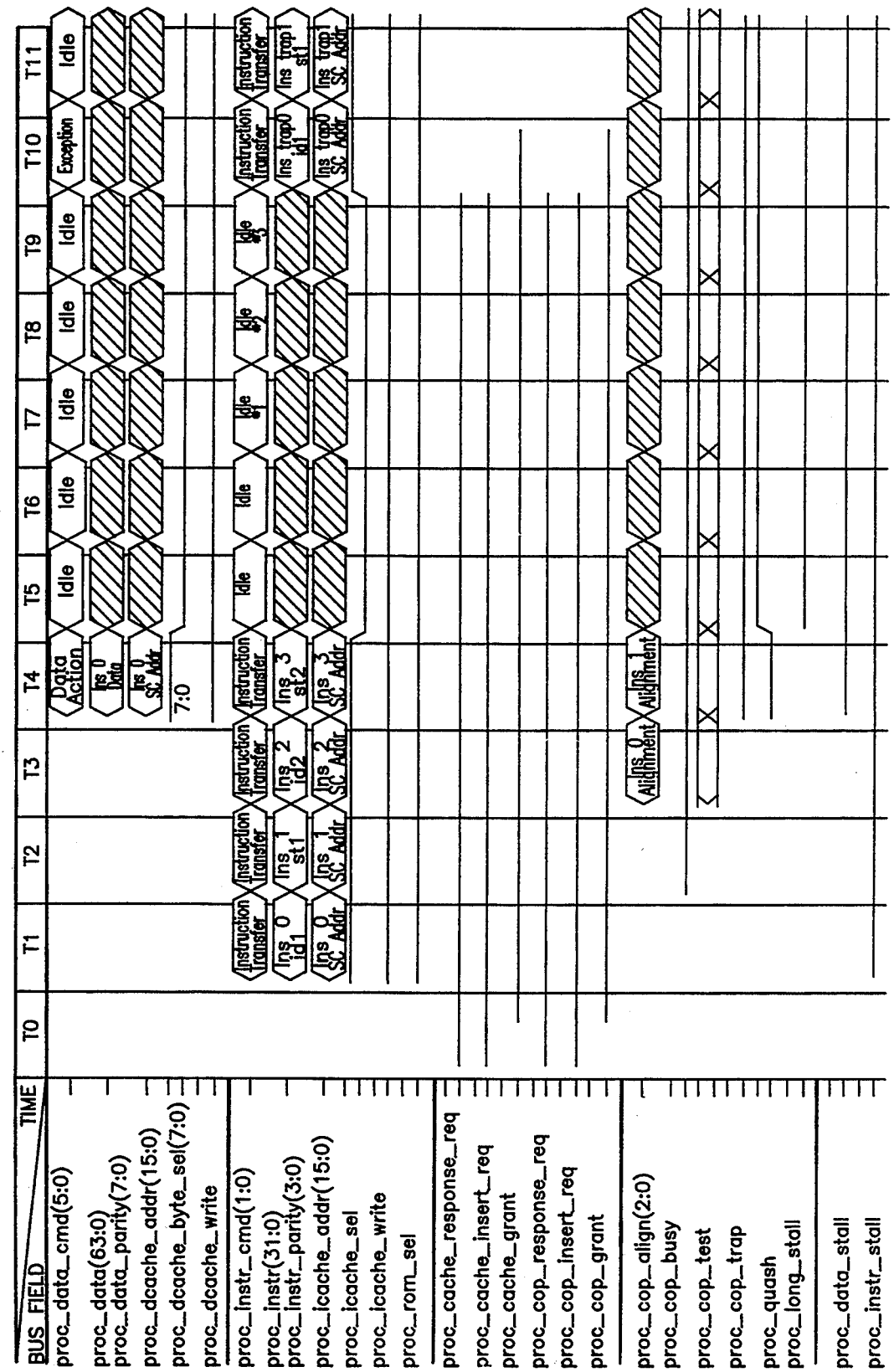
Figures 1, 12A:
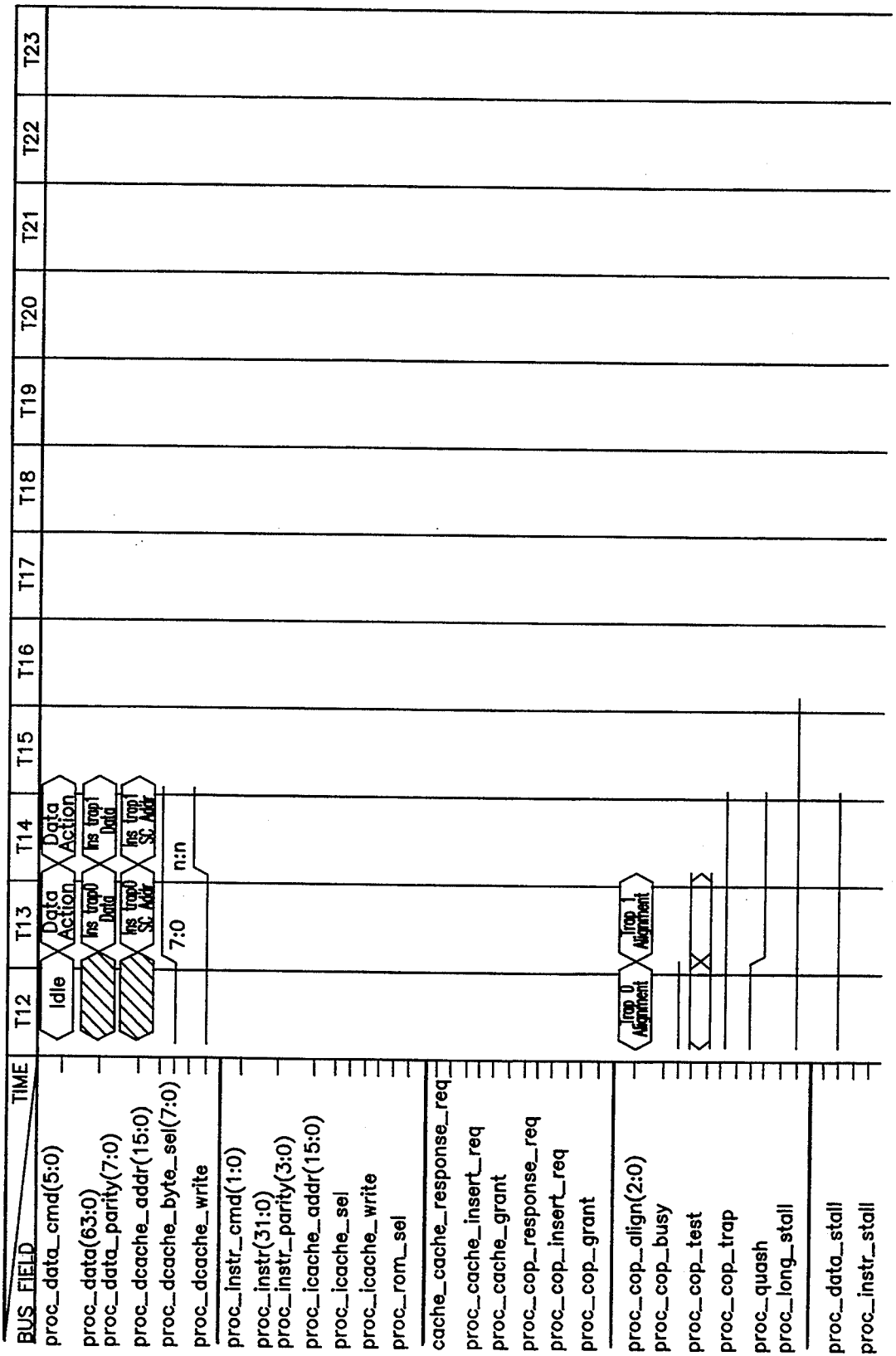
Figure 12B:
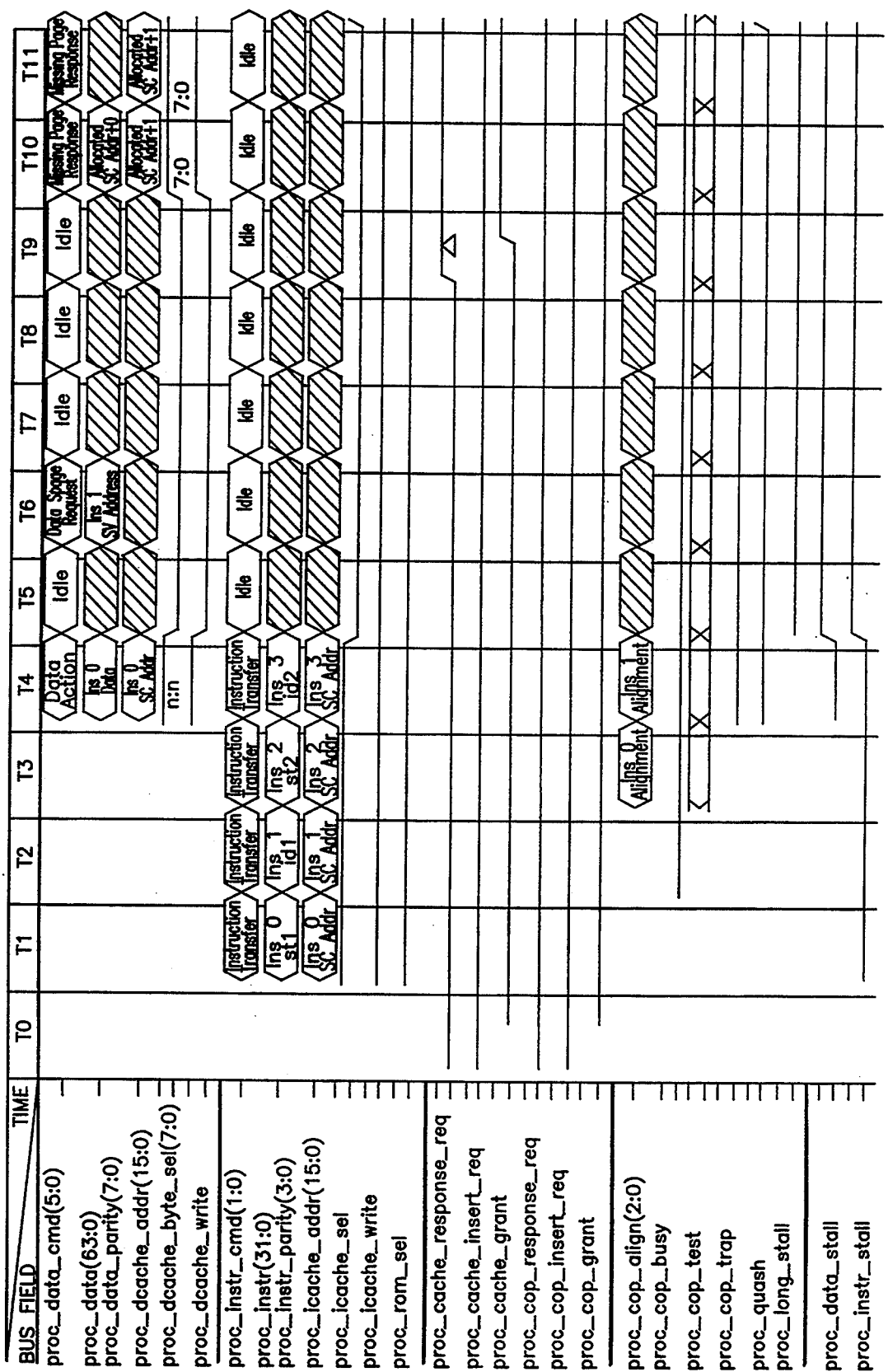
Figures 1, 12B:
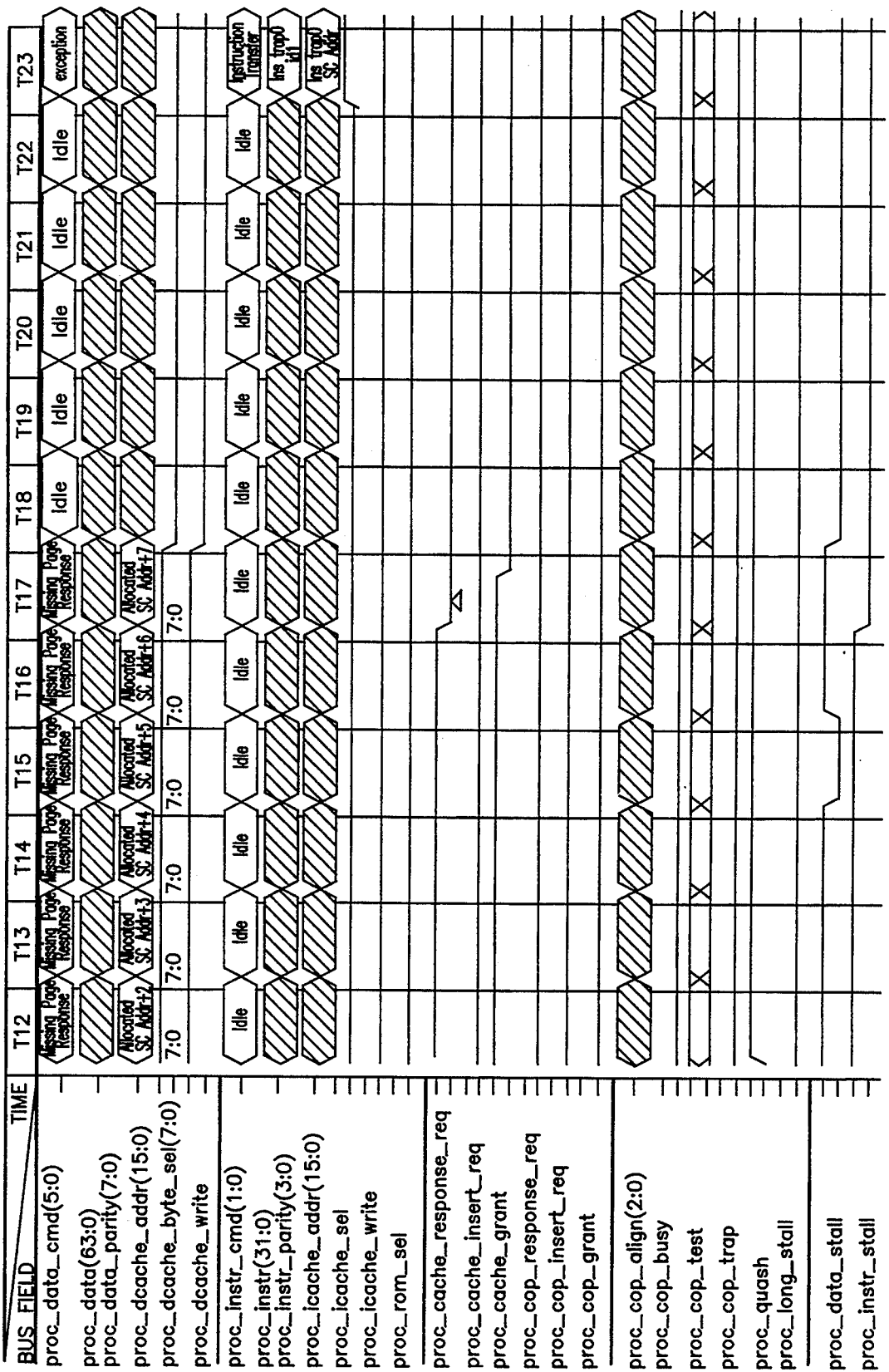
Figures 2, 12B:
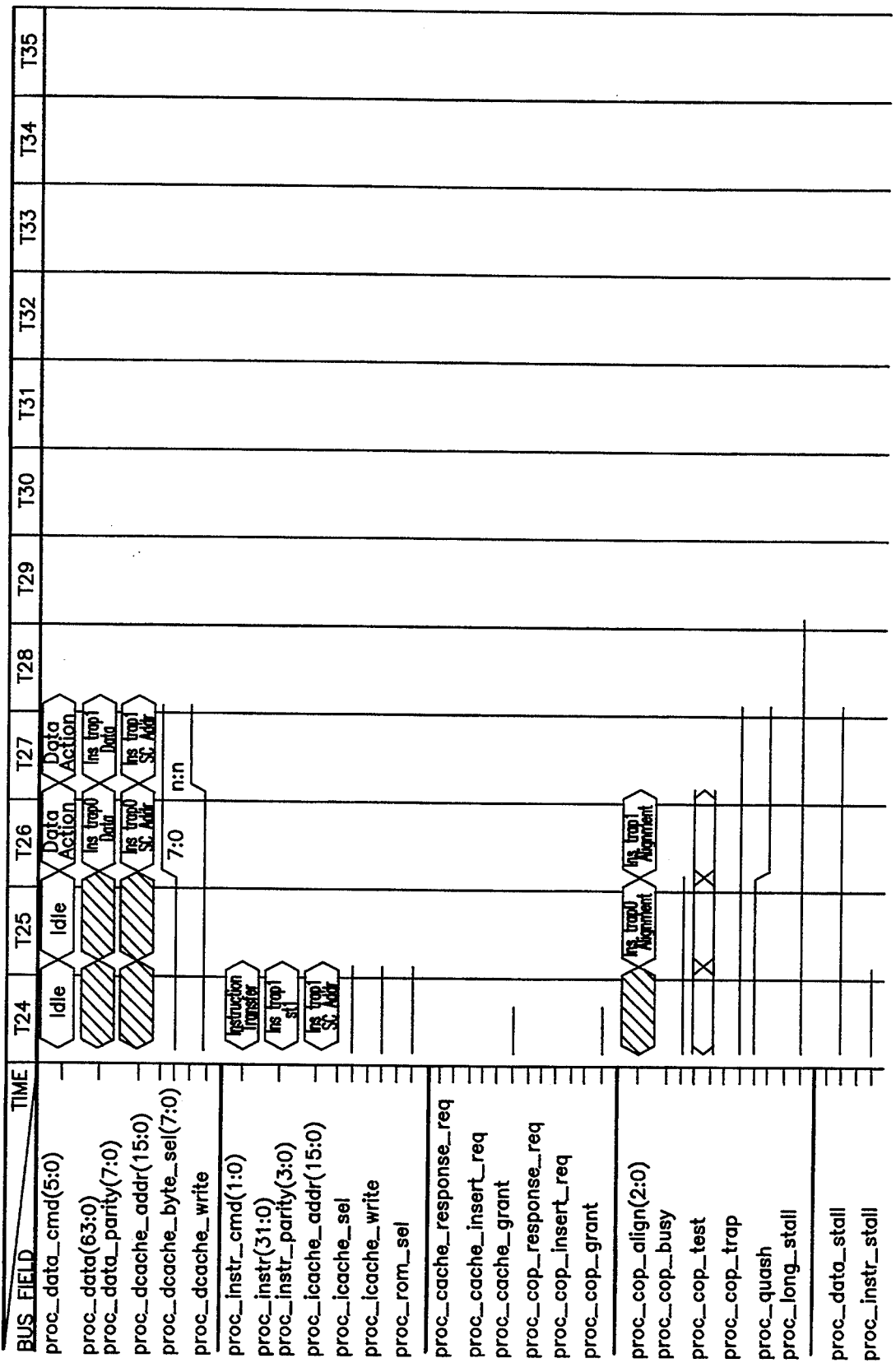
Figure 13A:
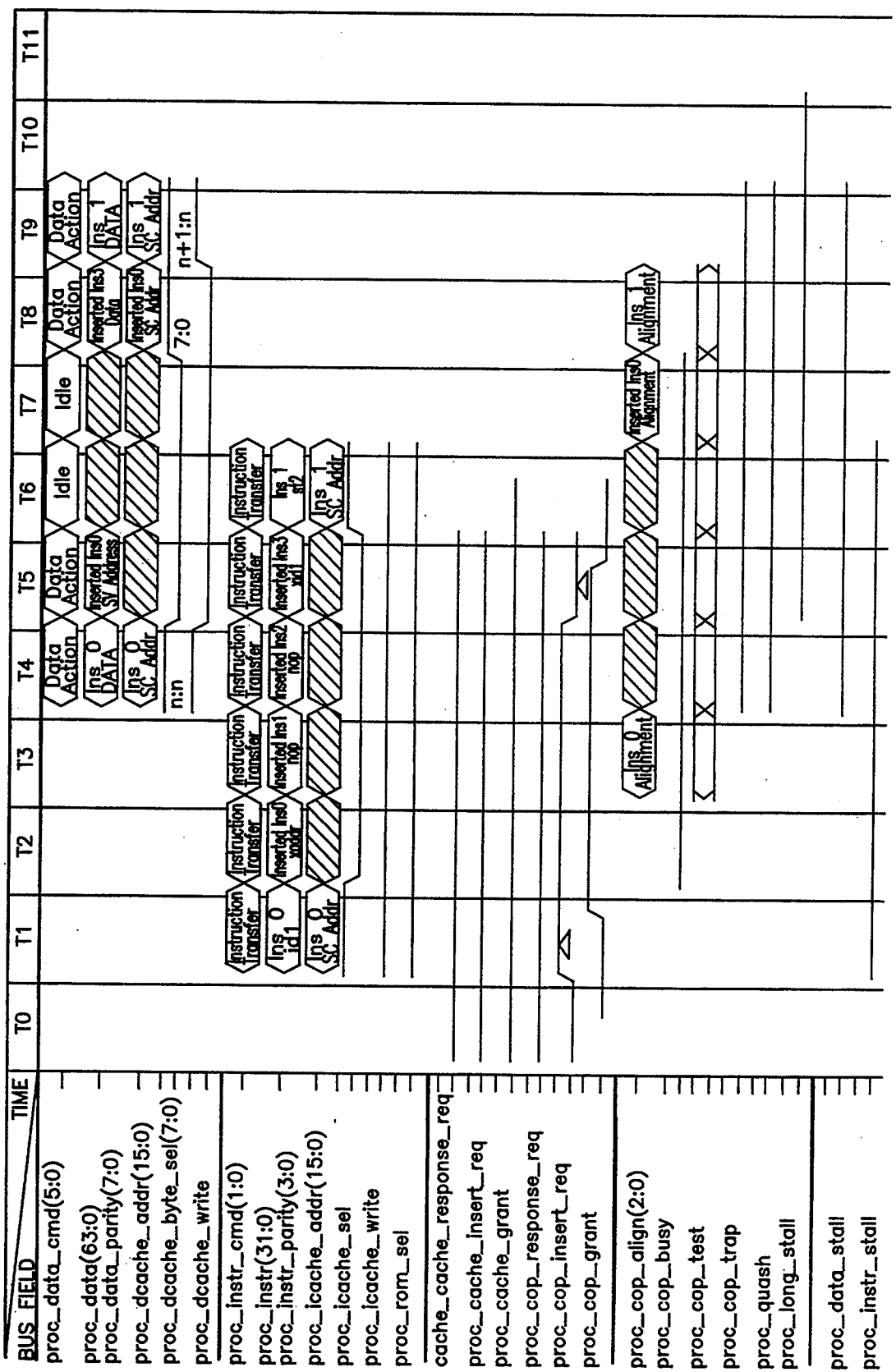
Figure 13B:
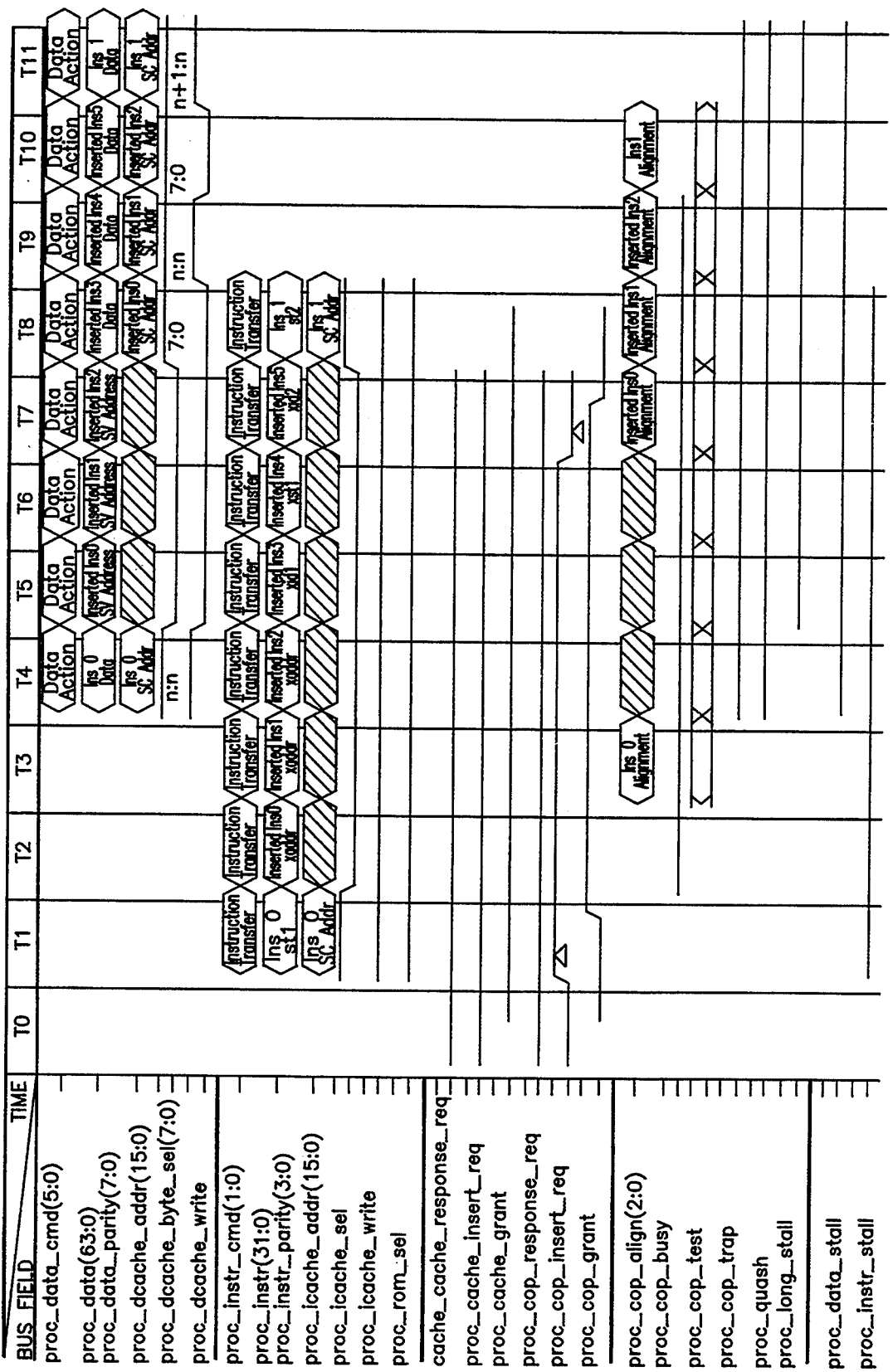
Figure 13C:
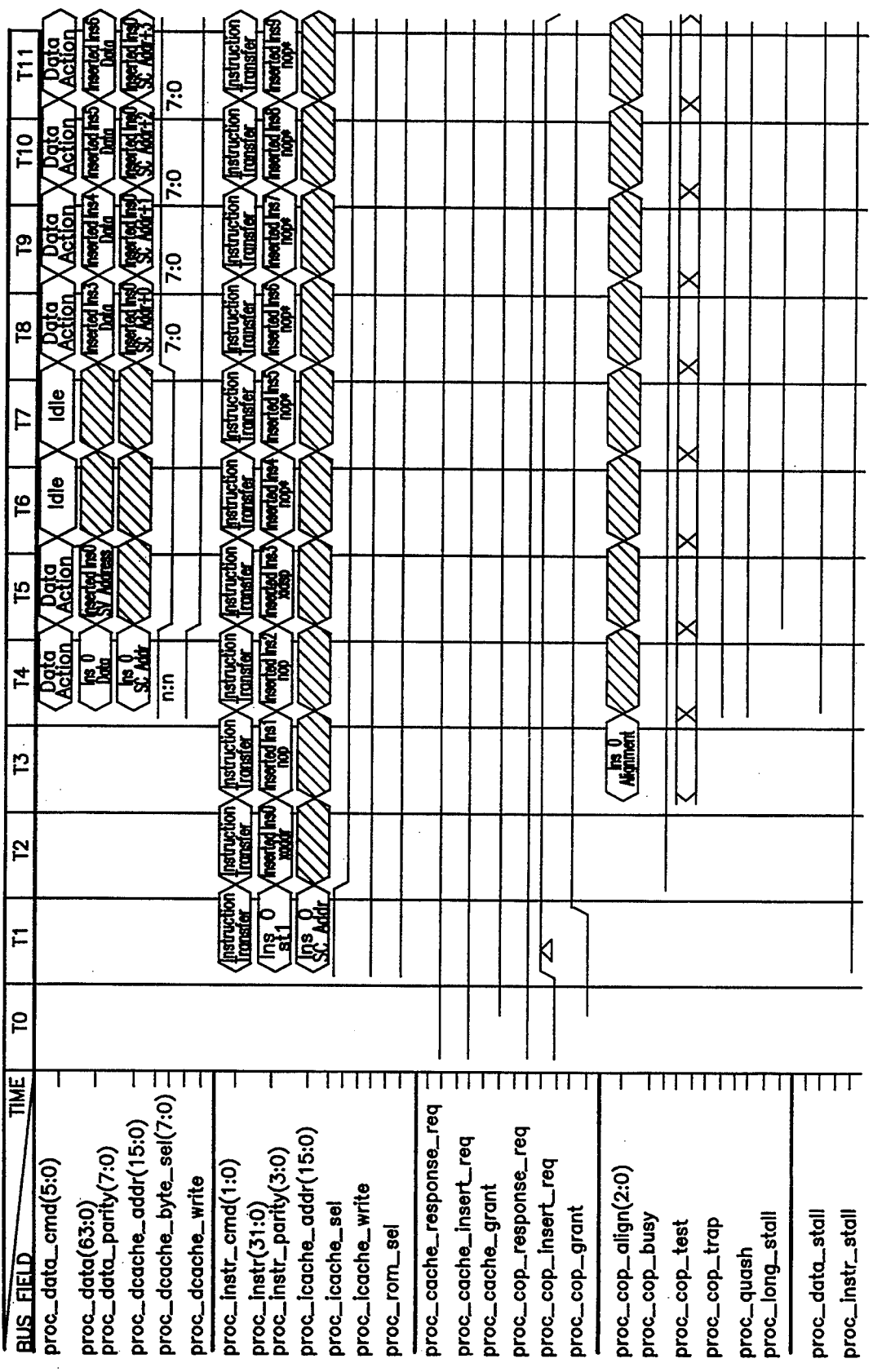
Figures 1, 13C:
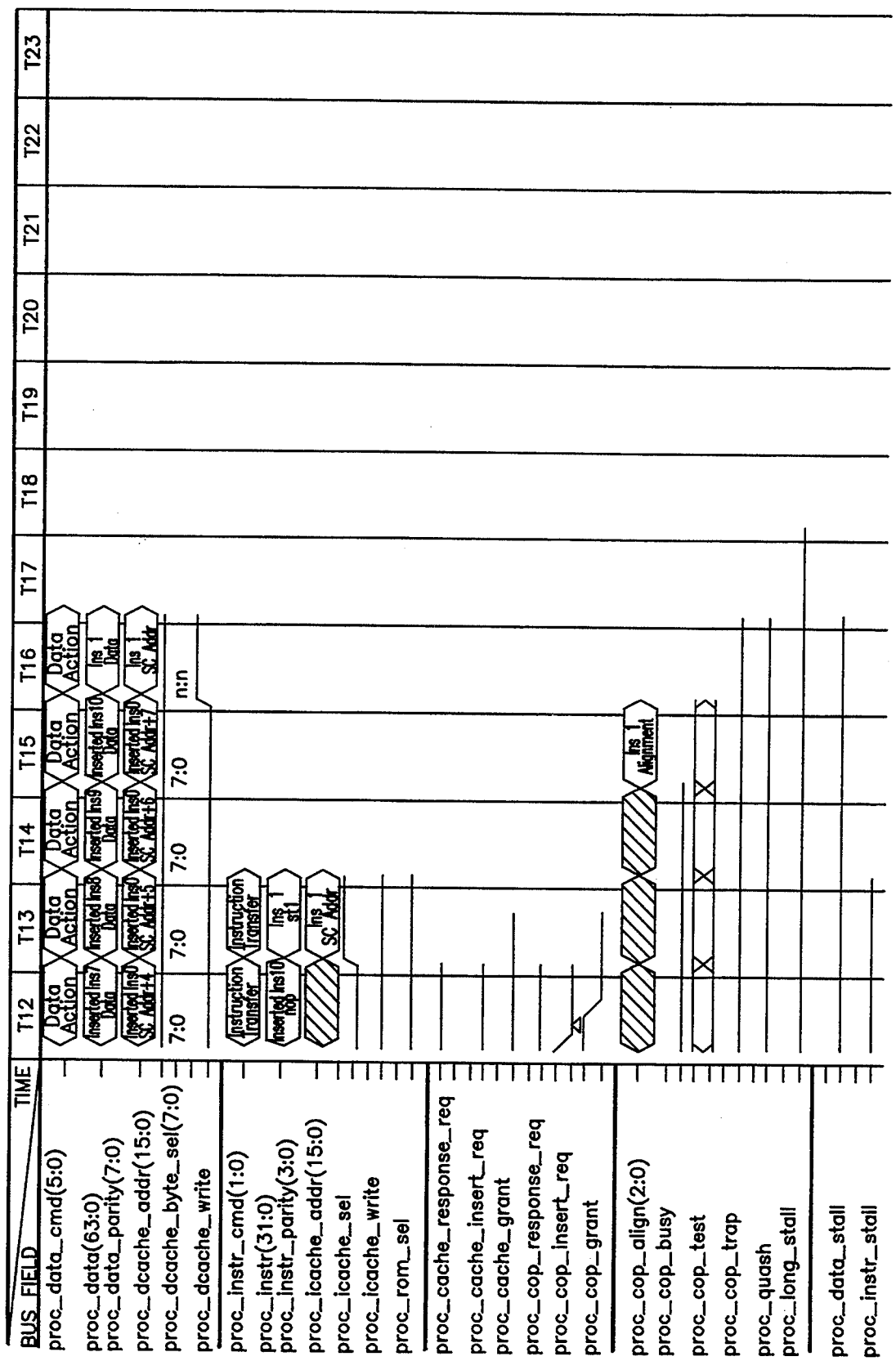
Figure 13D:
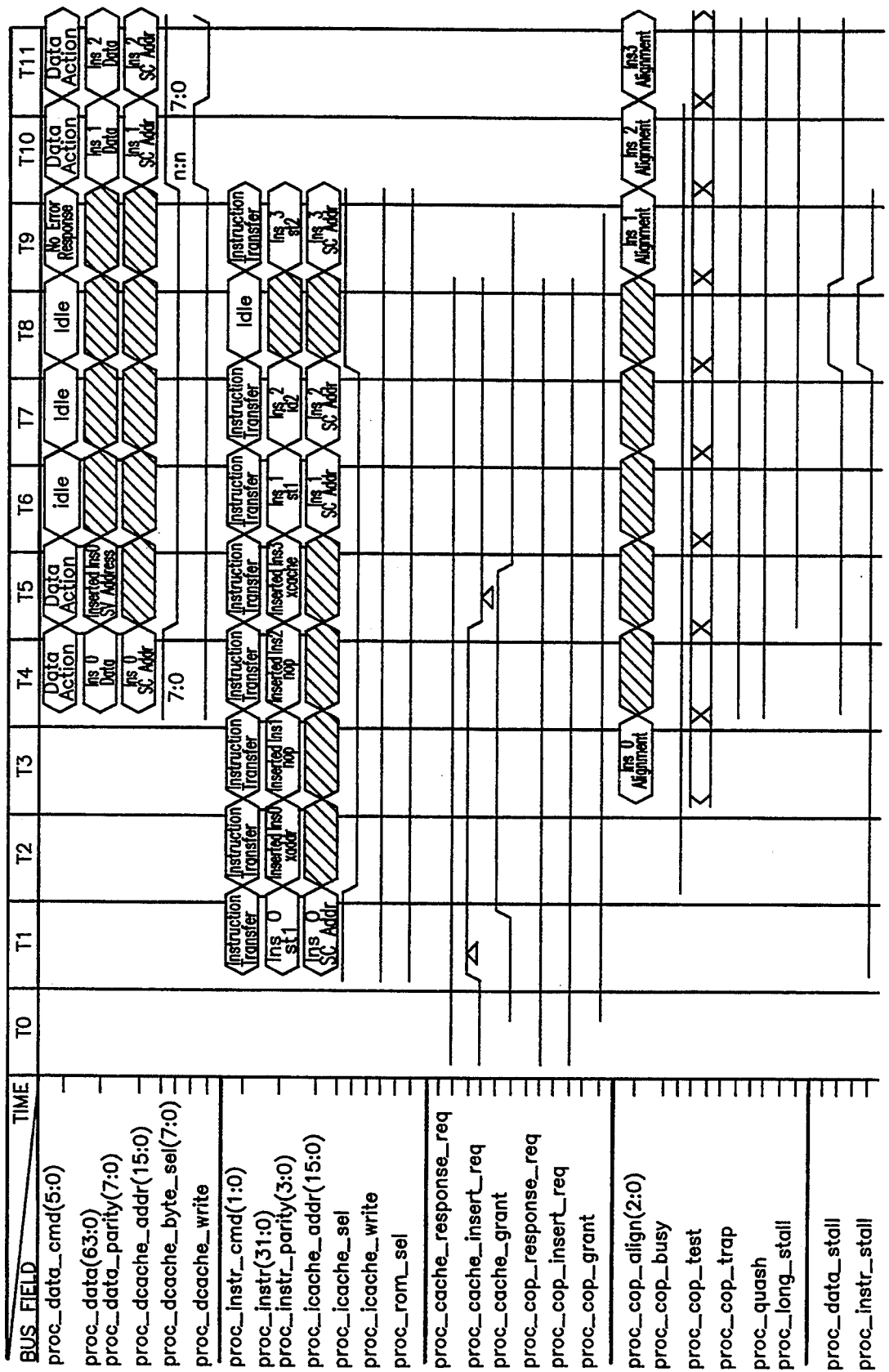
Figures 1, 13D:
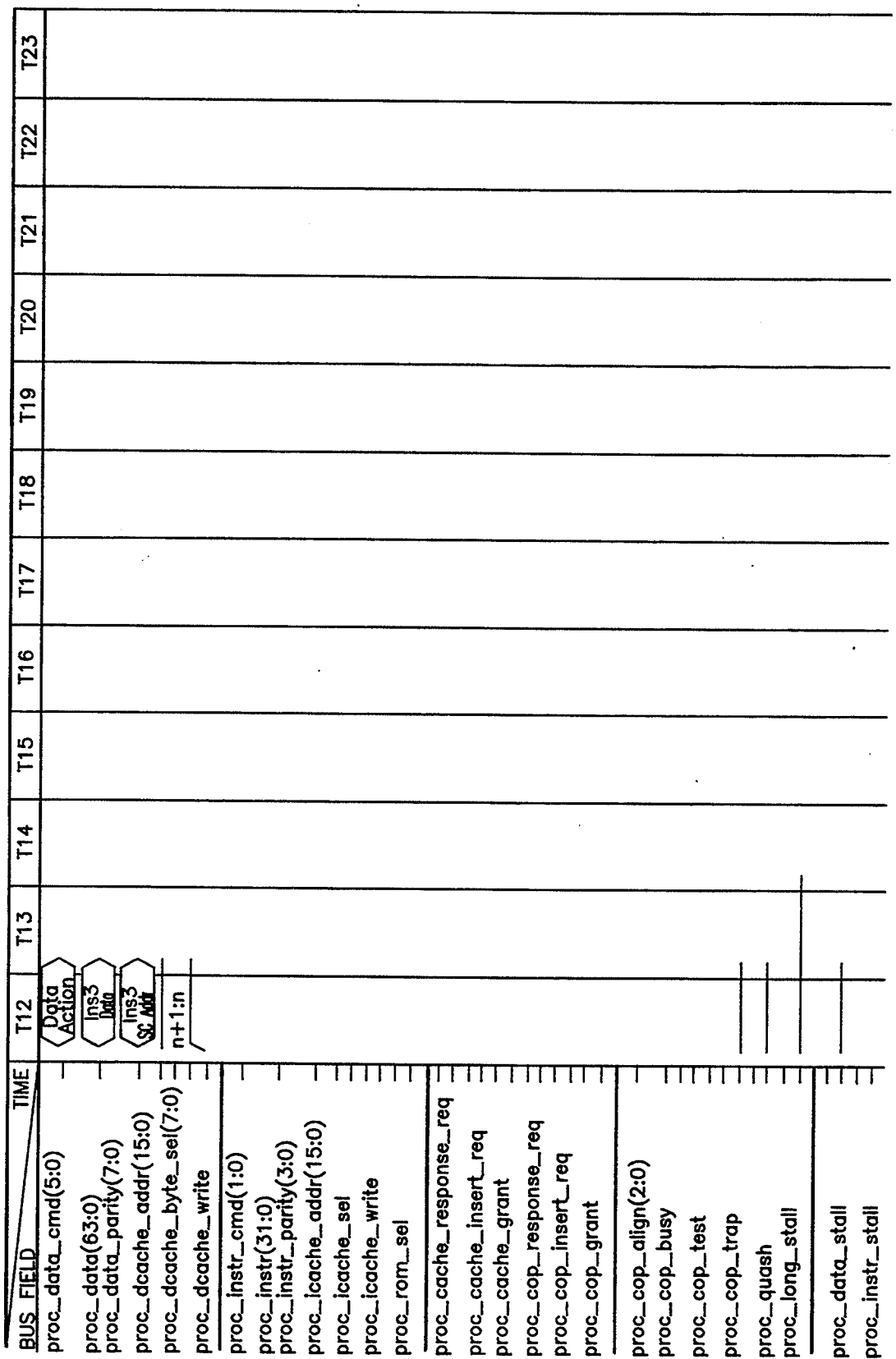
Figure 13E:
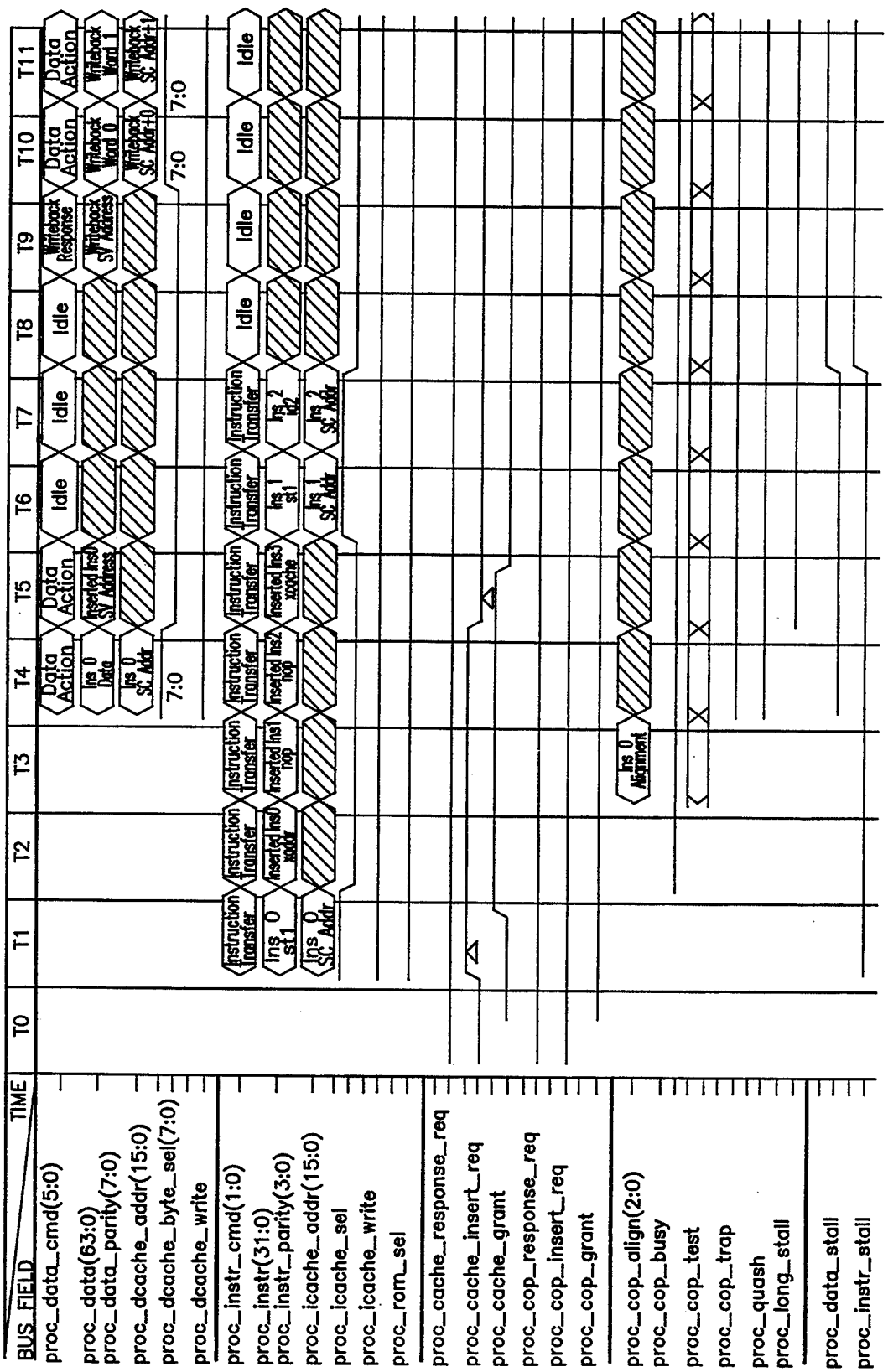
Figures 1, 13E:
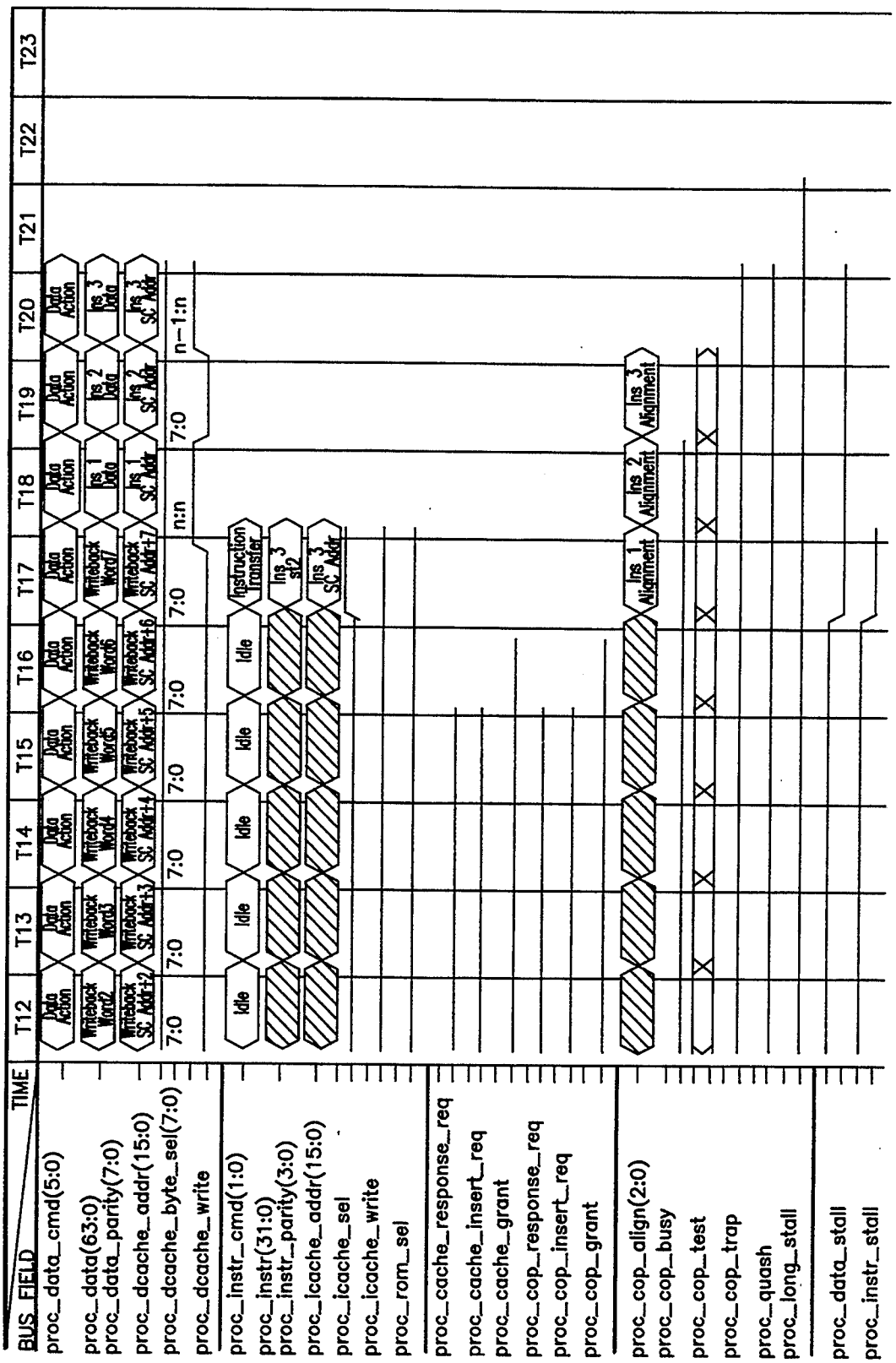
Figure 13F:
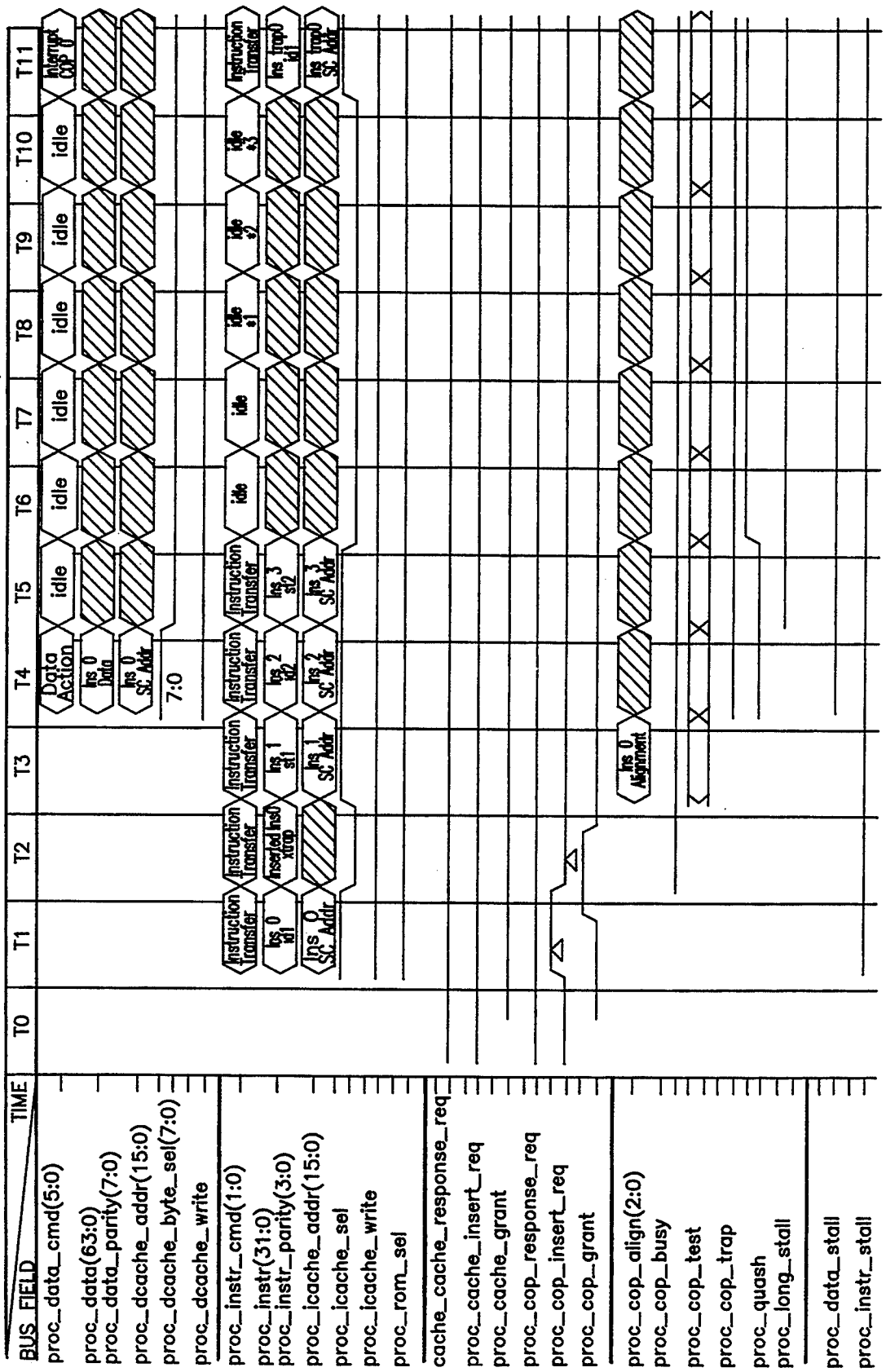
Figures 1, 13F:
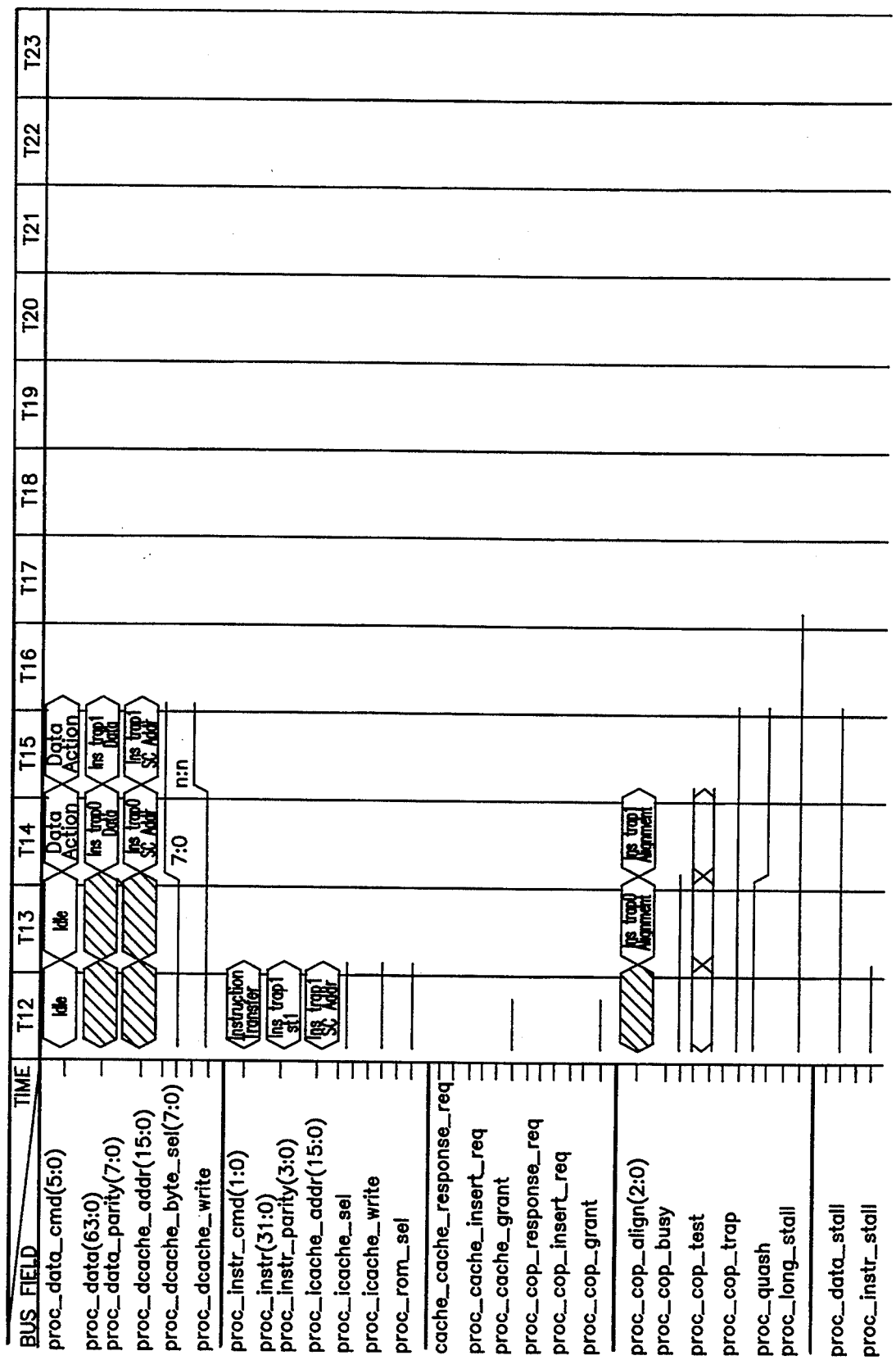
Figure 13G:
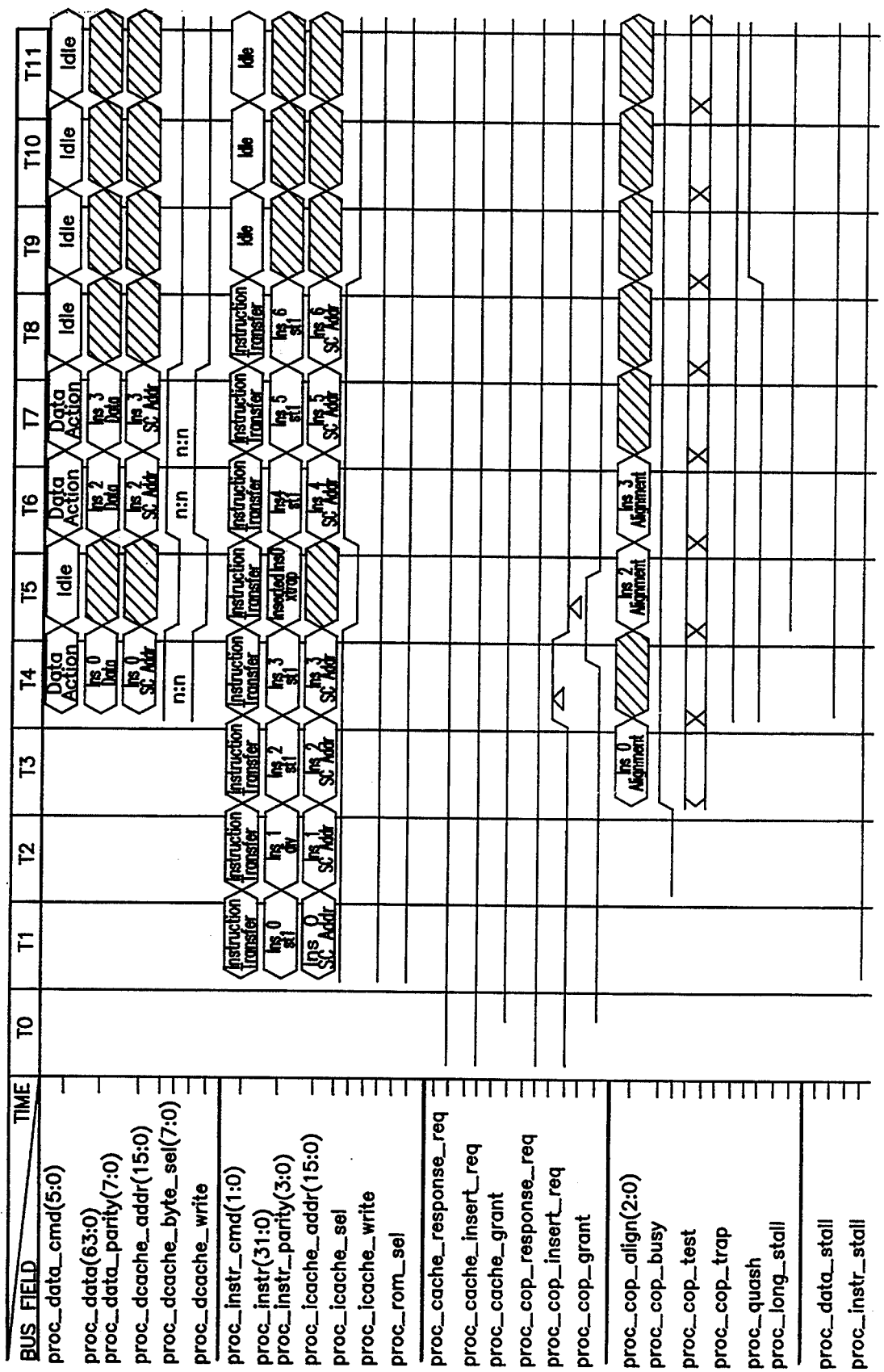
Figures 1, 13G:
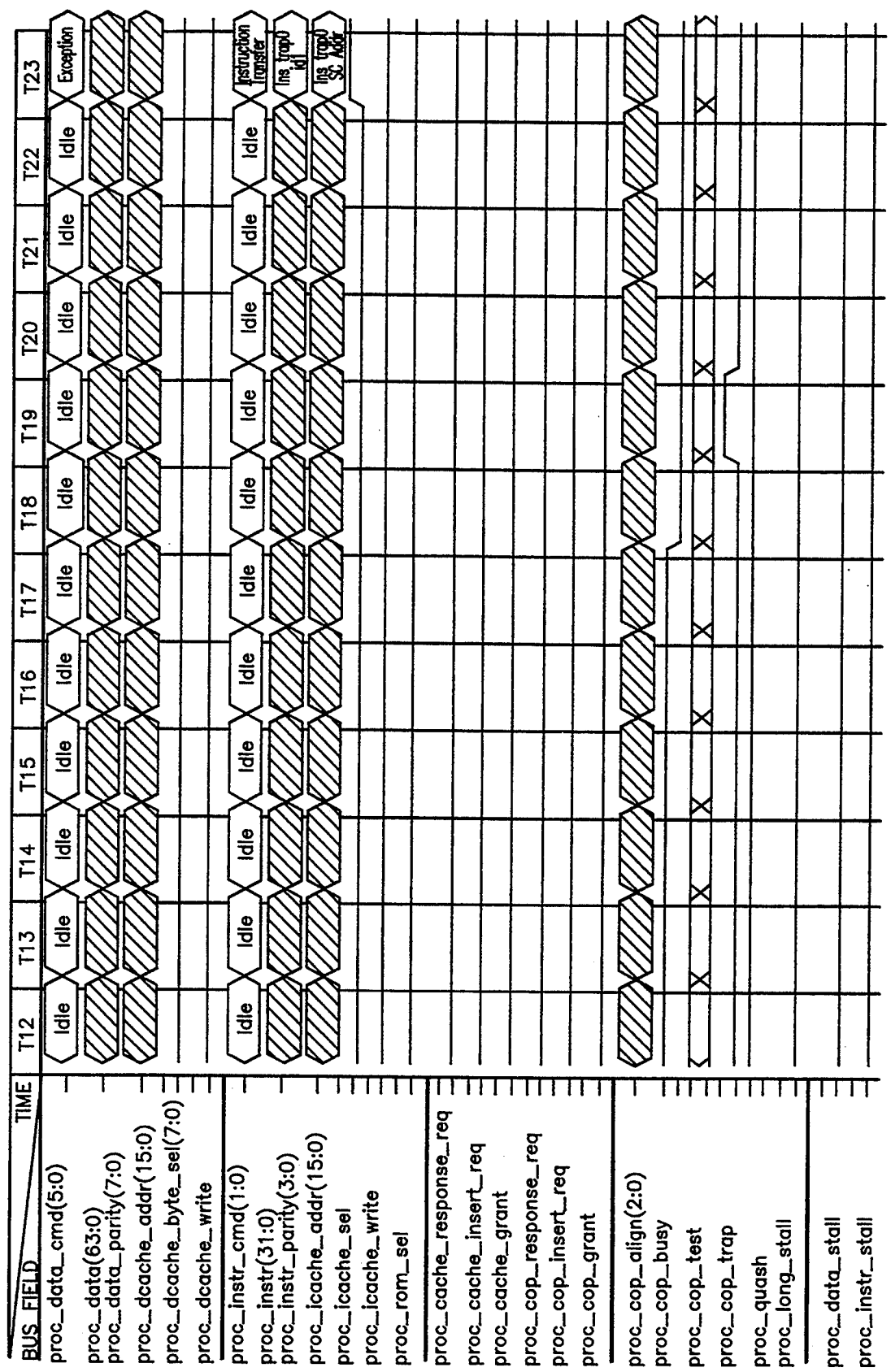
Figures 2, 13G:
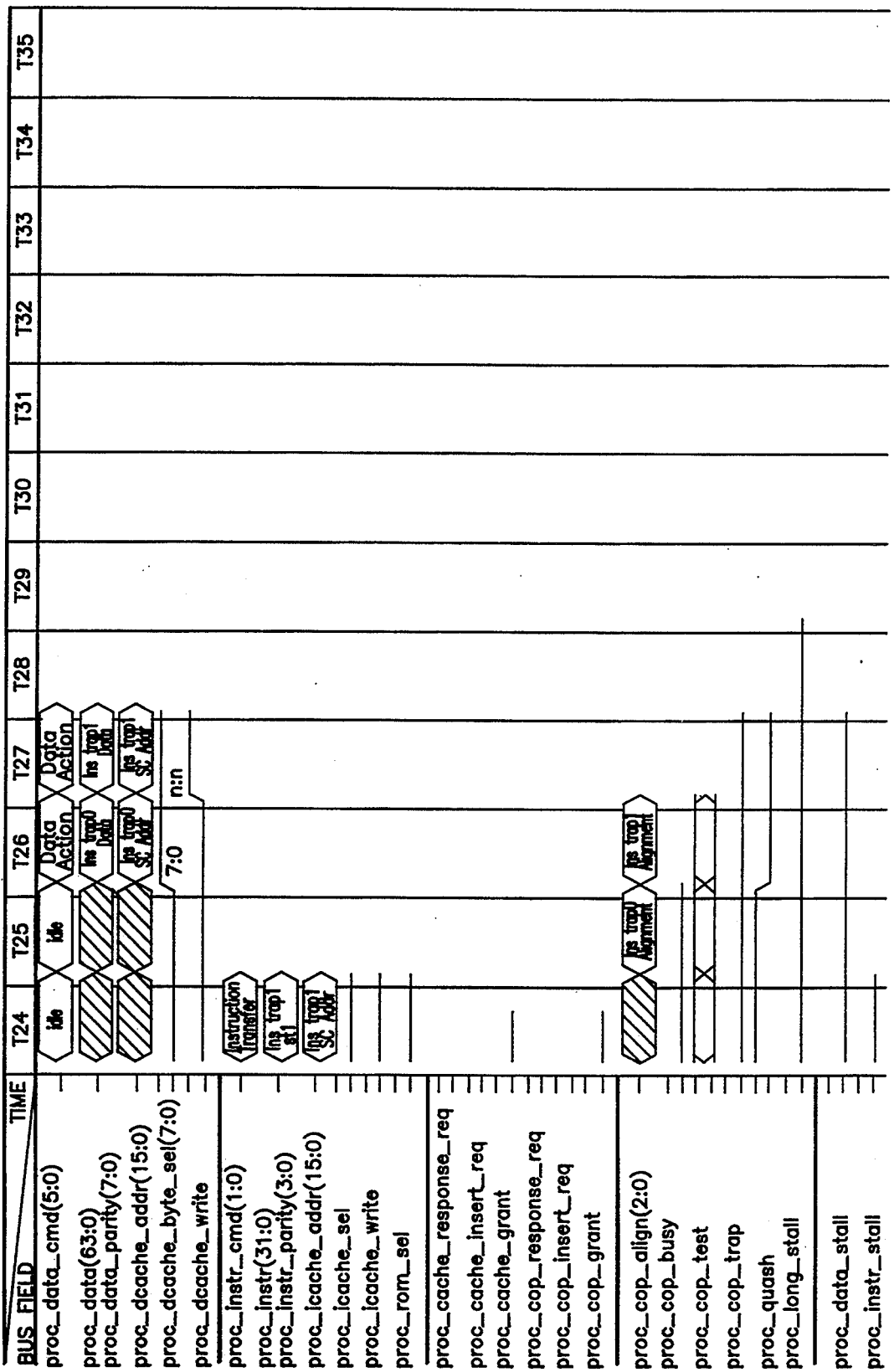
Figure 13H:
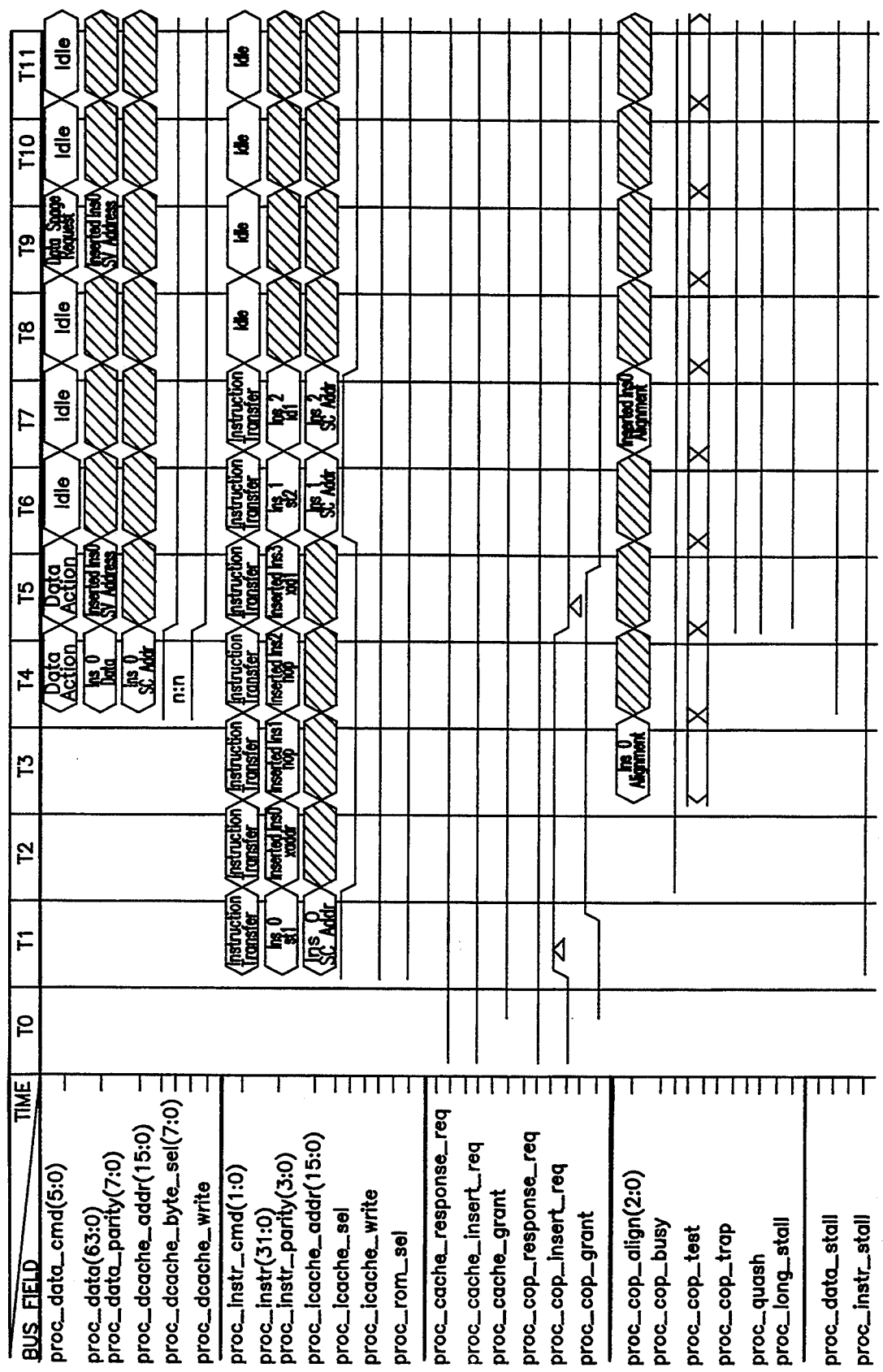
Figures 1, 13H:
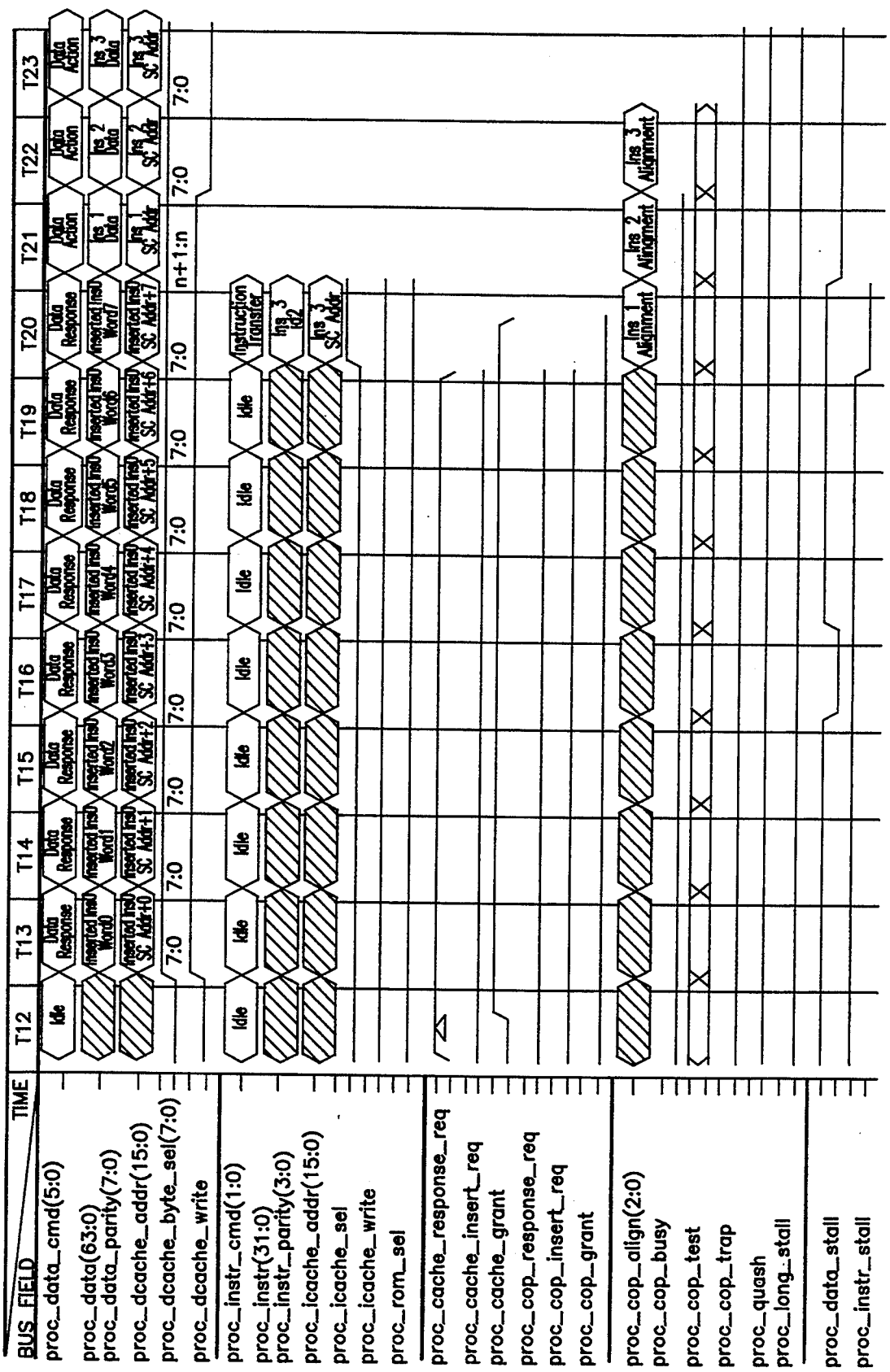
Figure 13I:
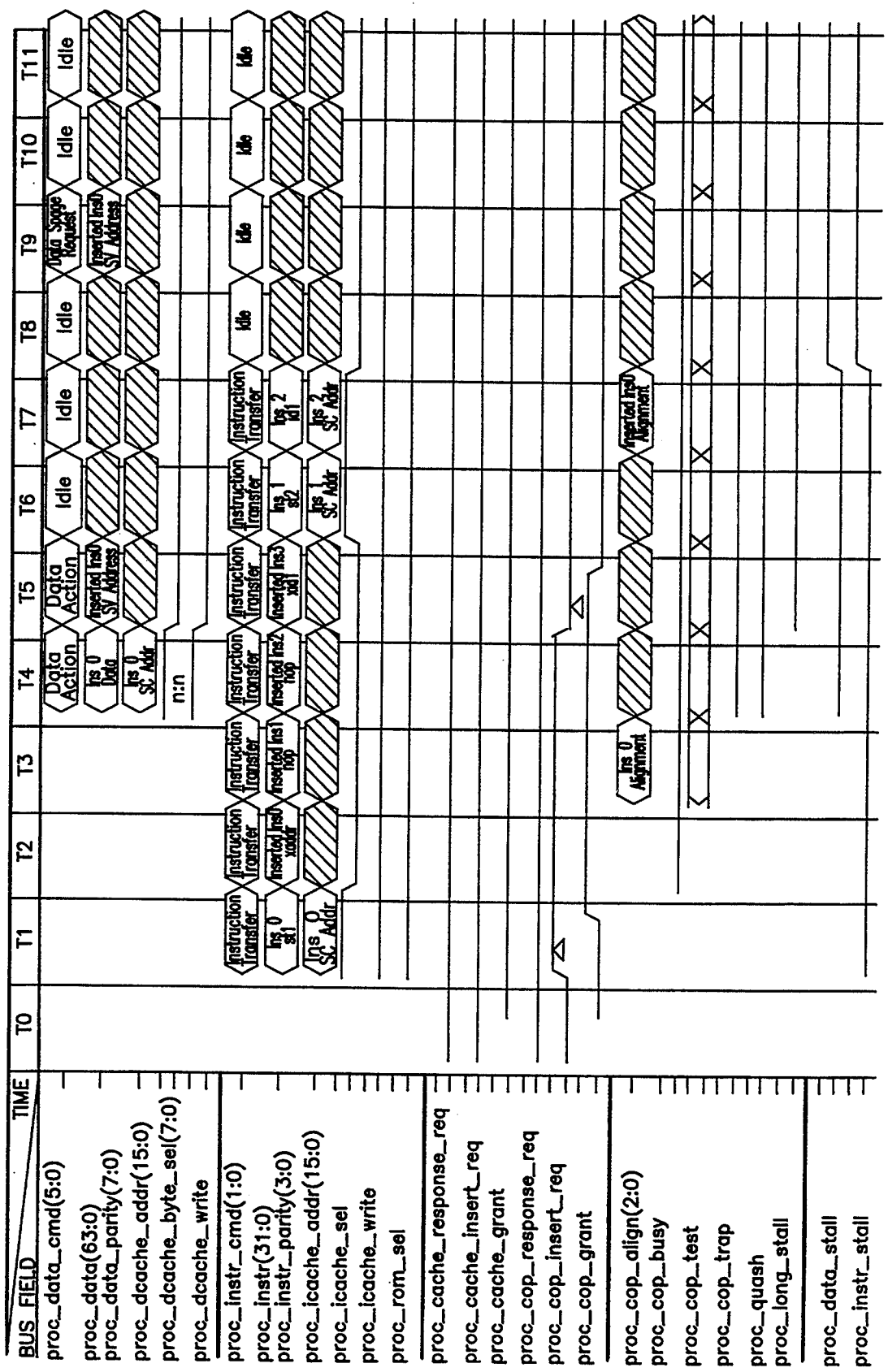
Figures 1, 13I:
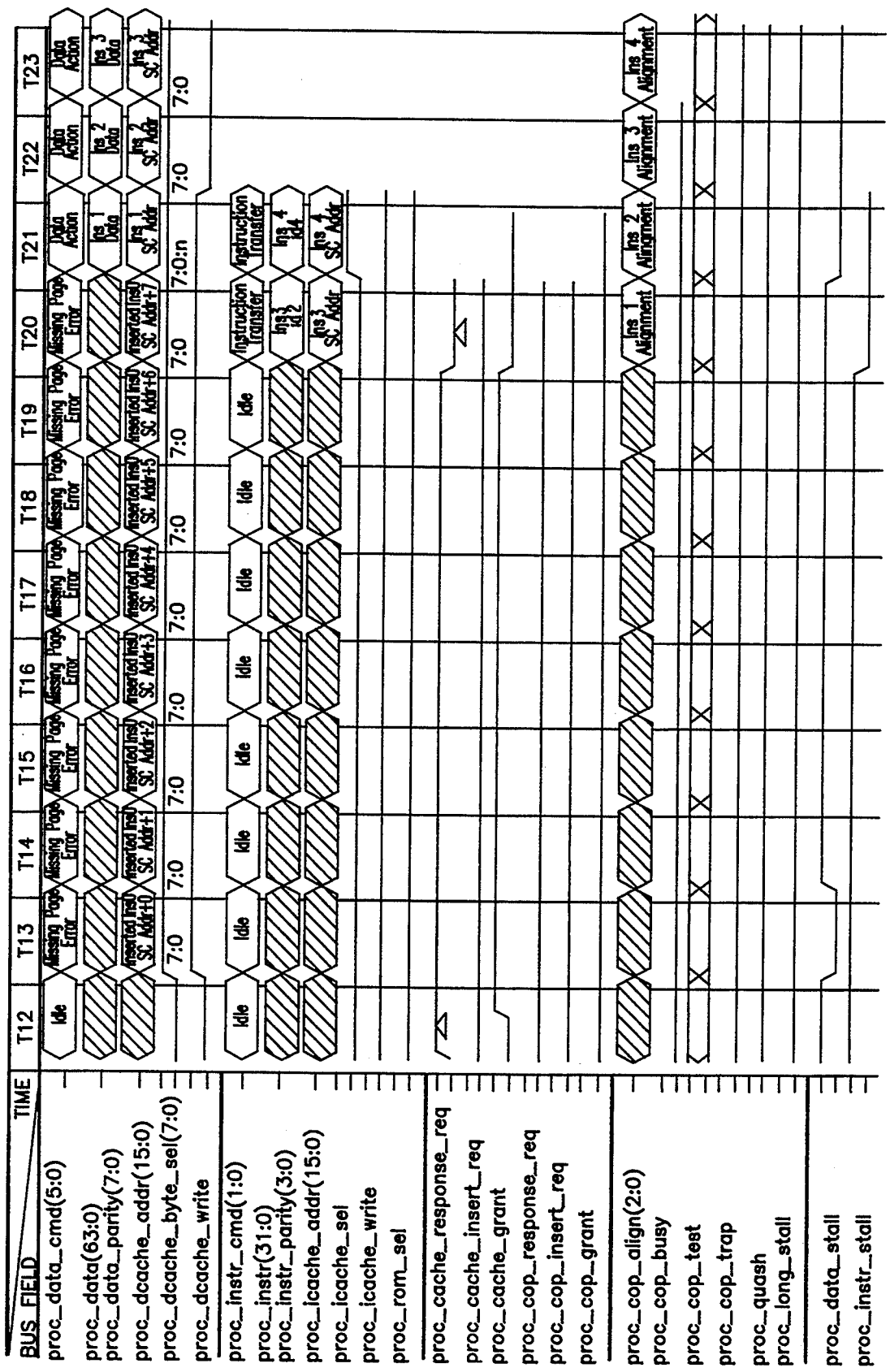
Figure 14A:
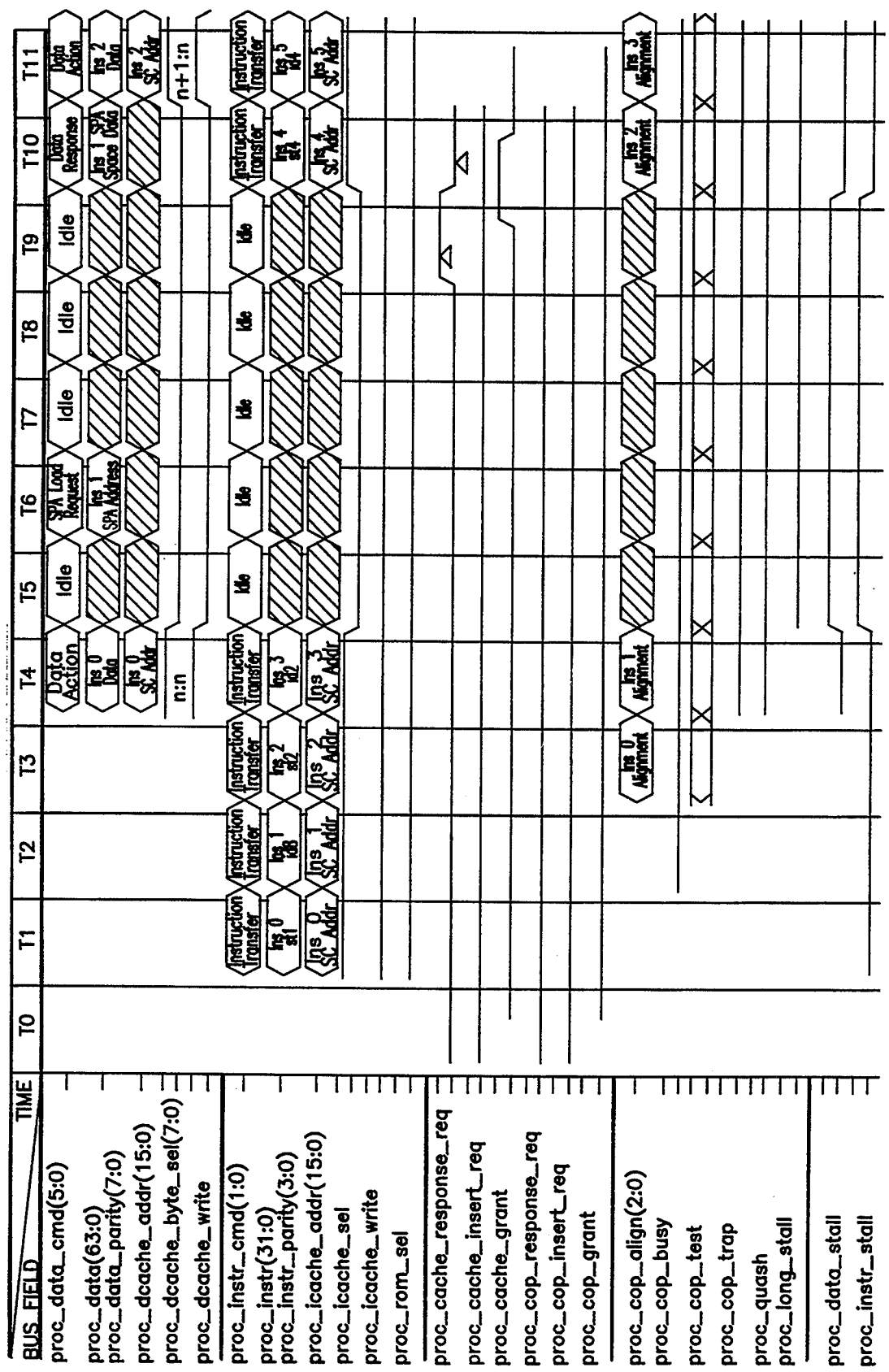
Figures 1, 14A:
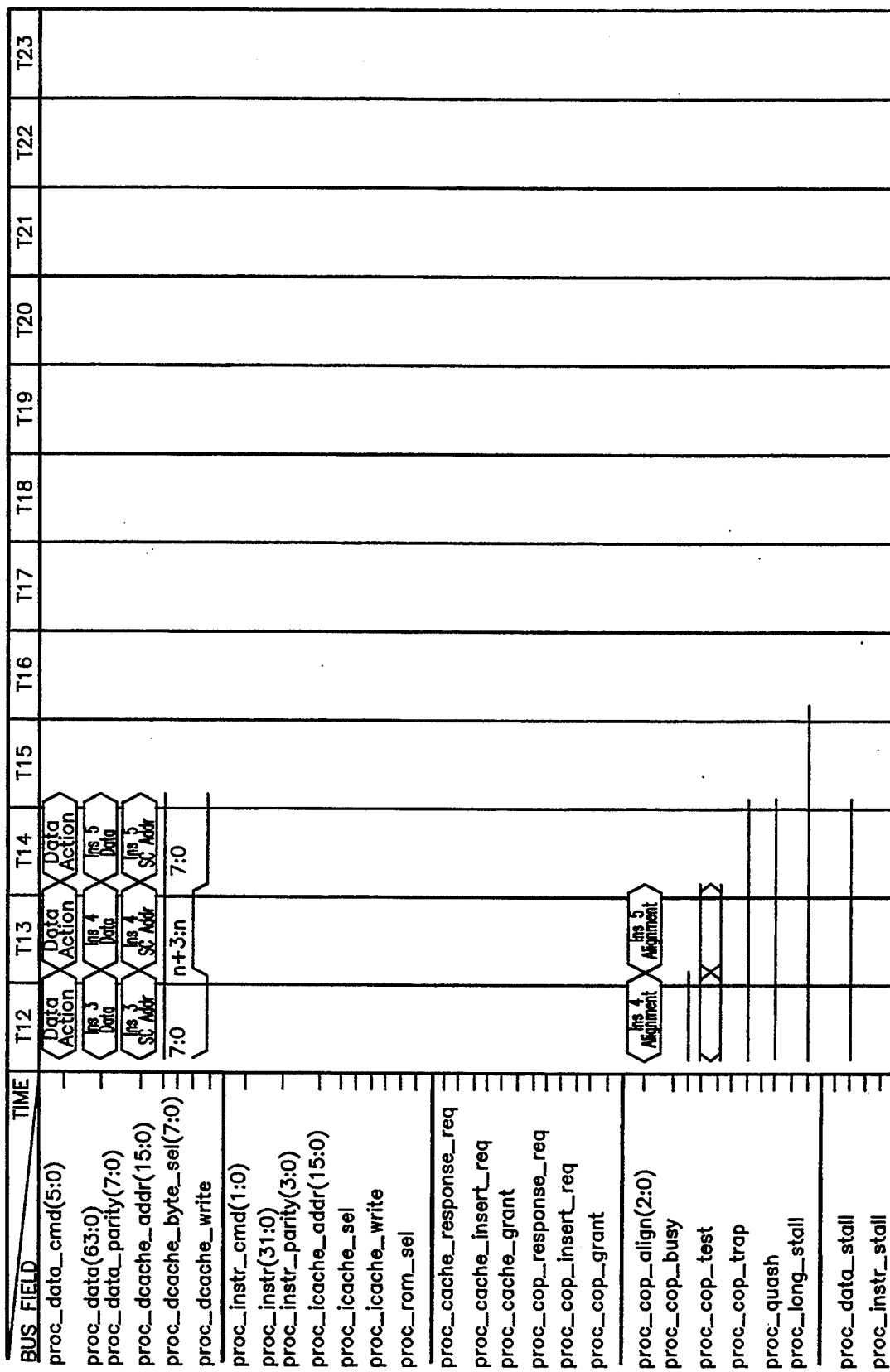
Figure 14B:
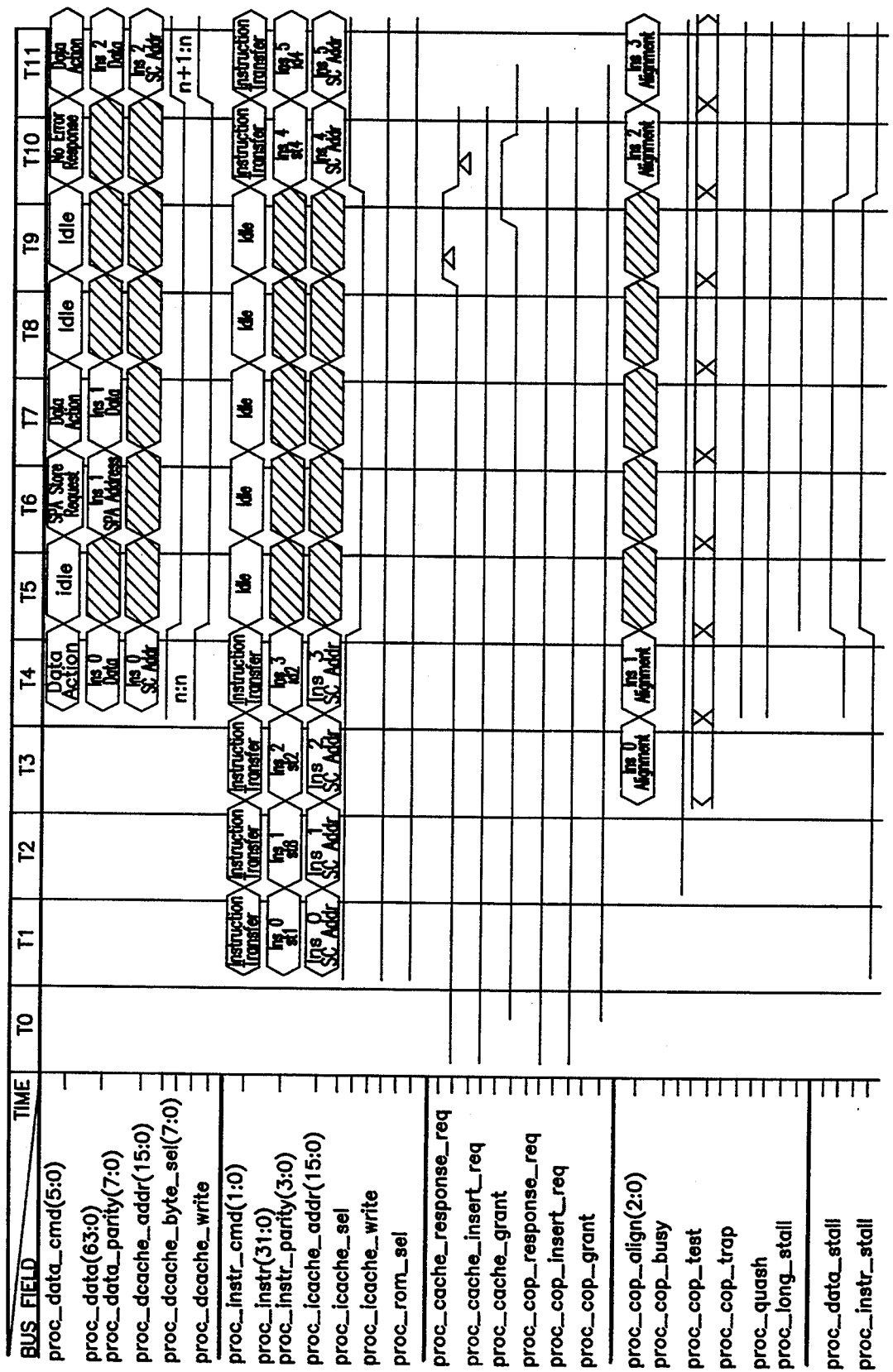
Figures 1, 14B:
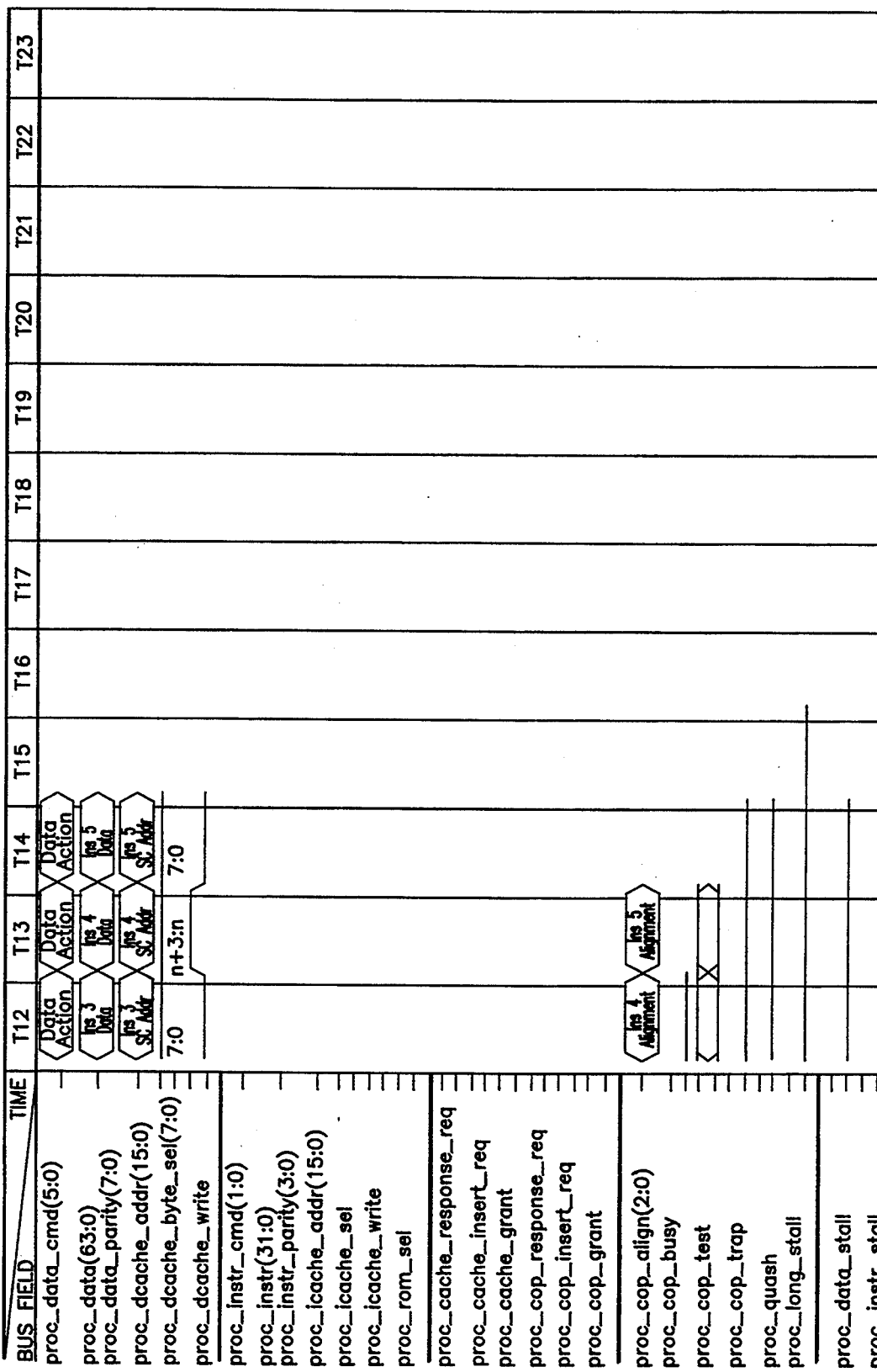
Figure 15A:
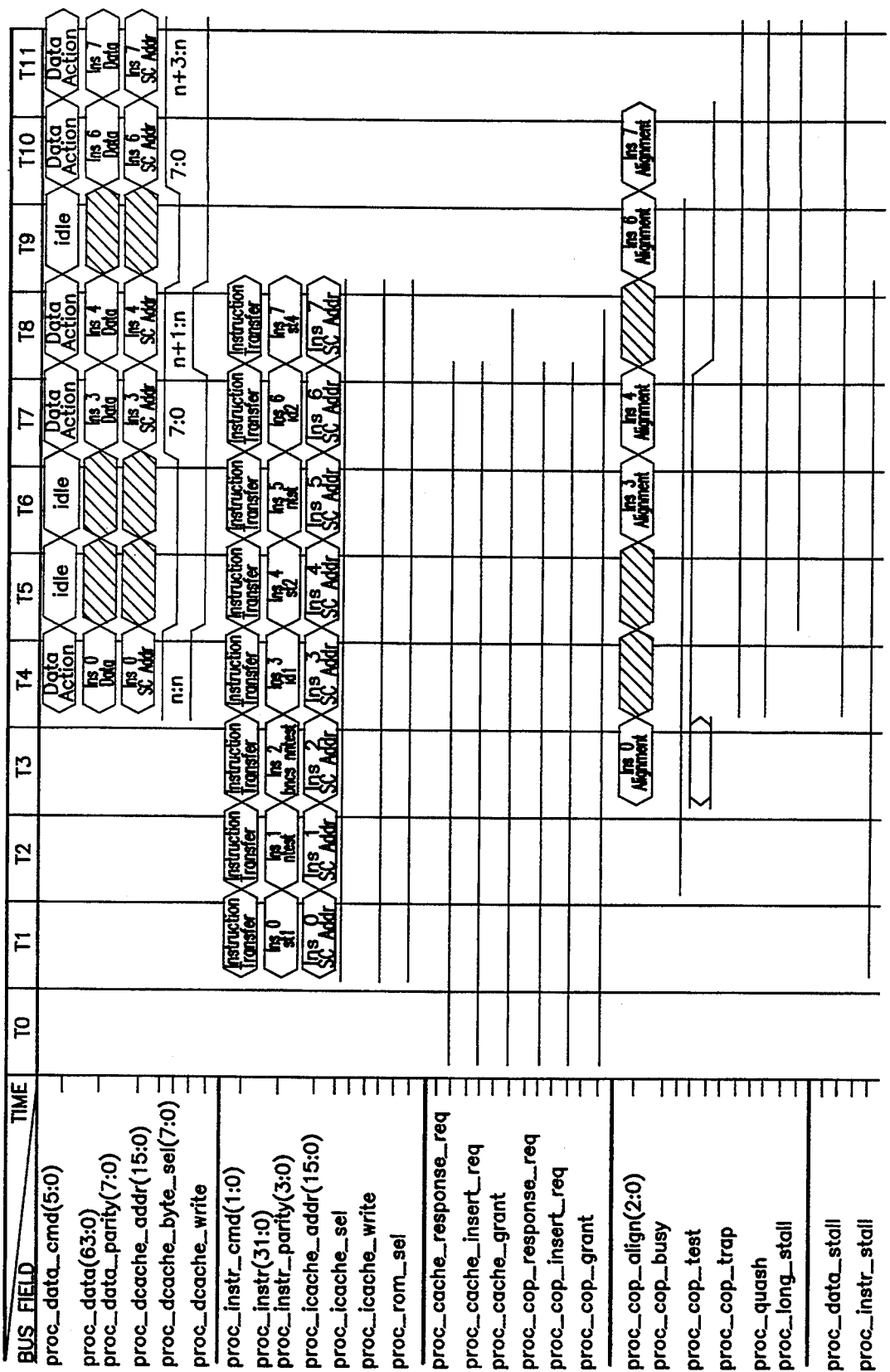
Figure 15B:
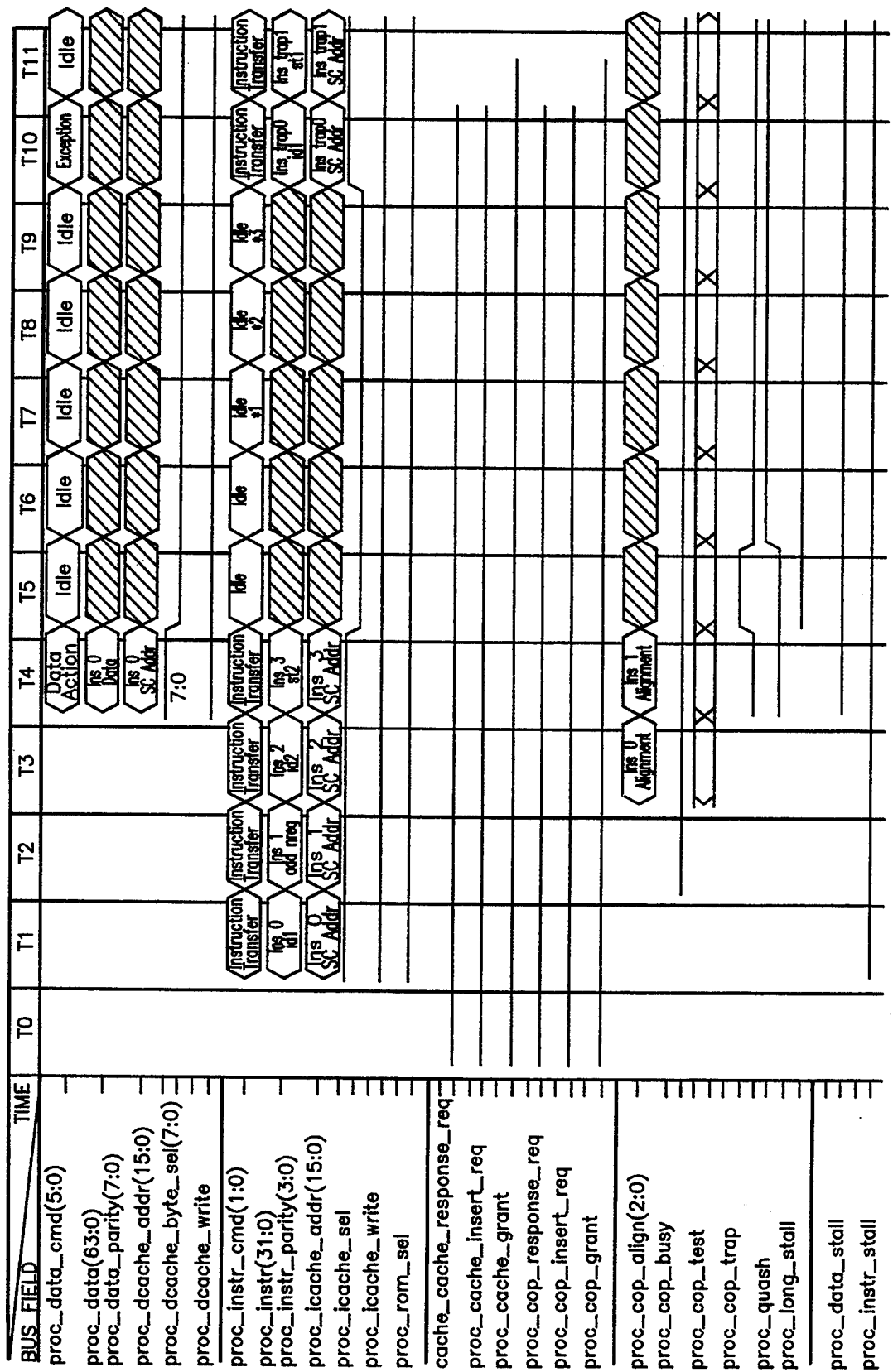
Figures 1, 15B:
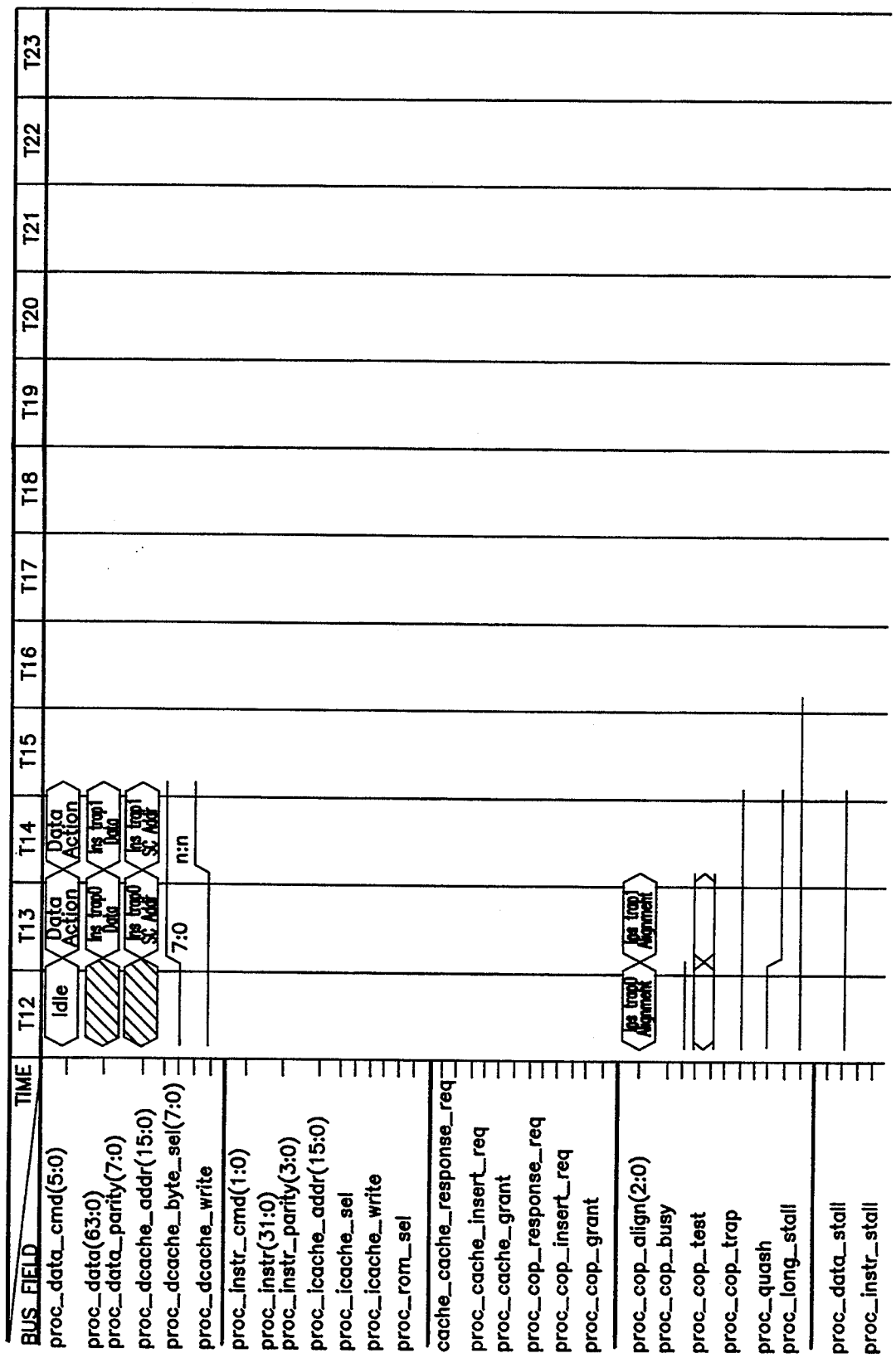
Figure 15C:
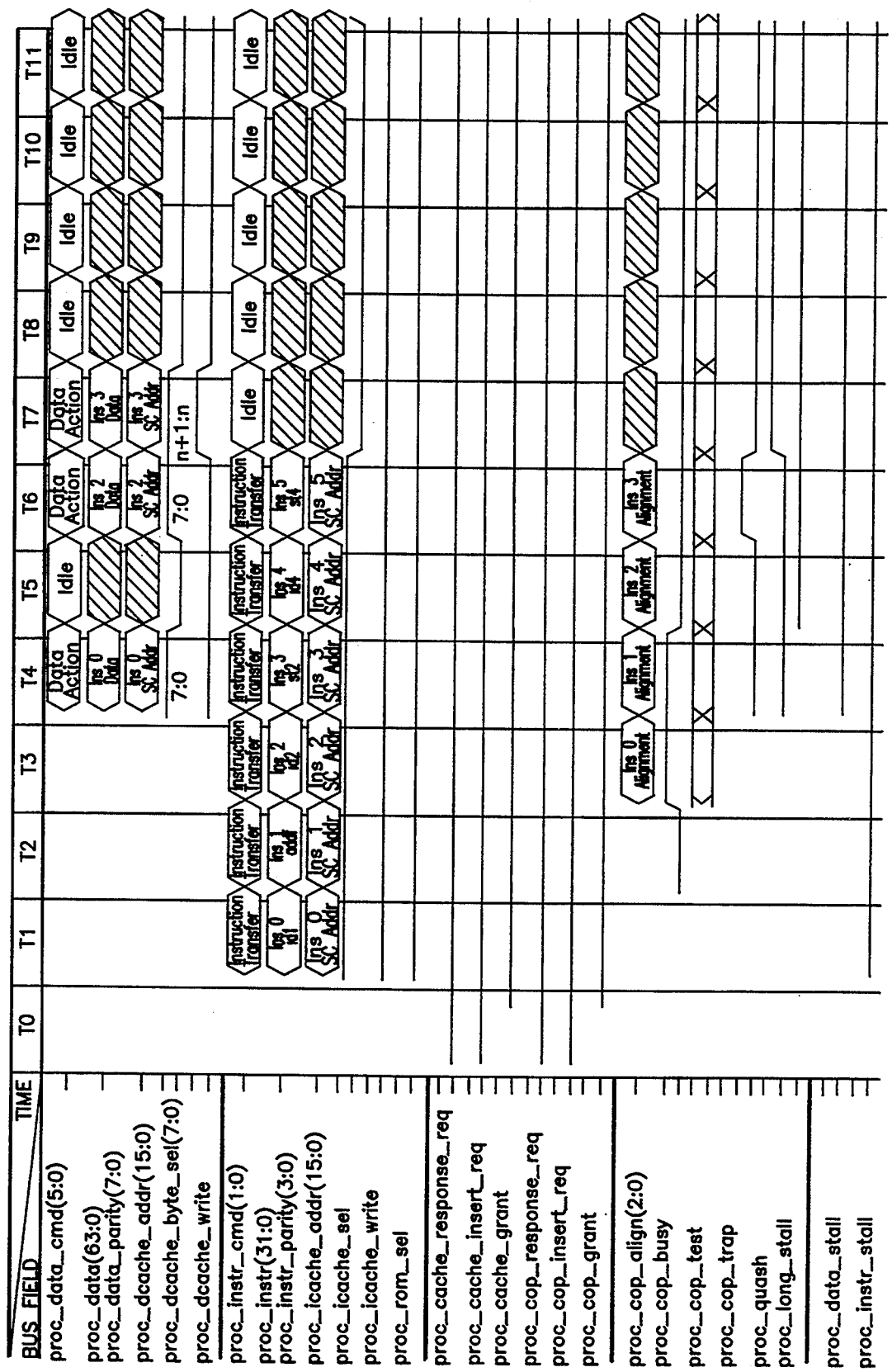
Figures 1, 15C:
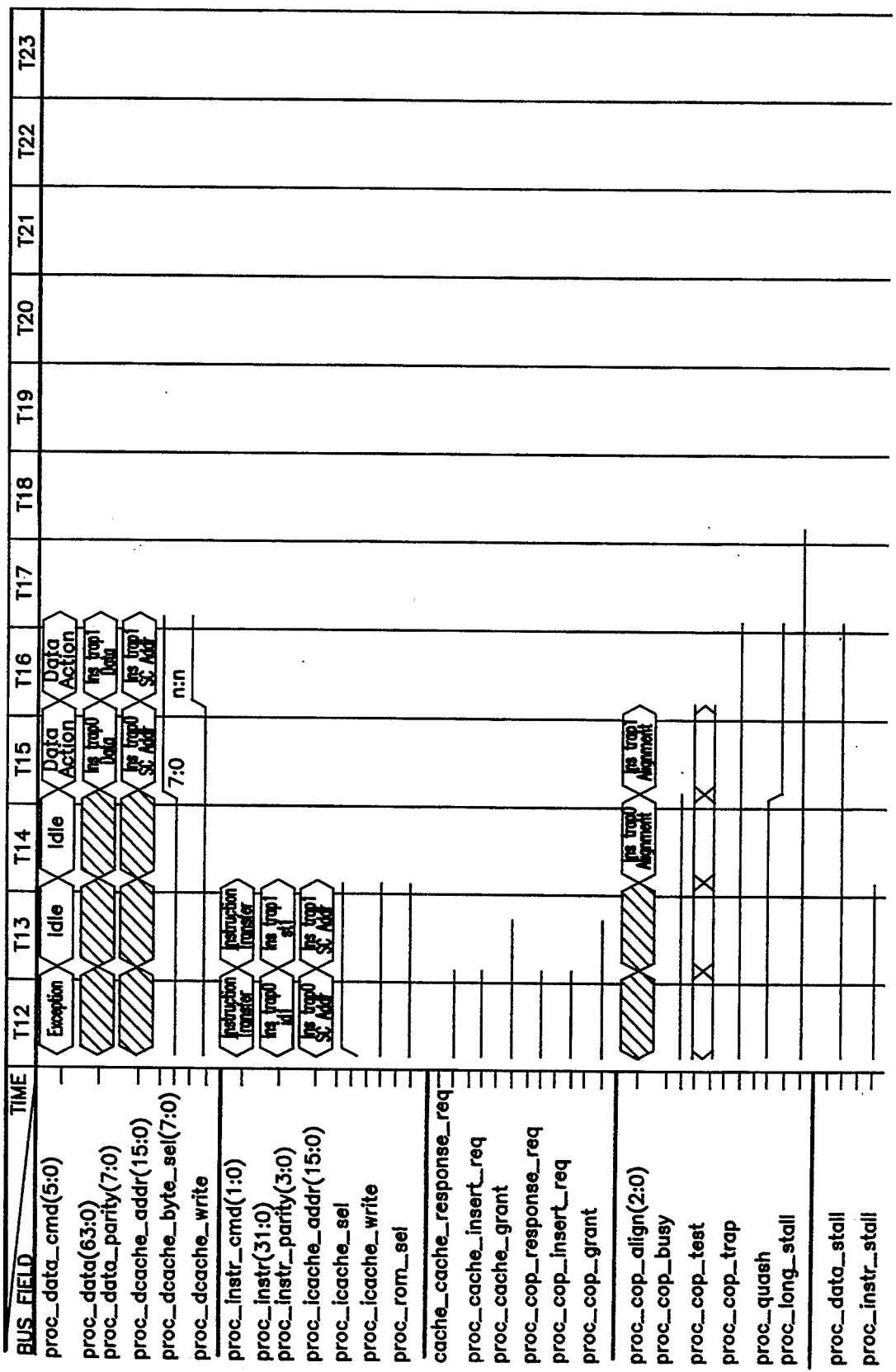
Figure 15D:
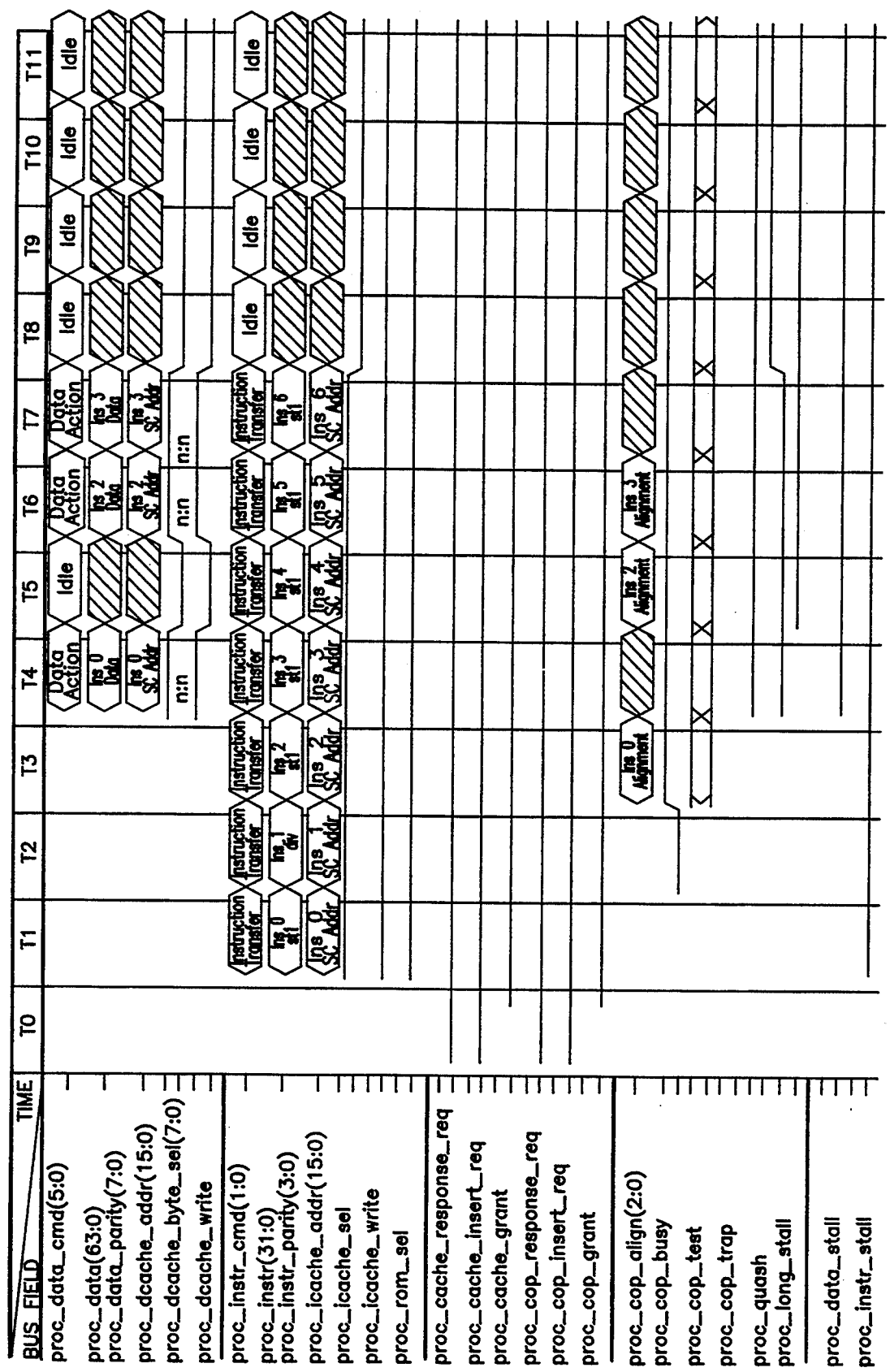
Figures 1, 15D:
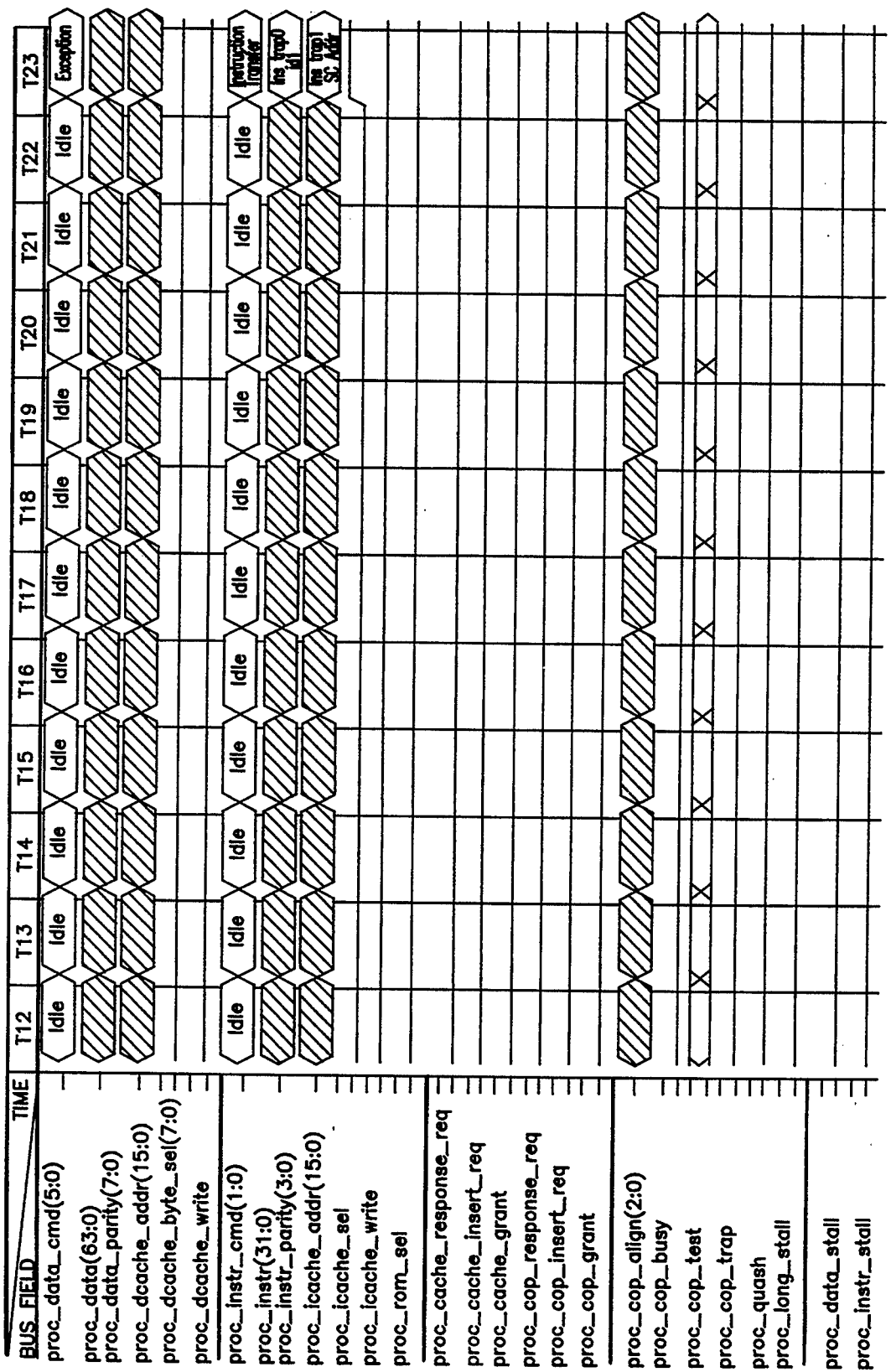
Figures 2, 15D:
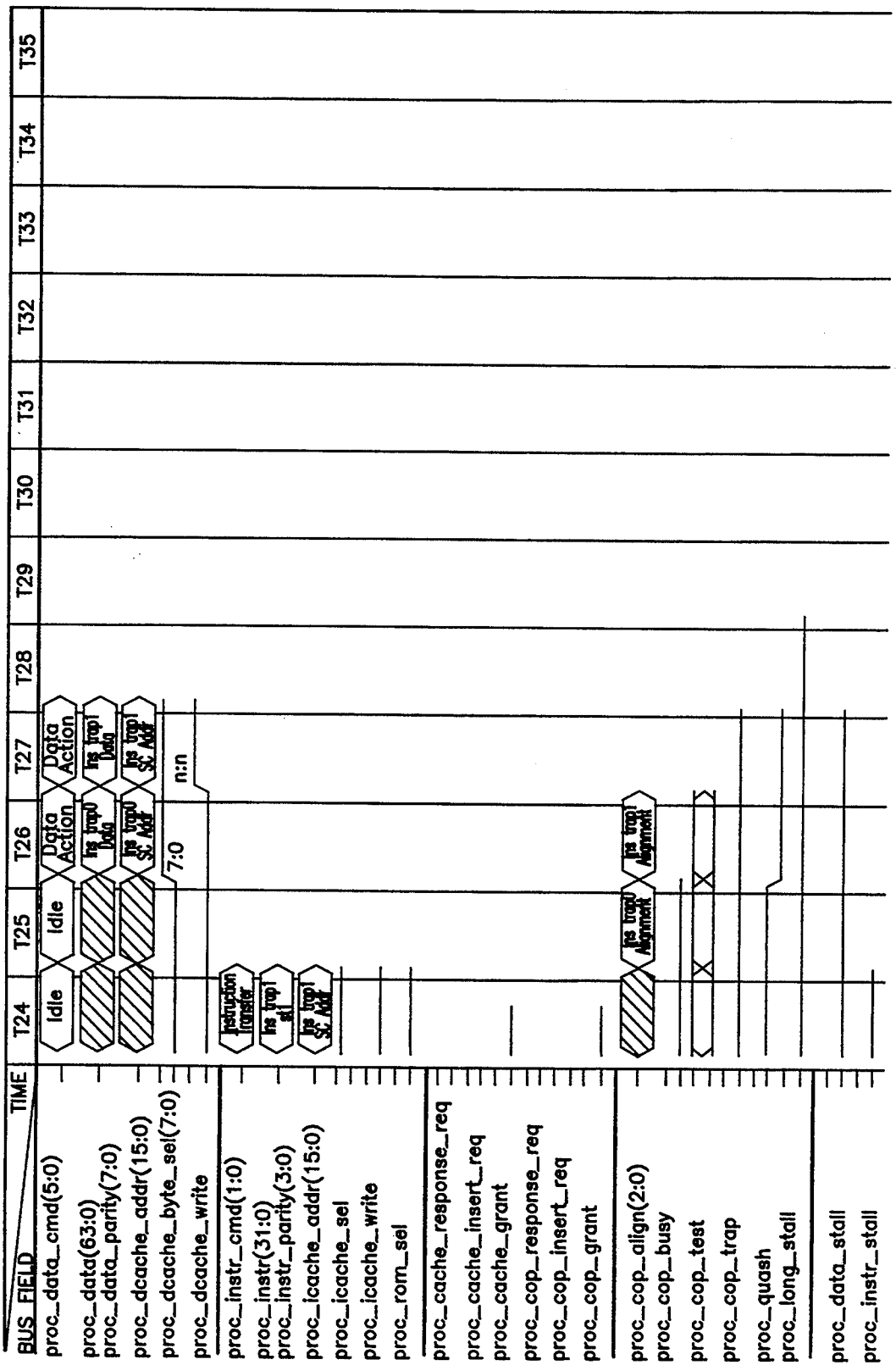
Figure 16A:
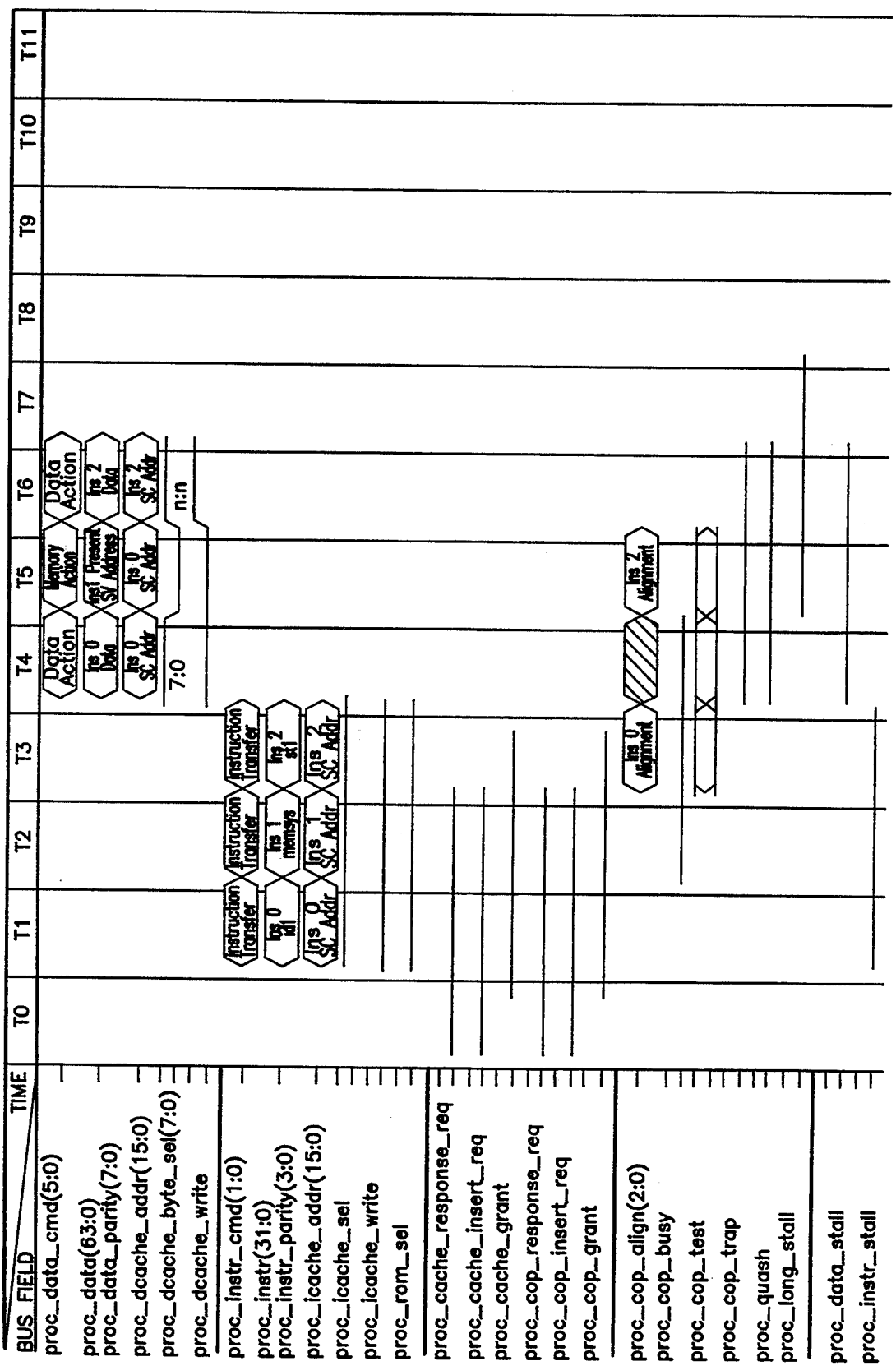
FIGS. 16a through 16c depict the timing of memory operations.
Figures 2, 15D:
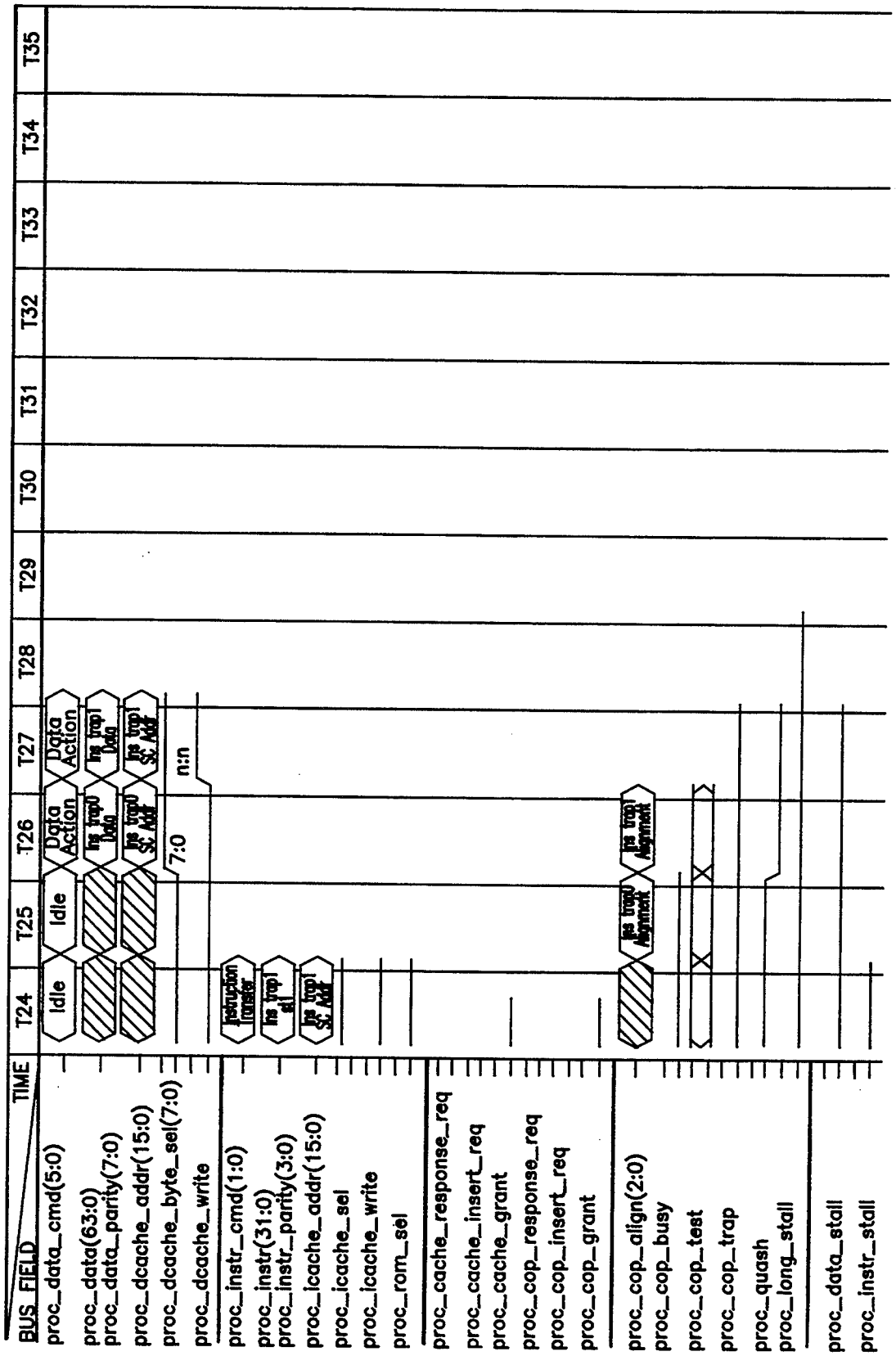
Figures 1, 16B:
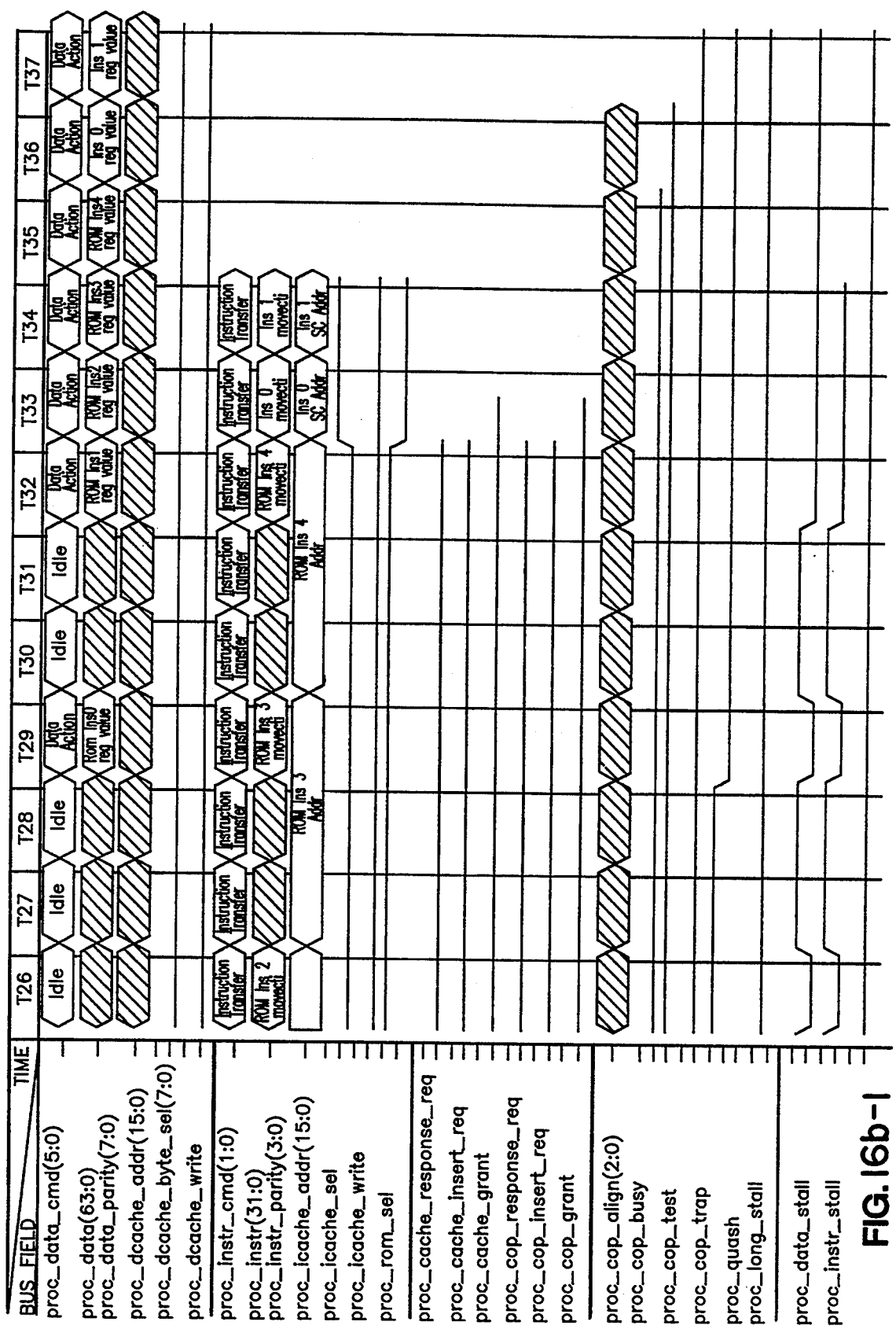
Figure 16C:
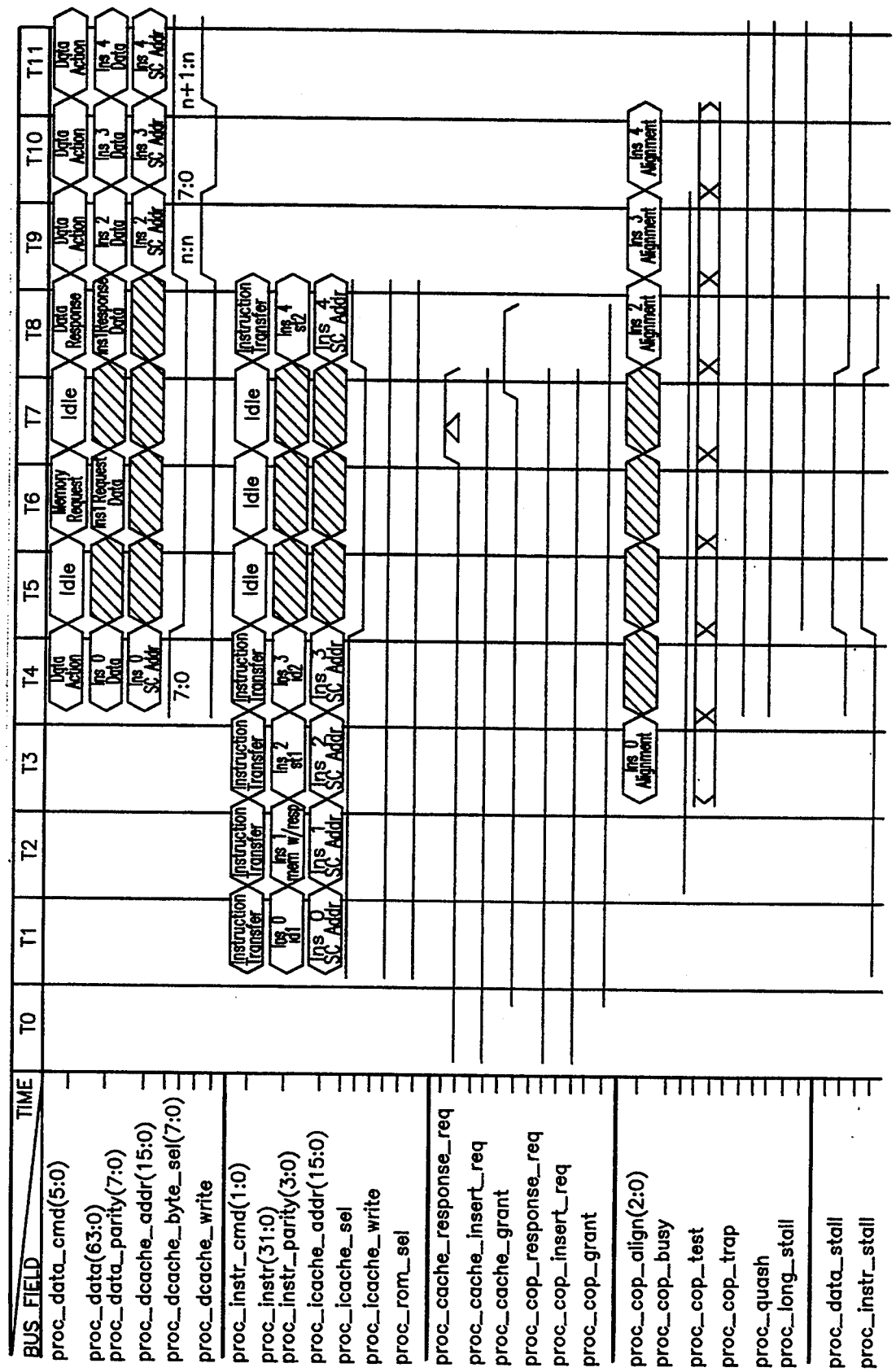
Figure 17:
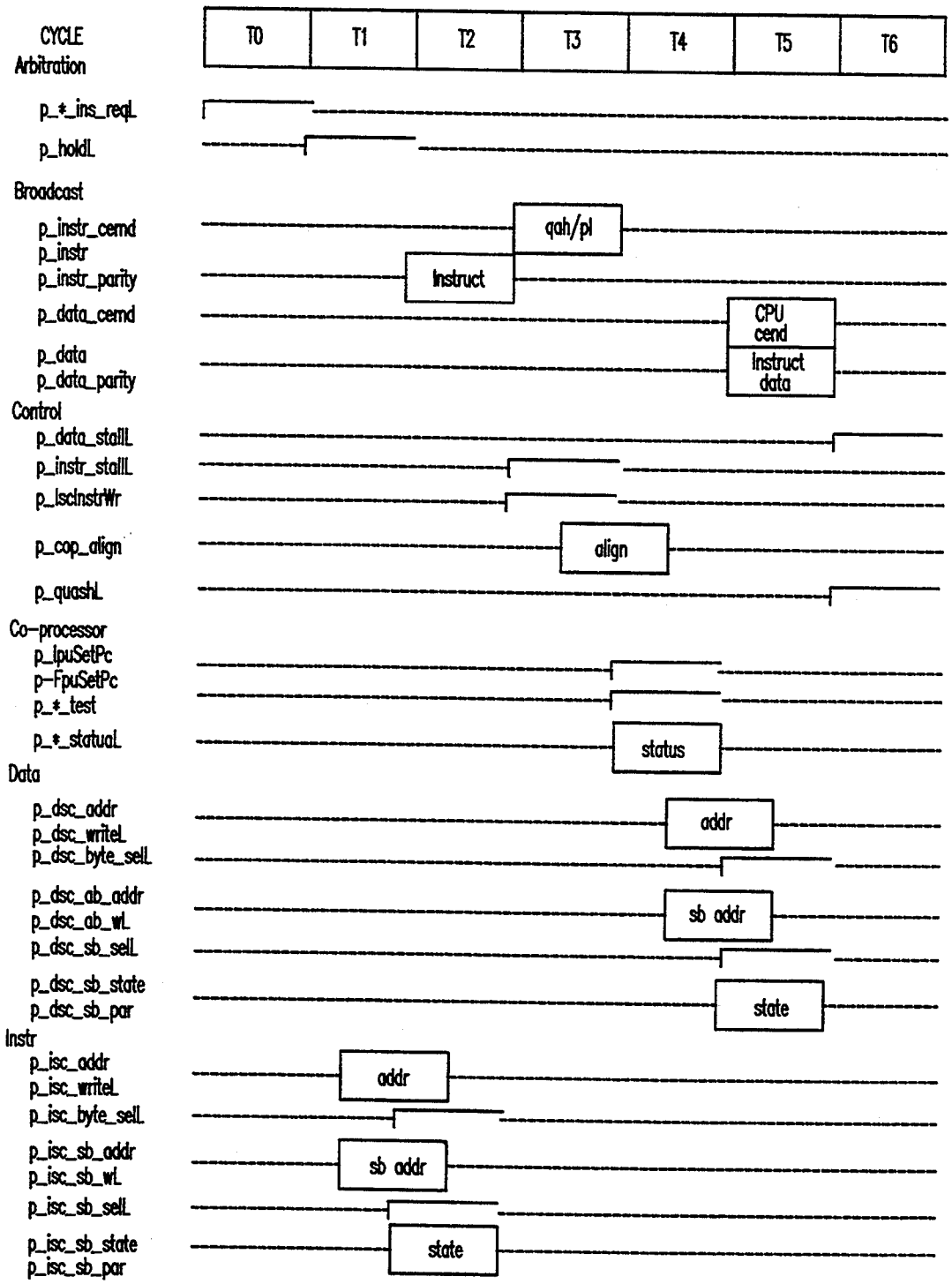
FIG. 17 depicts bus timing operations.
Figure 18:
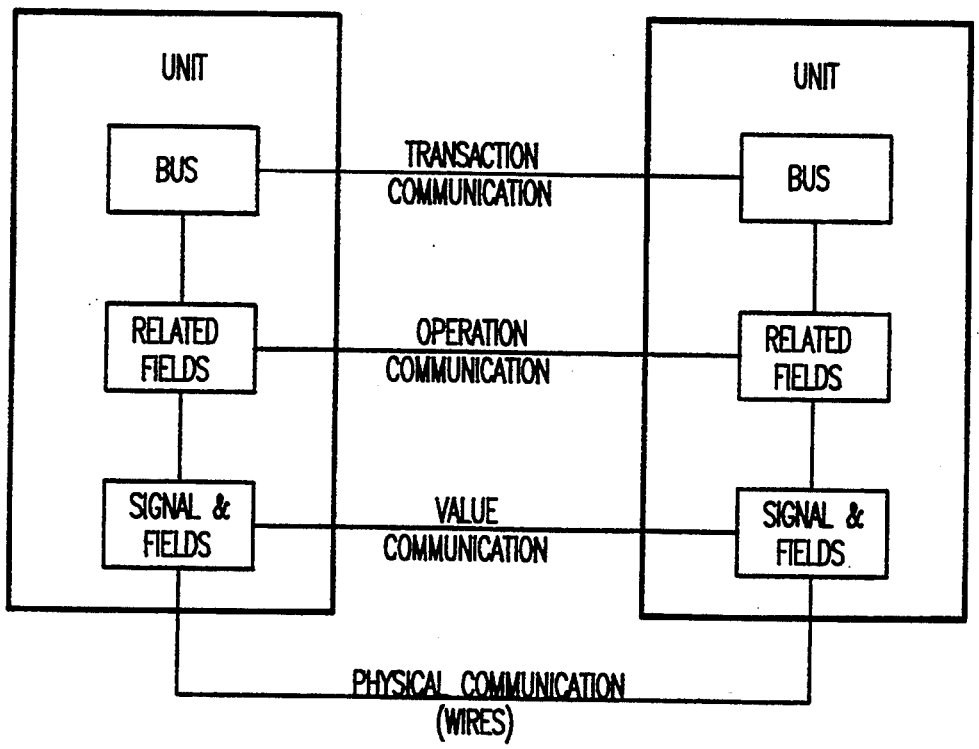
FIG. 18 depicts the interface hierarchy.

Packet Transfer From Receive Queue to Transmit Queue: As illustrated in FIG. 9, an entry is removed from a link Receive Queue and moved to an appropriate link Transmit Queue based on packet level processing. This sequence, which can be performed by the PSU or by any processor, involves the following five steps:

1. The processor or PSU removes OLDHEAD from the link Receive Queue by updating (STORE INSERTED-INSTRUCTION) the Receive Queue head pointer to the address of NEWHEAD.

2. The processor or PSU prefetches the link Receive Queue NEWHEAD.

3. The processor or PSU performs packet level processing on the frame or cell to select the appropriate link Transmit Queue. The PSU directly implements simple packet level processing, in checking for the presence of errors, and in executing a cache memory-based routing table lookup to determine the transmit routing. The appropriate header and command bits are modified.

4. The processor or PSU updates the link Transmit Queue OLDTAIL entry pointer to the address of OLDHEAD from the link Receive Queue.

5. The processors or PSU POSTSTORES OLDTAIL and NEWTAIL.

Packet Transfer from Transmit Queue to Transmit FIFO: The PSU executes the sequence indicated in FIG. 10 to transfer a frame or cell to be transmitted from a cache memory-based link Transmit Queue to the PSU internal Transmit FIFO. The old header from the link Transmit Queue is loaded into the PSU Transmit FIFOs and is moved to become the NEWTAIL entry of the original receive empty queue. The sequence involves the following four steps:

1. The PSU loads (LOAD INSERTED INSTRUCTIONS) frame or cell data and header from the link Transmit Queue into the PSU Transmit FIFOs.

2. The PSU prefetches (PREFETCH INSERTED INSTRUCTION) the link Transmit Queue NEWHEAD entry.

3. The PSU updates the link Transmit Queue head pointer from the address of OLDHEAD to the address of NEWHEAD.

4. The PSU updates (STORE INSERTED INSTRUCTION) the link Transmit Queue OLDTAIL entry forward pointer to the address of the entry just removed from the link Transmit Queue, which now becomes the NEWTAIL entry.

A more complete understanding of structure and operation of the illustrated embodiment may be attained by reference to the sections which follow.

Citations to drawings 1a–6c in the text that follows are to be read as references to FIGS. 1a'–6c', respectively. Likewise, citation to FIG. 1 in the text that follows is to be read as a reference to FIG. 12.

Those skilled in the art will recognize that the multiprocessor packet switching structures and operational sequences described above in connection with FIGS. 1-10 provide enhanced packet switching efficiency. In particular, the hierarchical ring structure illustrated in FIG. 3 provides an extremely rapid interconnect structure, affording data rates of approximately 0.8 Gigabytes/second for Ring(0) and up to approximately 3.2 Gigabytes/second for Ring(1). Additionally, the illustrated cache memory and interconnect structures are packet-oriented, and the fundamental unit of data transfer in the illustrated embodiments is a 128 byte subpage.

Moreover, the illustrated cache memory configuration enables all data structures to be resident in virtual and physical memory and transparently accessible to all processors. Packet switching applications are therefore easily programmed, while achieving optimum performance. The large shared address space of the illustrated structure permits single level storage to be shared uniformly by all processors and PSUs. Those skilled in the art will recognize that the atomic state in the illustrated memory system provides an efficient and convenient hardware locking primitive.

In accord with the invention, memory access is advantageously overlapped with processor and PSU computation operations, thereby eliminating memory latency. This is achieved through the PREFETCH and POSTSTORE instructions discussed above.

Further, the co-execution unit architecture described above permits direct interconnection of specialized co-execution units to the cache memory system. The PSU is an example of a specialized co-execution unit. The specialized co-execution unit can issue and execute all memory system instructions, as well as specialized co-execution unit instructions. The system achieves dynamic load balancing, because all processors and PSUs have uniform access to the cache memory.

It will thus be seen that the invention efficiently attains the objects set forth above, among those made apparent from the preceding description.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Digital packet switching apparatus for selectively switching digital signal packets between a set of nodes, said digital signal packets being configured in accordance with a selected protocol, the apparatus comprising A. plural processing cells, each being associated with at least one of said nodes, and each including a processing unit coupled to an associated memory element for storing information-representative signals, including digital signal packets, or portions thereof, packet processing means, coupled to at least one of the nodes associated with that processing cell and to at least the memory element of that processing cell, for at least one of (i) receiving a digital signal packet from that node and transmitting at least a portion of that digital signal packet for storage in that memory element, or (ii) receiving at least a portion of a digital signal packet from that memory element and transmitting a digital signal packet, including at least that portion, to that node, B. memory management means coupled to the memory elements of said plural processing cells for accessing one or more of said information-representative signals stored therein, C. at least a requesting one of said processing units including access request means for generating an access-request signal representative of a request for access to an information-representative signal stored in any of said memory elements, said access request means including means for selectively generating said access-request signal to include an ownership-request signal representative of a request for priority access to the requested information-representative signal, wherein said requested information-representative signal can comprise a digital signal packet, or portion thereof, at least the memory element associated with the requesting processing unit including control means for selectively transmitting said access-request signal to said memory management means, D. said memory management means including memory coherence means responsive to selected ones of said ownership-request signals for allocating, only within the memory element associated with the requesting processing unit, physical storage space for the requested information-representative signal, wherein that space is the exclusive storage space for the requested information-representative signal with respect to all of said memory elements, and for storing that requested information-representative signal in that exclusive physical storage space.

2. Digital packet switching apparatus according to claim 1, wherein the processing unit of said at one processing cell further comprises A. means for executing a first sequence of instructions, a first instruction of which comprises a PREFETCH instruction, for (i) generating a PREFETCH signal representative of a request for transfer of an information-representative signal, or copy thereof, to the memory element associated with that processing unit, (ii) commencing execution of the remaining instructions of said first sequence, (iii) selectively transmitting said PREFETCH signal to said memory management element, and B. said memory management element includes means for responding to said PREFETCH signal for transferring the requested information-representative signal, or a copy thereof, to the memory element associated with the requesting processing unit asynchronously with respect to the execution of the remaining instructions of said sequence by said requesting processing unit.

3. Digital packet switching apparatus according to claim 1, wherein the processing unit of at least one processing cell further comprises A. means for generating a POST-STORE signal representative of a request for transfer of a copy of an information-representative signal stored in the associated memory element to the memory elements of said other processing cells, and transmitting that POST-STORE signal to said memory management element, B. said memory management means includes means for responding to said POST-STORE signal for transferring a copy of said selected information-representative signal to said other processing cells for storage in the physical storage space allocated therein for said selected information-representative signal.

4. Digital packet switching apparatus for selectively switching digital signal packets between a set of nodes, said digital signal packets being configured in accordance with a selected protocol, the apparatus comprising A. a plurality of information transfer domains each including one or more segments, said plurality of information transfer domains including a first information transfer domain having a plurality of domain(0) segments, each including an associated bus element and a first plurality of processing cells connected to said bus element for transferring information-representative signals therebetween, B. each of said processing cells being associated with at least one of said nodes, and including a processing unit and an associated memory element for storing information-representative signals, said information-representative signals, including digital signal packets, or portions thereof, means for identifying each said information-representative signal stored in the associated memory with a corresponding SVA identifier, packet processing means, coupled to at least one of the nodes associated with that processing cell and to at least the memory element of that processing cell, for at least one of (i) receiving a digital signal packet from that node and transmitting at least a portion of that digital signal packet for storage in that memory element, or (ii) receiving at least a portion of a digital signal packet from that memory element and transmitting a digital signal packet, including at least that portion, to that node, C. at least a requesting one of said processing units including means for generating an access-request signal representative of a request for access to an information-representative signal stored in a memory element of any other of said processing cells, wherein said requested information-representative signal can comprise a digital signal packet, or portion thereof, and said access-request signal including an identifier component representative of the SVA identifier of the requested information-representative signal, said requesting processing cell including means for transmitting that access-request signal on the associated domain(0) bus element, D. said plurality of information transfer domains further including a second information transfer domain having a domain(1) segment comprising an associated bus element and a plurality of routing elements, each said routing element being connected to the bus element associated with the domain(1) segment and to the bus element associated with one of said domain(0) segments for transferring signals therebetween, and E. each said routing element including directory means for storing SVA identifier signals of information-representative signals stored in memory elements of the processing cells of the associated domain(0) segment, and further including means for receiving an access-request signal transferred along any one of the bus element of the domain(1) segment and the bus element of the associated domain(0) segment for selectively transmitting that access-request signal along the bus element associated with the other of those bus elements based on a comparison of the identifier component of that access-request signal with said SVA identifier signals in said directory element.

5. Digital packet switching apparatus for selectively switching digital signal packets between a set of nodes, said digital signal packets being configured in accordance with a selected protocol, the apparatus comprising A. a plurality of interconnected processing cells, each associated with at least one of said nodes, and each including storage means for storing instructions and data, said storage means including a first instruction source for storing instructions and for generating an instruction stream including a plurality of said instructions, a memory element for storing information-representative signals, including digital signal packets or portions thereof, a processing unit, coupled to at least said first instruction source for normally processing the instruction stream generated thereby, B. at least one of said processing units including packet processing means, coupled to at least one of the nodes associated with that processing cell and to at least the memory element of that processing cell, for at least one of (i) receiving a digital signal packet from that node and transmitting at least a portion of that digital signal packet for storage in that memory element, or (ii) receiving at least a portion of a digital signal packet from that memory element and transmitting a digital signal packet, including at least that portion, to that node, C. said packet processing means including insert means for generating control instructions and for applying those control instructions to said processing unit to be processed thereby to at least one of (i) initiate the transfer of at least portions of digital signal packets from that packet processing means to the memory element of the associated processing cell, (ii) initiate the transfer of at least portions of digital signal packets from the memory element of the associated processing cell to that packet processing means, (iii) transfer at least portions of digital signal packets between the memory element of the associated processing cell and the memory element of another processing cell, D. said control instructions being processed by said processing unit in the same manner as, and without affecting processing sequence of, the instructions from the first instruction source.

6. Digital packet switching apparatus for selectively switching digital signal packets between a set of nodes, said digital signal packets being configured in accordance with a selected protocol, the apparatus comprising A. plural processing cells, each being associated with at least one of said nodes, and including
  a processing unit coupled to an associated memory element for storing information-representative signals, including digital signal packets, or portions thereof, said information-representative signals being arranged in data subpages, plural ones of which data subpages comprise a data page
  packet processing means, coupled to at least one of the nodes associated with that processing cell and to at least the memory element of that processing cell, for at least one of
    (i) receiving a digital signal packet from that node and transmitting at least a portion of that digital signal packet for storage in that memory element, or
    (ii) receiving at least a portion of a digital signal packet from that memory element and transmitting a digital signal packet, including at least that portion, to that node,
  B. at least one of said processing units including access request means for generating an access-request signal representative of a request for access to a data subpage stored in one or more of said memory elements, wherein said requested data subpage can comprise a digital signal packet, or portion thereof, at least the memory element of the requesting processing unit including control means for selectively transmitting said access-request signal to a memory management means,
  C. said memory management means, being coupled to said processing cells, for accessing information-representative signals stored in said memory elements there of, said memory management means including means responsive to at least selected ones of said access-request signals for
  allocating, only within the memory element associated with the requesting processing unit, physical storage space for the data page associated with the requested data subpage, wherein that space is the exclusive physical storage space for that data page with respect to all of said memory elements, and for
  storing the requested data subpage in that allocated physical storage space.

7. Digital packet switching apparatus for selectively switching digital signal packets between a set of nodes, said digital signal packets being configured in accordance with a selected protocol, the apparatus comprising A. a plurality of information transfer domains each including one or more segments, said plurality of information transfer domains including a first information transfer domain having a plurality of domain(0) segments, each including an associated bus element and a first plurality of processing cells connected to said bus element for transferring information-representative signals therebetween,
  B. each of said processing cells being associated with at least one of said nodes, and each including storage means for storing instructions and data, said storage means including
    a first instruction source for storing instructions and for generating an instruction stream including a plurality of said instructions,
    a memory element for storing information-representative signals, including digital signal packets or portions thereof,
    a processing unit, coupled to at least said first instruction source, for normally processing the instruction stream generated thereby, packet processing means, coupled to at least one of the nodes associated with that processing cell and to at least the memory element of that processing cell, for at least one of
      (i) receiving a digital signal packet from that node and transmitting at least a portion of that digital signal packet for storage in that memory element, or
      (ii) receiving at least a portion of a digital signal packet from that memory element and transmitting a digital signal packet, including at least that portion, to that node,
  C. said packet processing means including insert means for generating control instructions and for applying those control instructions to said processing unit to be processed thereby to at least one of
    (i) initiate the transfer of at least portions of digital signal packets from the packet processing means to the memory element of the associated processing cell,
    (ii) initiate the transfer of at least portions of digital signal packets from the memory element of the associated processing cell to that packet processing means,
    (iii) generating an access-request signal representative of a request for transfer of an information-representative signal stored in the memory element of the associated processing cell with the memory element of another said processing cells, wherein the information-representative signal requested for transfer can comprise a digital signal packet, or portion thereof,
  D. said control instructions being processed by said processing unit in the same manner as, and without affecting processing sequence of, the instructions from the first instruction source, and
  E. said requesting processing cell including means for transmitting that access-request signal on the associated domain(0) bus element, said plurality of information transfer domains further including a second information transfer domain having a domain(1) segment comprising an associated bus element and a plurality of routing elements, each said routing element being connected to the bus element associated with the domain(1) segment and to the bus element associated with one of said domain(0) segments for transferring signals therebetween.

8. Digital packet switching apparatus according to any of claims 1 or 4 or 5 or 6 or 7, wherein
  A. said plurality of processing cells includes at least a remote processing cell including its owns respective packet processing means coupled to at least one node associated with that cell, and
  B. said remote cell further including remote interface means coupled to at least one other said cell for transferring signals between that remote cell and said at least one other said processing cell.

9. Digital packet switching apparatus according to claim 8, wherein
   A. said remote cell resides at a point physically remote from others of said plurality of processing cells, and wherein
   B. said interface means includes means for transmitting said information-representative signal between said physically remote point and said at least one other processing cell.

10. Digital packet switching apparatus according to claim 9, wherein said remote interface means includes fiber optic transmission media for carrying information-representative signals between said remote cell and said at least one other processing cell.

11. Digital packet switching apparatus according to any of claims 1 or 4 or 5 or 6 or 7, wherein said packet processing means of at least a selected one of said processing cells comprises
   A. packet receive means, in communication with at least one of said nodes associated with that processing cell, for receiving said digital signal packets therefrom,
   B. packet splitter means, in communication with said packet receive means, for splitting each said digital signal packet received from at least one of said nodes into a header portion and a data portion,
   C. packet receive buffer means, including a buffer element in electrical communication with said packet splitter means, for storing at least portions of said digital signal packets split by said packet splitter means, and
   D. frame processing means, in communication with said packet receive buffer means and said plurality of memory elements, for retrieving at least portions of said digital signal packets from said packet receive buffer means, executing selected processing on at least those portions of said digital signal packets, and transmitting at least those portions of said digital signal packets to said memory element of at least one of said plurality of processing cells.

12. Digital packet switching apparatus according to claim 11, wherein said packet processing means further comprises error checking means for checking said received digital signal packets for errors, and for storing results of said checking operation with said header portions of said received digital signal packets.

13. Digital packet switching apparatus according to claim 11, wherein at least one selected processing cell comprises
   A. receive queue means for storing in the memory element of at least one of said plurality of processing cells at least one receive queue, said at least one receive queue comprising a data structure including at least portions of digital signal packets received from said packet processing means,
   B. transmit queue means for storing in said the memory element at least one of said plurality of processing cells a transmit queue, said at least one transmit queue comprising a data structure including at least portions of digital signal packets to be transmitted to at least a selected one of said nodes, said at least one transmit queue corresponding to at least one of said nodes, and
   C. receive queue packet transfer means, in communication with said receive queue means and said transmit queue means, for selectively transferring at least portions of selected digital signal packets from said at least one receive queue to at least a selected transmit queue, responsive to control signals generated by said plurality of processing units, and
   D. said frame processing means further comprises means for loading at least portions of selected ones of said digital signal packets into said at least one receive queue.

14. Digital packet switching apparatus according to claim 13, wherein said at least one selected processing cell comprises
   A. application service queue means for storing an application service queue, said application service queue comprising a data structure including at least portions of digital signal packets to be serviced by ones of said plurality of processing cells in accordance with at least one application program, and
   B. means for loading at least portions of selected ones of said digital signal packets from said at least one receive queue into said at least one application service queue, responsive to control signals generated by ones of said plurality of processing units in accordance with said at least one application program.

15. Digital packet switching apparatus according to claim 14, wherein said at least one selected processing cell further comprises
   A. application completion queue means for storing an application completion queue, said application complete queue comprising a data structure including at least portions of digital signal packets generated by ones of said plurality of processing cells in accordance with said at least one application program, and
   B. means for loading at least portions of selected ones of said digital signal packets from said application completion queue into said at least one transmit queue.

16. Digital packet switching apparatus according to claim 13, wherein said at least one selected processing cell comprises means for enabling any of said plurality of processing units to retrieve at least one selected digital signal packet from said at least one receive queue for processing.

17. Digital packet switching apparatus according to claim 13, wherein
   A. said frame processing means further comprises means, in communication with said transmit queue means, for retrieving at least portions of digital signal packets from said at least one transmit queue, responsive to said header portion of said digital signal packets, and
   B. said packet processing means further comprises packet transmit buffer means, including a buffer element in communication with said frame processing means, for storing at least portions of said digital signal packets retrieved by said frame processing means, and
   C. packet transmit means, in communication with said packet transmit buffer means and at least one of said nodes, for transmitting said digital signal packets stored in said packet buffer means to at least one of said nodes.

18. Digital packet switching apparatus according to claim 11, wherein said at least one selected processing cell comprises
   A. transmit queue means for storing in said plurality of memory elements at least one transmit queue, said at least one transmit queue comprising a data structure including at least portions of digital signal packets to be transmitted to at least a selected one of said nodes, said at least one transmit queue corresponding to at least one of said nodes, and B. said frame processing means further comprises direct packet transfer means, in communication with said packet receive buffer means, and responsive to said header portion of said digital packets, for transferring at least portions of selected digital signal packets from said packet receive buffer means to said at least one transmit queue.

19. A method of operating a digital packet switching apparatus for selectively switching digital signal packets between a set of nodes, said digital signal packets being configured in accordance with a selected protocol, said method including the steps of A. providing plural processing cells, each being associated with at least one of said nodes and each including a processing unit coupled to an associated memory element for storing information-representative signals, including digital signal packets, or portions thereof, B. selectively executing, within at least one of said processing cells, any of
   (i) receiving a digital signal packet from a node associated with that processing cell and transmitting at least a portion of that digital signal packet for storage in the memory element of that processing cell, or
   (ii) receiving at least a portion of a digital signal packet from the memory element of that processing cell and transmitting a digital signal packet, including at least that portion, to at least one of said nodes associated with that cell, C. generating within a requesting one of said processing units an ownership-request signal representative of a request for priority access to an information-representative signal stored in the memory element of any of said processing cells, wherein said requested information-representative signal can comprise a digital signal packet, or portion thereof, D. determining whether the requested information-representative signal is stored within a memory element other than one associated with the requesting processing unit, and responding to a determination that the requested information-representative signal is stored in a memory element other than the one associated with the requesting processing unit for allocating, only within the memory element associated with the requesting processing unit, physical storage space for the requested information-representative signal, wherein that space is the exclusive physical storage space for the requested information-representative signal with respect to all of said memory elements, and storing the requested information-representative signal in that exclusive physical storage space.

* * * * *